(12) United States Patent
Dutta

(10) Patent No.: US 11,539,627 B2
(45) Date of Patent: Dec. 27, 2022

(54) LOAD BALANCING IN PACKET SWITCHED NETWORKS

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 134 days.

(21) Appl. No.: 17/135,448

(22) Filed: Dec. 28, 2020

(65) Prior Publication Data
US 2022/0210072 A1 Jun. 30, 2022

(51) Int. Cl.
*H04L 47/125* (2022.01)
*H04L 12/44* (2006.01)
*H04L 41/12* (2022.01)

(52) U.S. Cl.
CPC .......... *H04L 47/125* (2013.01); *H04L 12/44* (2013.01); *H04L 41/12* (2013.01)

(58) Field of Classification Search
CPC ........ H04L 47/125; H04L 12/44; H04L 41/12
See application file for complete search history.

(56) References Cited

U.S. PATENT DOCUMENTS

| 5,872,773 | A | 2/1999 | Katzela et al. |
| 9,100,328 | B1 | 8/2015 | Atlas |
| 9,270,426 | B1 * | 2/2016 | Atlas ................ H04L 5/001 |
| 2020/0210048 | A1 * | 7/2020 | Pei .................. G06F 40/30 |

FOREIGN PATENT DOCUMENTS

| WO | WO-2007043919 A1 * | 4/2007 | ......... H04L 12/4625 |
| WO | WO 2016/168603 A1 | 10/2016 | |

OTHER PUBLICATIONS

Andersson, L., et al. "LDP Specification," Network Working Group, RFC 5036, Oct. 2007, 135 pages.
Moy, J., "OSPF Version 2," Network Working Group, RFC 2328, Apr. 1998, 244 pages.
Coltun, R., et al., "OSFP for IPv6," Network Working Group, RFC 5340, Jul. 2008, 94 pages.

(Continued)

*Primary Examiner* — Duc C Ho
(74) *Attorney, Agent, or Firm* — Tong, Rea, Bentley & Kim, LLC

(57) ABSTRACT

Various example embodiments for supporting load balancing in packet switched networks are presented herein. Various example embodiments for supporting load balancing in packet switched networks may be configured to support load balancing in packet switched networks based on use of disjoint trees. Various example embodiments for supporting load balancing in packet switched networks may be configured to support load balancing in packet switched networks based on use of maximally disjoint trees. Various example embodiments for supporting load balancing in packet switched networks based on use of maximally disjoint trees may be configured to support load balancing in packet switched networks using per-flow load balancing, per-packet load balancing, randomized load balancing (RLB), or the like, as well as various combinations thereof.

24 Claims, 39 Drawing Sheets

(56) References Cited

OTHER PUBLICATIONS

Callon, R.W., et al., "Use of OSI IS-IS for Routing in TCP/IP and Dual Environments," Network Working Group, RFC 1195, Dec. 1990.
Filfils, C., et al., "Segment Routing Architecture," Internet Engineering Task Force, RFC 8402, Jul. 2018, 32 pages.
Bashandy, A., et al., "Segment Routing with the MPLS Data Plane," Internet Engineering Task Force, RFC 8660, Dec. 2019.
Awduche, D., et al., "RSVP-TE: Extensions to RSVP for LSP Tunnels," Network Working Group, RFC 3209, Dec. 2001, 61 pages.
Jamoussi, B., et al, "Constraint-Based LSP Setup using LDP," Network Working Group, RFC 3212, Jan. 2002, 42 pages.
DARPA, "Internet Protocol—DARPA Internet Program—Protocol Specification," RFC 791, Sep. 1981, 49 pages.
Deering, S., et al., "Internet Protocol, Version 6 (IPv6) Specification," Network Working Group, RFC 2460, Dec. 1998, 39 pages.
Atlas, A., et al., "Basic Specification for IP Fast Reroute: Loop-Free Alternates," Network Working Group, RFC 5286, Sep. 2008, 31 pages.
DARPA, "Transmission Control Protocol—DARPA Internet Program—Protocol Specification," RFC 793—Sep. 1981, 89 Pages.
Mathis, M., et al., "TCP Selective Acknowledgement Options," Network Working Group, RFC 2018, 12 pages.
Gredler, H., et al., "North-Bound Distribution of Link-State and Traffic Engineering (TE) Information Using BGP," Internet Engineering Task Force, RFC 7752, Mar. 2016, 48 pages.
Fedyk, K., "IS-IS Extensions Supporting IEEE 802.1aq Shortest Path Bridging," Internet Engineering Task Force, RFC 6329, Apr. 2012, 37 pages.
IEEE, "802.1D—MAC Bridges," printed on http://www.ieee802.org/1/pages/802.1D.html on Aug. 26, 2020, 1 page.
IEEE, "802.1w—Rapid Reconfiguration of Spanning Tree," printed from http://www.ieee802.org/1/pages/802.1w.html on Aug. 26, 2020, 2 pages.
IEEE, "802.1s—Multiple Spanning Trees," printed from http://www.ieee802.org/1/pages/802.1s.html on Aug. 26, 2020, 1 page.
IEEE, "802.1aq—Shortest Path Bridging," printed from http://www.ieee802.org/1/pages/802.1aq.html on Aug. 26, 2020, 6 pages.
Ramasubramanian, S., et al., "Disjoint Multipath Routing Using Colored Trees," Computer Networks, vol. 51, No. 8, Mar. 23, 2007, pp. 2163-2180.
EP Extended Search Report mailed in corresponding EP Application No. 21216543.5 dated May 18, 2022, 8 pages.

* cited by examiner

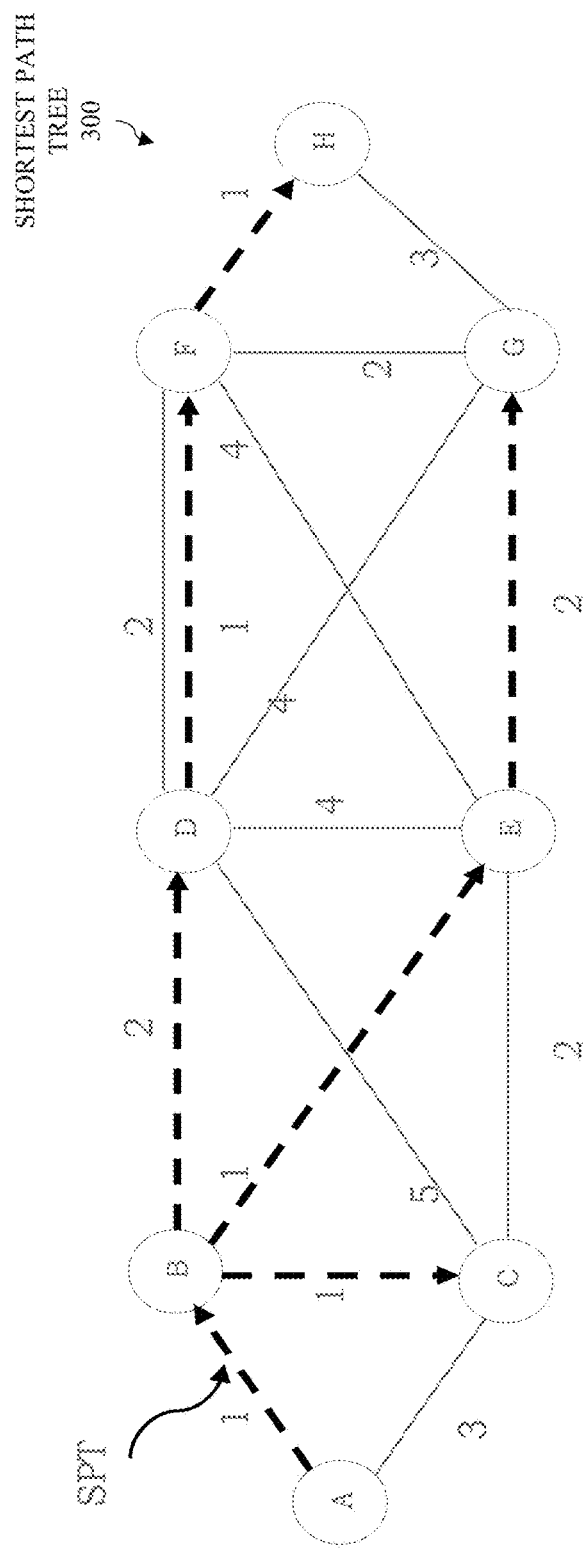

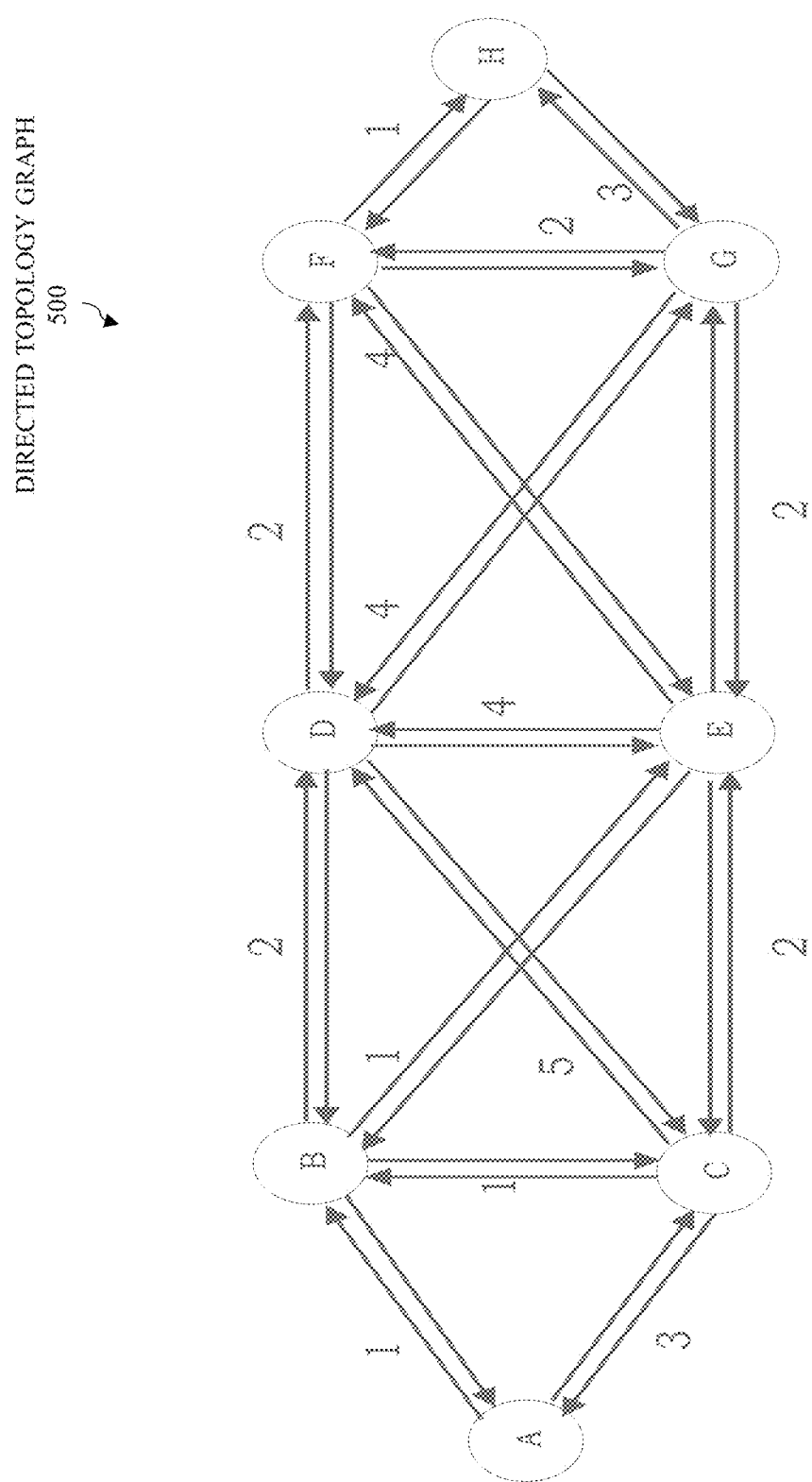

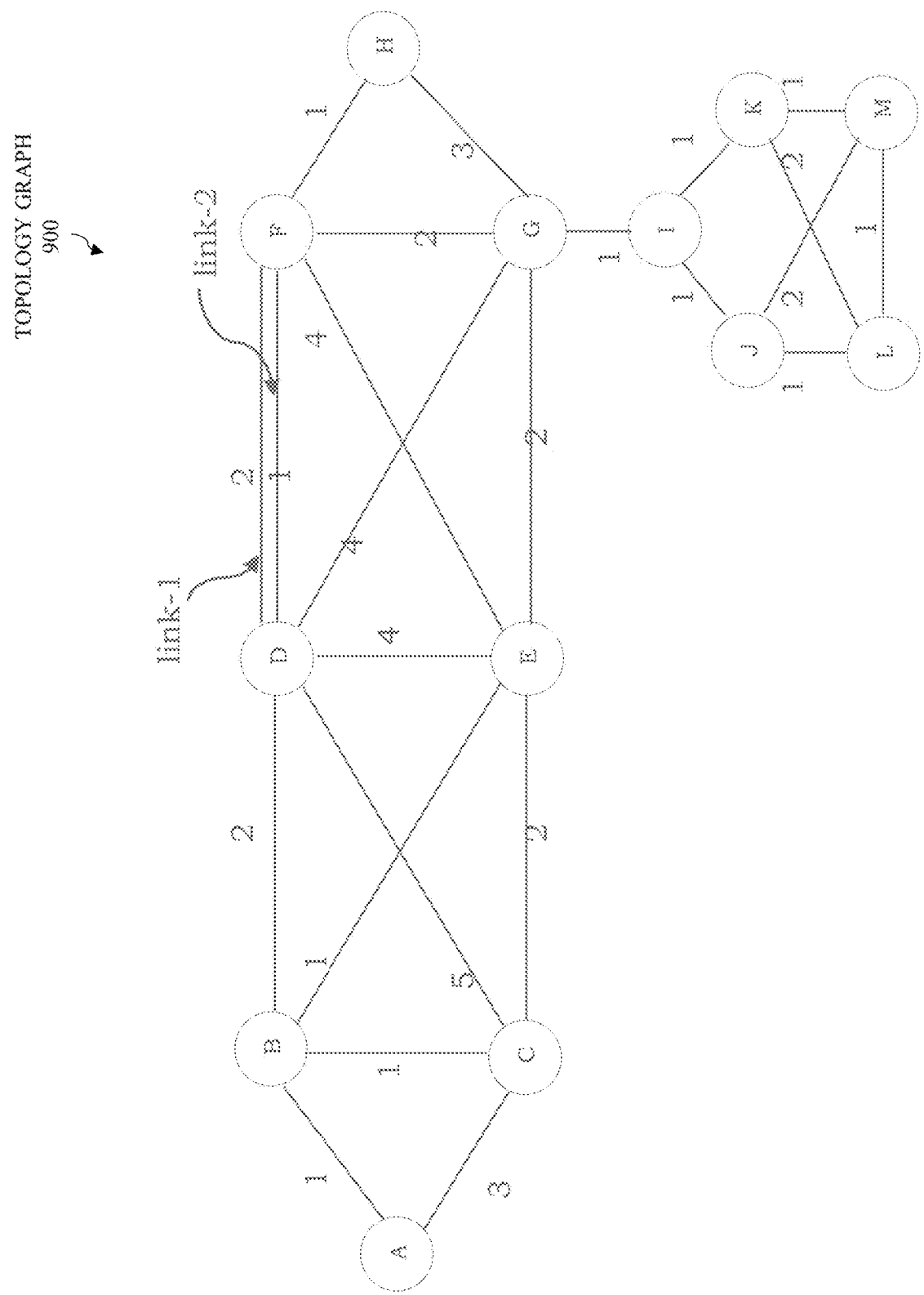

1100

| DESTINATION | TREE ID | RLB-PATH | NEIGHBOR | COST |
|---|---|---|---|---|
| A | NONE | NONE | LOCAL | 0 |
| B | 1 | EMPTY | B | 1 |
|   | 2 | {B} | C | 4 |
| C | 1 | {C} | B | 2 |
|   | 2 | EMPTY | C | 3 |
| D | 1 | {D} | B | 3 |
|   | 2 | {D} | C | 8 |
| E | 1 | {E} | B | 2 |
|   | 2 | {E} | C | 5 |
| F | 1 | {D, F} | B | 5 |
|   | 2 | {E, F} | C | 9 |
| G | 1 | {E, G} | B | 4 |
|   | 2 | {E, F, G} | C | 11 |
| H | 1 | {D, F, H} | B | 7 |
|   | 2 | {E, F, G, H} | C | 14 |
| I | 1 | {E, G, I} | B | 5 |
|   | 2 | {E, F, G} | C | INDIRECT |
| J | 1 | {E, G, I, J} | B | 6 |
|   | 2 | {E, F, G} | C | INDIRECT |
| K | 1 | {E, G, I, K} | B | 6 |
|   | 2 | {E, F, G} | C | INDIRECT |
| L | 1 | {E, G, I, J, L} | B | 7 |
|   | 2 | {E, F, G} | C | INDIRECT |
| M | 1 | {E, G, I, K, M} | B | 7 |
|   | 2 | {E, F, G} | C | INDIRECT |

```
Gateway_Resolution(Isolated_Nodes[])
{
    Node = Get the first node in Isolated_Nodes[];

While (Node)
    {
        If (Node->Gateway is empty)
            Resolve_Gateway(Node)

Node = Get the next node in Isolated_Nodes[];
    }
}

Resolve_Gateway(Node)
{
    Node_Parent = Get parent of Node in Previous Tree

// If Node_Parent is not in current tree then recursively
find the parent that is included
    // in current tree.
    If (Node_Parent is not included in Current Tree)
        Node->Gateway = Resolve_Gateway(Node_Parent);
    Else
        Node->Gateway = Node_Parent;
}
```

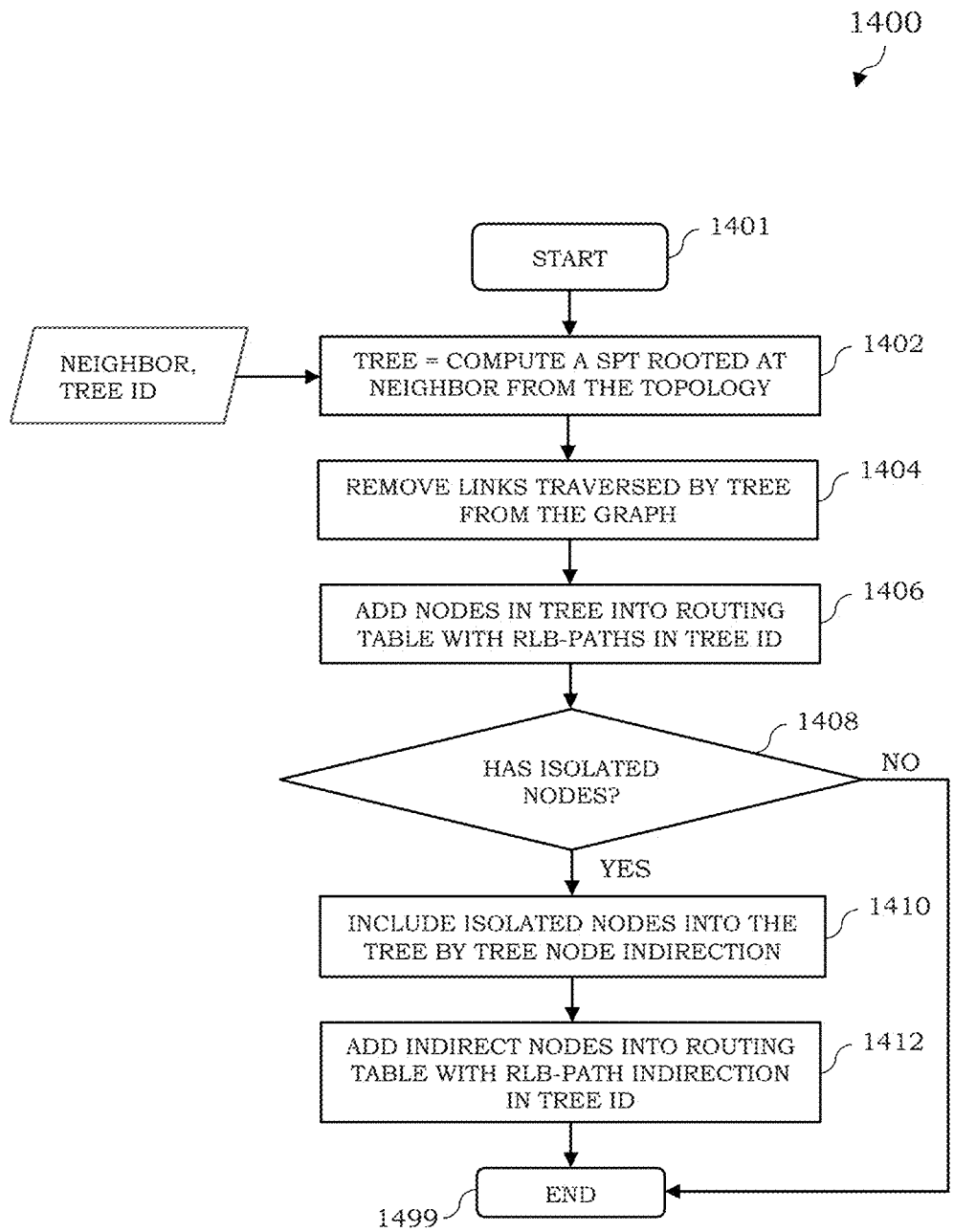

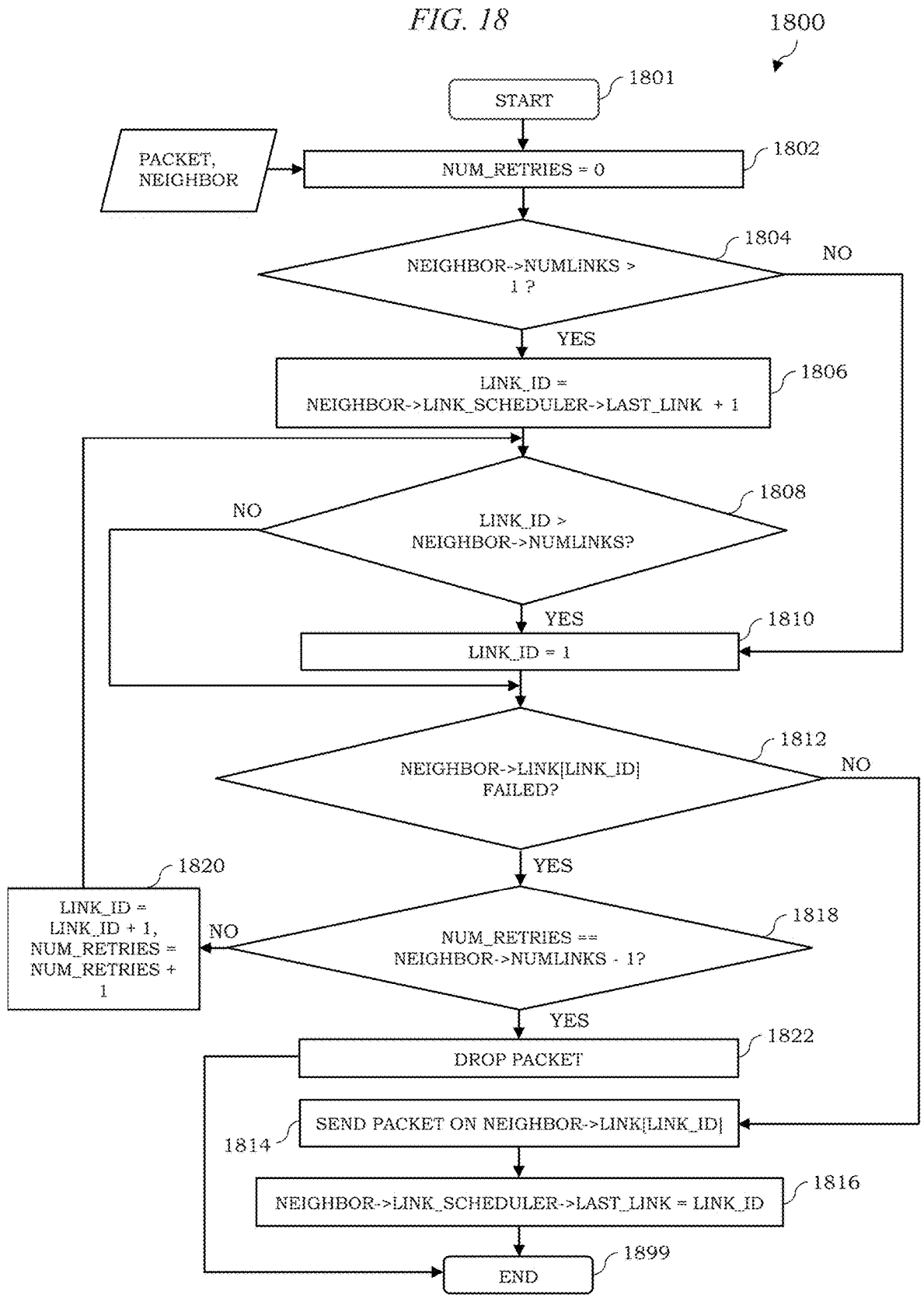

*FIG. 20*

| DESTINATION | TREE ID | RLB-PATH | NEIGHBOR | COST |
|---|---|---|---|---|
| IP-A/32 | NONE | NONE | LOCAL | 0 |
| IP-B/32 | 1 | EMPTY | IP-B | 1 |
|  | 2 | {IP-B} | IP-C | 4 |
| IP-C/32 | 1 | {IP-C} | IP-B | 2 |
|  | 2 | EMPTY | IP-C | 3 |
| IP-D/32 | 1 | {IP-D} | IP-B | 3 |
|  | 2 | {IP-D} | IP-C | 8 |
| IP-E/32 | 1 | {IP-E} | IP-B | 2 |
|  | 2 | {IP-E} | IP-C | 5 |
| IP-F/32 | 1 | {IP-D, IP-F} | IP-B | 5 |
|  | 2 | {IP-E, IP-F} | IP-C | 9 |
| IP-G/32 | 1 | {IP-E, IP-G} | IP-B | 4 |
|  | 2 | {IP-E, IP-F, IP-G} | IP-C | 11 |
| IP-H/32 | 1 | {IP-D, IP-F, IP-H} | IP-B | 7 |
|  | 2 | {IP-E, IP-F, IP-G, IP-H} | IP-C | 14 |
| IP-I/32 | 1 | {IP-E, IP-G, IP-I} | IP-B | 5 |
|  | 2 | {IP-E, IP-F, IP-G} | IP-C | INDIRECT |
| IP-J/32 | 1 | {IP-E, IP-G, IP-I, IP-J} | IP-B | 6 |
|  | 2 | {IP-E, IP-F, IP-G} | IP-C | INDIRECT |
| IP-K/32 | 1 | {IP-E, IP-G, IP-I, IP-K} | B | 6 |
|  | 2 | {IP-E, IP-F, IP-G} | C | INDIRECT |
| IP-L/32 | 1 | {IP-E, IP-G, IP-I, IP-J, IP-L} | B | 7 |
|  | 2 | {IP-E, IP-F, IP-G} | C | INDIRECT |
| IP-M/32 | 1 | {IP-E, IP-G, IP-I, IP-K, IP-M} | B | 7 |
|  | 2 | {IP-E, IP-F, IP-G} | C | INDIRECT |

FIG. 21A

FTN 2110 

| FEC | NHLFE | | | |
|---|---|---|---|---|
| | TREE ID | RLB-PATH | NEIGHBOR | COST |
| IP-B/32 | 1 | EMPTY | B | 1 |
| | 2 | {LB-B} | C | 4 |
| IP-C/32 | 1 | {LC-C} | B | 2 |
| | 2 | EMPTY | C | 3 |
| IP-D/32 | 1 | {LD-B} | B | 3 |
| | 2 | {LD-C} | C | 8 |
| IP-E/32 | 1 | {LE-B} | B | 2 |
| | 2 | {LE-C} | C | 5 |
| IP-F/32 | 1 | {LD-B, LF-D} | B | 5 |
| | 2 | {LE-C, LF-E} | C | 9 |
| IP-G/32 | 1 | {LE-B, LG-E} | B | 4 |
| | 2 | {LE-C, LF-E, LG-F} | C | 11 |
| IP-H/32 | 1 | {LD-B, LF-D, LH-F} | B | 7 |
| | 2 | {LE-C, LF-E, LG-F, LH-G} | C | 14 |
| IP-I/32 | 1 | {LE-B, LG-E, LI-G} | B | 5 |
| | 2 | {LE-C, LF-E, LG-F} | C | INDIRECT |
| IP-J/32 | 1 | {LE-B, LG-E, LI-G, LJ-I} | B | 6 |
| | 2 | {LE-C, LF-E, LG-F} | C | INDIRECT |
| IP-K/32 | 1 | {LE-B, LG-E, LI-G, LK-I} | B | 6 |
| | 2 | {LE-C, LF-E, LG-F} | C | INDIRECT |
| IP-L/32 | 1 | {LE-B, LG-E, LI-G, LJ-I, LL-J} | B | 7 |
| | 2 | {LE-C, LF-E, LG-F} | C | INDIRECT |
| IP-M/32 | 1 | {LE-B, LG-E, LI-G, LK-I, LM-K} | B | 7 |
| | 2 | {LE-C, LF-E, LG-F} | C | INDIRECT |

*FIG. 21B*

ILM TABLE
2120

| LABEL | NHLFE ||||
| | TREE ID | RLB-PATH | NEIGHBOR | COST |
|---|---|---|---|---|
| LA-A | 0 | LOCAL (FEC = IP-A/32) | NONE | 0 |
| LB-A | 1 | EMPTY | B | 1 |
|  | 2 | {LB-B} | C | 4 |
| LC-A | 1 | {LC-C} | B | 2 |
|  | 2 | EMPTY | C | 3 |
| LD-A | 1 | {LD-B} | B | 3 |
|  | 2 | {LD-C} | C | 8 |
| LE-A | 1 | {LE-B} | B | 2 |
|  | 2 | {LE-C} | C | 5 |
| LF-A | 1 | {LD-B, LF-D} | B | 5 |
|  | 2 | {LE-C, LF-E} | C | 9 |
| LG-A | 1 | {LE-B, LG-E} | B | 4 |
|  | 2 | {LE-C, LF-E, LG-F} | C | 11 |
| LH-A | 1 | {LD-B, LF-D, LH-F} | B | 7 |
|  | 2 | {LE-C, LF-E, LG-F, LH-G} | C | 14 |
| LI-A | 1 | {LE-B, LG-E, LI-G} | B | 5 |
|  | 2 | {LE-C, LF-E, LG-F} | C | INDIRECT |
| LJ-A | 1 | {LE-B, LG-E, LI-G, LJ-I} | B | 6 |
|  | 2 | {LE-C, LF-E, LG-F} | C | INDIRECT |
| LK-A | 1 | {LE-B, LG-E, LI-G, LK-I} | B | 6 |
|  | 2 | {LE-C, LF-E, LG-F} | C | INDIRECT |
| LL-A | 1 | {LE-B, LG-E, LI-G, LJ-I, LL-J} | B | 7 |
|  | 2 | {LE-C, LF-E, LG-F} | C | INDIRECT |
| LM-A | 1 | {LE-B, LG-E, LI-G, LK-I, LM-K} | B | 7 |
|  | 2 | {LE-C, LF-E, LG-F} | C | INDIRECT |

| DESTINATION | TREE ID | RLB-PATH | NEIGHBOR | COST |
|---|---|---|---|---|
| M-A | NONE | NONE | LOCAL | 0 |
| M-B | 1 | EMPTY | B | 1 |
| | 2 | {M-B} | C | 4 |
| M-C | 1 | {M-C} | B | 2 |
| | 2 | EMPTY | C | 3 |
| M-D | 1 | {M-D} | B | 3 |
| | 2 | {M-D} | C | 8 |
| M-E | 1 | {M-E} | B | 2 |
| | 2 | {M-E} | C | 5 |
| M-F | 1 | {M-D, M-F} | B | 5 |
| | 2 | {M-E, M-F} | C | 9 |
| M-G | 1 | {M-E, M-G} | B | 4 |
| | 2 | {M-E, M-F, M-G} | C | 11 |
| M-H | 1 | {M-D, M-F, M-H} | B | 7 |
| | 2 | {M-E, M-F, M-G, M-H} | C | 14 |
| M-I | 1 | {M-E, M-G, M-I} | B | 5 |
| | 2 | {M-E, M-F, M-G} | C | INDIRECT |
| M-J | 1 | {M-E, M-G, M-I, M-J} | B | 6 |
| | 2 | {M-E, M-F, M-G} | C | INDIRECT |
| M-K | 1 | {M-E, M-G, M-I, M-K} | B | 6 |
| | 2 | {M-E, M-F, M-G} | C | INDIRECT |
| M-L | 1 | {M-E, M-G, M-I, M-J, M-L} | B | 7 |
| | 2 | {M-E, M-F, M-G} | C | INDIRECT |
| M-M | 1 | {M-E, M-G, M-I, M-K, M-M} | B | 7 |
| | 2 | {M-E, M-F, M-G} | C | INDIRECT |

LOAD BALANCING IN PACKET SWITCHED NETWORKS

TECHNICAL FIELD

Various example embodiments relate generally to communication systems and, more particularly but not exclusively, to supporting load balancing in packet switched networks.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the respective maximally disjoint trees are mutually exclusive between the maximally disjoint trees. In at least some example embodiments, the set of maximally disjoint trees includes all maximally disjoint trees permissible by a network topology of a network including the load balancing node and the destination node. In at least some example embodiments, the set of maximally disjoint trees includes a subset of all maximally disjoint trees permissible by a network topology of a network including the load balancing node and the destination node. In at least some example embodiments, each of the maximally disjoint trees includes at least one of at least one logical link or at least one physical link. In at least some example embodiments, for each of the maximally disjoint trees, the respective maximally disjoint tree is rooted at a neighbor node of the load balancing node. In at least some example embodiments, each of the maximally disjoint trees is rooted at the load balancing node. In at least some example embodiments, to support the load balancing of packets from the load balancing node to the destination node, the set of instructions is configured to, when executed by the at least one processor, cause the apparatus to compute, based on network topology information for a network including the load balancing node and the destination node, the set of maximally disjoint trees. In at least some example embodiments, to compute the set of maximally disjoint trees, the set of instructions is configured to, when executed by the at least one processor, cause the apparatus to determine, based on the network topology information, a topology graph that excludes the load balancing node and compute, for each of one or more neighbor nodes of the load balancing node based on the topology graph, a respective set of maximally disjoint trees rooted at the respective neighbor node. In at least some example embodiments, when the load balancing node has multiple neighbor nodes, the neighbor nodes are considered in a round robin manner for computing the respective sets of maximally disjoint trees rooted at the respective neighbor nodes. In at least some example embodiments, the maximally disjoint trees rooted at the respective neighbor nodes are extended from the respective neighbor nodes to the load balancing node by joining adjacent links between the respective neighbor nodes and the load balancing node. In at least some example embodiments, to compute the set of maximally disjoint trees, the set of instructions is configured to, when executed by the at least one processor, cause the apparatus to determine, based on the network topology information, a topology graph and compute the set of maximally disjoint trees while including one adjacent link of the load balancing node at a time into the topology graph. In at least some example embodiments, to compute the set of maximally disjoint trees, the set of instructions is configured to, when executed by the at least one processor, cause the apparatus to separate the network topology into a set of sub-topologies based on assignment of a sub-topology identifier to each link in the network topology, include, for each of at least one node, a set of adjacent links of the respective node in a mix of sub-topologies based on assignment of different colors, and compute the set of maximally disjoint trees based on computing, for each of the at least one node, maximally disjoint trees for each of the colors in the adjacent links of the respective node. In at least some example embodiments, to compute the set of maximally disjoint trees, the set of instructions is configured to, when executed by the at least one processor, cause the apparatus to compute, for each node of the network based on the network topology information, a respective set of maximally disjoint trees from the respective node using the respective node as a root. In at least some example embodiments, the load balancing of packets includes a per-flow load balancing, a per-packet load balancing, or a randomized load balancing. In at least some example embodiments, the load balancing of packets is a randomized load balancing of the packets across the paths independent of any characteristics of the packets. In at least some example embodiments, the load balancing of packets is based on a scheduling scheme in which packets are distributed across the paths in a round robin manner. In at least some example embodiments, one of the maximally disjoint trees includes a logical link representing a logical association between a node and a next-hop node irrespective of a number of physical links between the node and the next-hop node. In at least some example embodiments, based on a determination that there are multiple physical links associated with the logical link, a scheduling scheme distributes packets to the next-hop node using the multiple physical links in a round robin manner. In at least some example embodiments, during the load balancing of packets from the load balancing node to the destination node, a packet is sent to the destination node using one of the paths based on encoding, into the packet, an explicit path to the destination node in the one of the paths. In at least some example embodiments, to support the load balancing of packets from the load balancing node to the destination node, the set of instructions is configured to, when executed by the at least one processor, cause the apparatus to compute, by the load balancing node, the set of maximally disjoint trees, determine, by the load balancing node, configuration information associated with the set of maximally disjoint trees, and send, by the load balancing node toward the destination node based on the configuration information, the packets. In at least some example embodiments, to support the load balancing of packets from the load balancing node to the destination node, the set of instructions is configured to, when executed by the at least one processor, cause the apparatus to receive, by the load balancing node, configuration information associated with the set of maximally disjoint trees and send, by the load balancing node toward the destination node based on the configuration information, the packets. In at least some example embodiments, to support the load balancing of packets from the load balancing node to the destination node, the set of instructions is configured to, when executed by the at least one processor, cause the apparatus to compute, by a controller, the set of maximally disjoint trees and provide, by the controller toward the load balancing node, configuration information associated with maximally disjoint trees.

In at least some example embodiments, a non-transitory computer-readable medium stores a set of instructions configured to cause an apparatus to support a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the respective maximally disjoint trees are mutually exclusive between the maximally disjoint trees. In at least some example embodiments, the set of maximally disjoint trees includes all maximally disjoint trees permissible by a network topology of a network including the load balancing node and the destination node. In at least some example embodiments, the set of maximally disjoint trees includes a subset of all maximally disjoint trees permissible by a network topology of a network including the load balancing node and the destination node. In at least some example embodiments, each of the maximally disjoint trees includes at least one of at least one logical link or at least one physical link. In at least some example embodiments, for each of the maximally disjoint trees, the respective maximally disjoint tree is rooted at a neighbor node of the load balancing node. In at least some example embodiments, each of the maximally disjoint trees is rooted at the load balancing node. In at least some example embodiments, to support the load balancing of packets from the load balancing node to the destination node, the set of instructions is configured to cause the apparatus to compute, based on network topology information for a network including the load balancing node and the destination node, the set of maximally disjoint trees. In at least some example embodiments, to compute the set of maximally disjoint trees, the set of instructions is configured to cause the apparatus to determine, based on the network topology information, a topology graph that excludes the load balancing node and compute, for each of one or more neighbor nodes of the load balancing node based on the topology graph, a respective set of maximally disjoint trees rooted at the respective neighbor node. In at least some example embodiments, when the load balancing node has multiple neighbor nodes, the neighbor nodes are considered in a round robin manner for computing the respective sets of maximally disjoint trees rooted at the respective neighbor nodes. In at least some example embodiments, the maximally disjoint trees rooted at the respective neighbor nodes are extended from the respective neighbor nodes to the load balancing node by joining adjacent links between the respective neighbor nodes and the load balancing node. In at least some example embodiments, to compute the set of maximally disjoint trees, the set of instructions is configured to cause the apparatus to determine, based on the network topology information, a topology graph and compute the set of maximally disjoint trees while including one adjacent link of the load balancing node at a time into the topology graph. In at least some example embodiments, to compute the set of maximally disjoint trees, the set of instructions is configured to cause the apparatus to separate the network topology into a set of sub-topologies based on assignment of a sub-topology identifier to each link in the network topology, include, for each of at least one node, a set of adjacent links of the respective node in a mix of sub-topologies based on assignment of different colors, and compute the set of maximally disjoint trees based on computing, for each of the at least one node, maximally disjoint trees for each of the colors in the adjacent links of the respective node. In at least some example embodiments, to compute the set of maximally disjoint trees, the set of instructions is configured to cause the apparatus to compute, for each node of the network based on the network topology information, a respective set of maximally disjoint trees from the respective node using the respective node as a root. In at least some example embodiments, the load balancing of packets includes a per-flow load balancing, a per-packet load balancing, or a randomized load balancing. In at least some example embodiments, the load balancing of packets is a randomized load balancing of the packets across the paths independent of any characteristics of the packets. In at least some example embodiments, the load balancing of packets is based on a scheduling scheme in which packets are distributed across the paths in a round robin manner. In at least some example embodiments, one of the maximally disjoint trees includes a logical link representing a logical association between a node and a next-hop node irrespective of a number of physical links between the node and the next-hop node. In at least some example embodiments, based on a determination that there are multiple physical links associated with the logical link, a scheduling scheme distributes packets to the next-hop node using the multiple physical links in a round robin manner. In at least some example embodiments, during the load balancing of packets from the load balancing node to the destination node, a packet is sent to the destination node using one of the paths based on encoding, into the packet, an explicit path to the destination node in the one of the paths. In at least some example embodiments, to support the load balancing of packets from the load balancing node to the destination node, the set of instructions is configured to cause the apparatus to compute, by the load balancing node, the set of maximally disjoint trees, determine, by the load balancing node, configuration information associated with the set of maximally disjoint trees, and send, by the load balancing node toward the destination node based on the configuration information, the packets. In at least some example embodiments, to support the load balancing of packets from the load balancing node to the destination node, the set of instructions is configured to cause the apparatus to receive, by the load balancing node, configuration information associated with the set of maximally disjoint trees and send, by the load balancing node toward the destination node based on the configuration information, the packets. In at least some example embodiments, to support the load balancing of packets from the load balancing node to the destination node, the set of instructions is configured to cause the apparatus to compute, by a controller, the set of maximally disjoint trees and provide, by the controller toward the load balancing node, configuration information associated with maximally disjoint trees.

In at least some example embodiments, a method includes supporting a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the respective maximally disjoint trees are mutually exclusive between the maximally disjoint trees. In at least some example embodiments, the set of maximally disjoint trees includes all maximally disjoint trees permissible by a network topology of a network including the load balancing node and the destination node. In at least some example embodiments, the set of maximally disjoint trees includes a subset of all maximally disjoint trees permissible by a network topology of a network including the load balancing node and the destination node. In at least some example embodiments, each of the maximally disjoint trees includes at least one of at least one logical link or at least one physical link. In at least some example embodiments, for each of the maximally disjoint trees, the respective maximally disjoint tree is rooted at a neighbor node of the load balancing node. In at least some example embodiments, each of the maximally disjoint trees is rooted at the load balancing node. In at least some example embodiments, supporting the load balancing of packets from the load balancing node to the destination node includes computing, based on network topology information for a network including the load balancing node and the destination node, the set of maximally disjoint trees. In at least some example embodiments, computing the set of maximally disjoint trees includes determining, based on the network topology information, a topology graph that excludes the load balancing node and computing, for each of one or more neighbor nodes of the load balancing node based on the topology graph, a respective set of maximally disjoint trees rooted at the respective neighbor node. In at least some example embodiments, when the load balancing node has multiple neighbor nodes, the neighbor nodes are considered in a round robin manner for computing the respective sets of maximally disjoint trees rooted at the respective neighbor nodes. In at least some example embodiments, the maximally disjoint trees rooted at the respective neighbor nodes are extended from the respective neighbor nodes to the load balancing node by joining adjacent links between the respective neighbor nodes and the load balancing node. In at least some example embodiments, computing the set of maximally disjoint trees includes determining, based on the network topology information, a topology graph and computing the set of maximally disjoint trees while including one adjacent link of the load balancing node at a time into the topology graph. In at least some example embodiments, computing the set of maximally disjoint trees includes separating the network topology into a set of sub-topologies based on assignment of a sub-topology identifier to each link in the network topology, including, for each of at least one node, a set of adjacent links of the respective node in a mix of sub-topologies based on assignment of different colors, and computing the set of maximally disjoint trees based on computing, for each of the at least one node, maximally disjoint trees for each of the colors in the adjacent links of the respective node. In at least some example embodiments, computing the set of maximally disjoint trees includes computing, for each node of the network based on the network topology information, a respective set of maximally disjoint trees from the respective node using the respective node as a root. In at least some example embodiments, the load balancing of packets includes a per-flow load balancing, a per-packet load balancing, or a randomized load balancing. In at least some example embodiments, the load balancing of packets is a randomized load balancing of the packets across the paths independent of any characteristics of the packets. In at least some example embodiments, the load balancing of packets is based on a scheduling scheme in which packets are distributed across the paths in a round robin manner. In at least some example embodiments, one of the maximally disjoint trees includes a logical link representing a logical association between a node and a next-hop node irrespective of a number of physical links between the node and the next-hop node. In at least some example embodiments, based on a determination that there are multiple physical links associated with the logical link, a scheduling scheme distributes packets to the next-hop node using the multiple physical links in a round robin manner. In at least some example embodiments, during the load balancing of packets from the load balancing node to the destination node, a packet is sent to the destination node using one of the paths based on encoding, into the packet, an explicit path to the destination node in the one of the paths. In at least some example embodiments, supporting the load balancing of packets from the load balancing node to the destination node includes computing, by the load balancing node, the set of maximally disjoint trees, determining, by the load balancing node, configuration information associated with the set of maximally disjoint trees, and sending, by the load balancing node toward the destination node based on the configuration information, the packets. In at least some example embodiments, supporting the load balancing of packets from the load balancing node to the destination node includes receiving, by the load balancing node, configuration information associated with the set of maximally disjoint trees and sending, by the load balancing node toward the destination node based on the configuration information, the packets. In at least some example embodiments, supporting the load balancing of packets from the load balancing node to the destination node includes computing, by a controller, the set of maximally disjoint trees and providing, by the controller toward the load balancing node, configuration information associated with maximally disjoint trees.

In at least some example embodiments, an apparatus includes means for supporting a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the respective maximally disjoint trees are mutually exclusive between the maximally disjoint trees. In at least some example embodiments, the set of maximally disjoint trees includes all maximally disjoint trees permissible by a network topology of a network including the load balancing node and the destination node. In at least some example embodiments, the set of maximally disjoint trees includes a subset of all maximally disjoint trees permissible by a network topology of a network including the load balancing node and the destination node. In at least some example embodiments, each of the maximally disjoint trees includes at least one of at least one logical link or at least one physical link. In at least some example embodiments, for each of the maximally disjoint trees, the respective maximally disjoint tree is rooted at a neighbor node of the load balancing node. In at least some example embodiments, each of the maximally disjoint trees is rooted at the load balancing node. In at least some example embodiments, the means for supporting the load balancing of packets from the load balancing node to the destination node includes means for computing, based on network topology information for a network including the load balancing node and the destination node, the set of maximally disjoint trees. In at least some example embodiments, the means for computing the set of maximally disjoint trees includes means for determining, based on the network topology information, a topology graph that excludes the load balancing node and means for computing, for each of one or more neighbor nodes of the load balancing node based on the topology graph, a respective set of maximally disjoint trees rooted at the respective neighbor node. In at least some example embodiments, when the load balancing node has multiple neighbor nodes, the neighbor nodes are considered in a round robin manner for computing the respective sets of maximally disjoint trees rooted at the respective neighbor nodes. In at least some example embodiments, the maximally disjoint trees rooted at the respective neighbor nodes are extended from the respective neighbor nodes to the load balancing node by joining adjacent links between the respective neighbor nodes and the load balancing node. In at least some example embodiments, the means for computing the set of maximally disjoint trees includes means for determining, based on the network topology information, a topology graph and means for computing the set of maximally disjoint trees while including one adjacent link of the load balancing node at a time into the topology graph. In at least some example embodiments, the means for computing the set of maximally disjoint trees includes means for separating the network topology into a set of sub-topologies based on assignment of a sub-topology identifier to each link in the network topology, means for including, for each of at least one node, a set of adjacent links of the respective node in a mix of sub-topologies based on assignment of different colors, and means for computing the set of maximally disjoint trees based on computing, for each of the at least one node, maximally disjoint trees for each of the colors in the adjacent links of the respective node. In at least some example embodiments, the means for computing the set of maximally disjoint trees includes means for computing, for each node of the network based on the network topology information, a respective set of maximally disjoint trees from the respective node using the respective node as a root. In at least some example embodiments, the load balancing of packets includes a per-flow load balancing, a per-packet load balancing, or a randomized load balancing. In at least some example embodiments, the load balancing of packets is a randomized load balancing of the packets across the paths independent of any characteristics of the packets. In at least some example embodiments, the load balancing of packets is based on a scheduling scheme in which packets are distributed across the paths in a round robin manner. In at least some example embodiments, one of the maximally disjoint trees includes a logical link representing a logical association between a node and a next-hop node irrespective of a number of physical links between the node and the next-hop node. In at least some example embodiments, based on a determination that there are multiple physical links associated with the logical link, a scheduling scheme distributes packets to the next-hop node using the multiple physical links in a round robin manner. In at least some example embodiments, during the load balancing of packets from the load balancing node to the destination node, a packet is sent to the destination node using one of the paths based on encoding, into the packet, an explicit path to the destination node in the one of the paths. In at least some example embodiments, the means for supporting the load balancing of packets from the load balancing node to the destination node includes means for computing, by the load balancing node, the set of maximally disjoint trees, means for determining, by the load balancing node, configuration information associated with the set of maximally disjoint trees, and means for sending, by the load balancing node toward the destination node based on the configuration information, the packets. In at least some example embodiments, the means for supporting the load balancing of packets from the load balancing node to the destination node includes means for receiving, by the load balancing node, configuration information associated with the set of maximally disjoint trees and means for sending, by the load balancing node toward the destination node based on the configuration information, the packets. In at least some example embodiments, the means for supporting the load balancing of packets from the load balancing node to the destination node includes means for computing, by a controller, the set of maximally disjoint trees and means for providing, by the controller toward the load balancing node, configuration information associated with maximally disjoint trees.

BRIEF DESCRIPTION OF THE DRAWINGS

The teachings herein can be readily understood by considering the following detailed description in conjunction with the accompanying drawings, in which:

FIG. 3A depicts an example of a shortest path tree computed by one of the nodes of the packet switched network of FIG. 2;

FIG. 3B depicts an example of the routing table at one of the nodes of the packet switched network of FIG. 2 based on the shortest path tree of FIG. 3A;

FIG. 5 depicts an example embodiment of a directed topology graph for the packet switched network of FIG. 2;

FIG. 9 depicts an example of a packet switched network for illustrating routing of packets based on RLB;

FIG. 12 depicts an example embodiment of a Gateway Resolution algorithm which may be used to support tree node indirection during computation of maximally disjoint trees;

FIG. 14 depicts an example embodiment of a method for use by a node to compute a maximally disjoint tree from a neighbor of the node;

FIG. 18 depicts an example embodiment of a method for use by a node to send a packet to a neighbor for a chosen tree;

FIG. 20 depicts an example embodiment of an IP Route Table of one of the nodes of the topology graph of FIG. 9;

FIG. 21A depicts an example embodiment of an FTN Table for one of the nodes of the topology graph of FIG. 9 when the network of FIG. 9 is an MPLS network;

FIG. 21B depicts an example embodiment of an ILM Table for one of the nodes of the topology graph of FIG. 9 when the network of FIG. 9 is an MPLS network;

FIG. 22 depicts an example embodiment of a MAC forwarding table for one of the nodes of the topology graph of FIG. 9 when the network of FIG. 9 is an SPB-based Ethernet network;

To facilitate understanding, identical reference numerals have been used herein, wherever possible, in order to designate identical elements that are common among the various figures.

DETAILED DESCRIPTION

Figure 1:
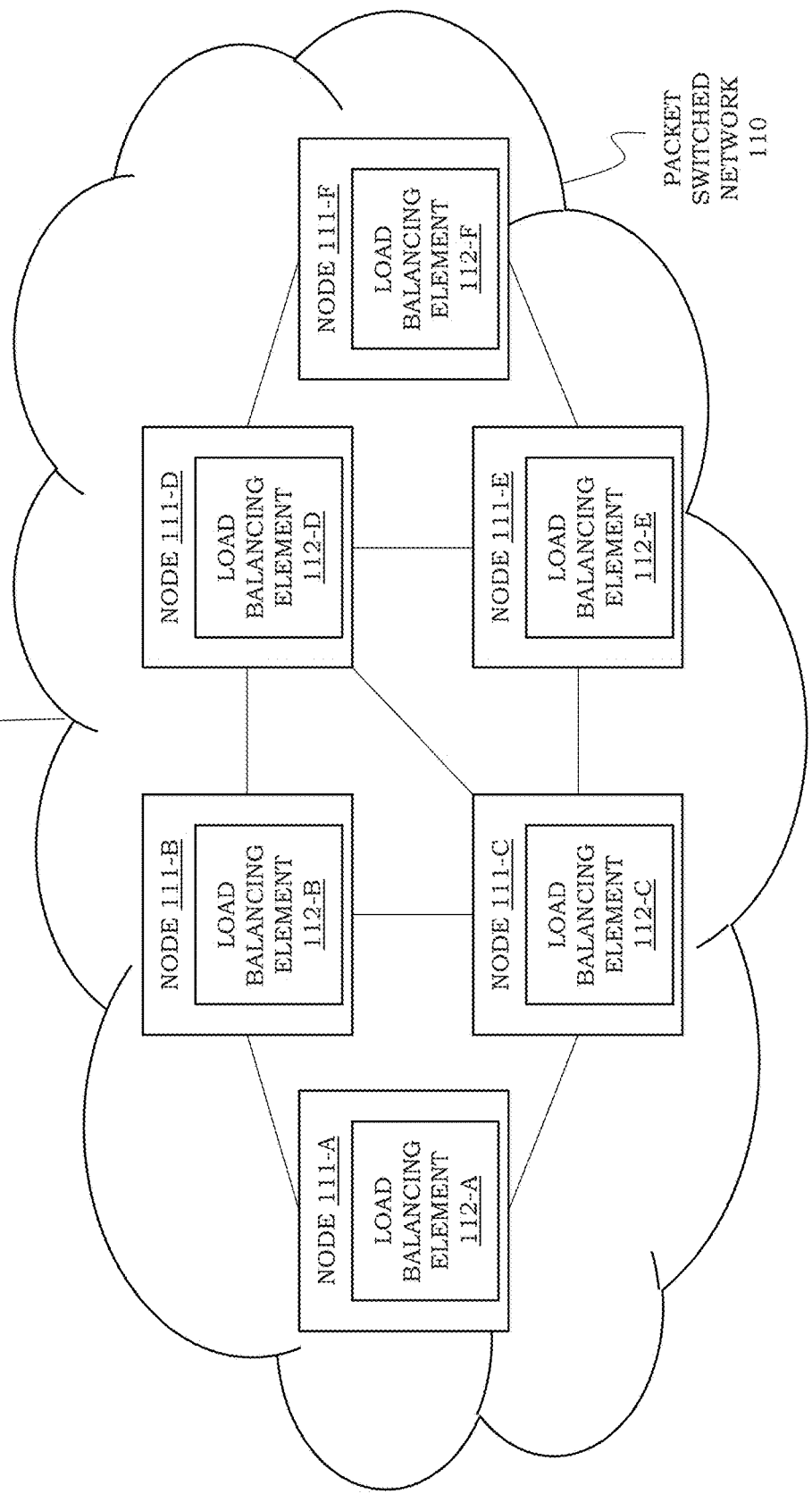
FIG. 1 depicts an example embodiment of a communication system configured to support load balancing in a packet switched network based on use of maximally disjoint trees.

Various example embodiments for supporting load balancing in packet switched networks are presented herein. Various example embodiments for supporting load balancing in packet switched networks may be configured to support load balancing in packet switched networks based on use of trees. Various example embodiments for supporting load balancing in packet switched networks may be configured to support load balancing in packet switched networks based on use of disjoint trees. Various example embodiments for supporting load balancing in packet switched networks may be configured to support load balancing in packet switched networks based on use of maximally disjoint trees. Various example embodiments for supporting load balancing in packet switched networks based on use of maximally disjoint trees may be configured to supporting load balancing from a load balancing node to a destination node in a packet switched network based on use of maximally disjoint trees. Various example embodiments for supporting load balancing from a load balancing node to a destination node in a packet switched network based on use of maximally disjoint trees may be configured to support load balancing from the load balancing node to the destination node by computing, for the load balancing node, a set of maximally disjoint trees (e.g., where the maximally disjoint trees computed for the load balancing node may include maximally disjoint trees from the load balancing node to the destination node (e.g., maximally disjoint trees for which the load balancing node is the root of the maximally disjoint trees), maximally disjoint trees that traverse the destination node (e.g., maximally disjoint trees for which the load balancing node is the root of the maximally disjoint trees, maximally disjoint trees rooted at neighbor nodes of the load balancing node which may then be extended to the load balancing node using adjacent links between the neighbor nodes and the load balancing node, or the like), or the like, as well as various combinations thereof) and enabling the load balancing node to load balance packets to the destination node over a set of paths (e.g., maximally disjoint paths) available from the maximally disjoint trees. It will be appreciated that, where the set of maximally disjoint trees for the load balancing node includes all possible maximally disjoint trees for the load balancing node, the load balancing node will be able to load balance over all possible maximally disjoint paths from the load balancing node to the destination node. Various example embodiments for supporting load balancing in packet switched networks based on use of maximally disjoint trees may be supported by a management system (e.g., computing the set of maximally disjoint trees for a load balancing node and configuring the load balancing node with configuration information to enable the load balancing node to load balance packets across the maximally disjoint paths), a load balancing node (e.g., computing the set of maximally disjoint trees and using the set of maximally disjoint trees to load balance packets across the maximally disjoint paths), or the like. Various example embodiments for supporting load balancing in packet switched networks based on use of maximally disjoint trees may be configured to support load balancing in packet switched networks using per-flow load balancing, per-packet load balancing, randomized load balancing (RLB), or the like, as well as various combinations thereof. It will be appreciated that these and various other example embodiments and advantages or potential advantages of supporting load balancing in packet switched networks may be further understood by way of reference to the various figures, which are discussed further below.

FIG. 1 depicts an example embodiment of a communication system configured to support load balancing in a packet switched network based on use of maximally disjoint trees.

The communication system 100 includes a packet switched network 110 and a controller 120. The packet switched network 110 may be configured to support communication of packets and the controller 120 is configured to provide control functions for supporting communication of packets by the packet switched network 110. The packet switched network 110 includes a set of nodes 111-A-111-F (collectively, nodes 111) configured to support communication of packets. For example, the nodes 111 may include routers, switches, or the like, as well as various combinations thereof. It will be appreciated that the packet switched network 110 may include fewer or more nodes 111 which may be arranged in various other topologies. The controller 120 is configured to support communication of packets by the nodes 111 of the packet switched network 110. For example, the controller may be a network management system (NMS), a software defined networking (SDN) controller, or the like, as well as various combinations thereof. It will be appreciated that the packet switched network 110 may be controlled by more than one controller 120.

The communication system 100 may be configured to support load balancing of packets in the packet switched network 110. The communication system 100 may be configured to support load balancing of packets sent by the nodes 111 of the packet switched network 110. The communication system 100 may be configured to support load balancing of packets sent by the nodes 111 of the packet switched network 110 based on configuration of the nodes 111 to support load balancing of packets sent by the nodes 111 of the packet switched network 110 (e.g., based on load balancing elements 112-A-112-F (collectively, load balancing elements 112) on the nodes 111-A-111-F, respectively, which are configured to support various functions in support of load balancing as presented herein). The communication system 100 may be configured to support load balancing of packets sent by the nodes 111 of the packet switched network 110 based on configuration of the controller 120 to support load balancing of packets sent by the nodes 111 of the packet switched network 110 (e.g., based on a load balancing element 122 on the controller 120, which is configured to support various functions in support of load balancing as presented herein).

The communication system 100 may be configured to support load balancing of packets in the packet switched network 110 based on trees, such as based on use of paths determined based on the trees. The communication system 100 may be configured to support load balancing of packets in the packet switched network 110 based on disjoint trees, such as based on use of paths (e.g., disjoint paths) determined based on the disjoint trees. The communication system 100 may be configured to support load balancing of packets in the packet switched network 110 based on maximally disjoint trees, such as based on use of paths (e.g., maximally disjoint paths) determined based on the maximally disjoint trees. The communication system 100 may be configured to support load balancing of packets in the packet switched network 110 based on maximally disjoint trees where maximally disjoint means that the links included by the disjoint trees are mutually exclusive between the disjoint trees. The communication system 100 may be configured to support load balancing of packets in the packet switched network 110 based on use of maximally disjoint trees, e.g., based on load balancing of packets from a load balancing node 111 to a destination node 111 across paths (which may be maximally disjoint paths) determined based on maximally disjoint trees computed for the load balancing node 111, where the maximally disjoint trees computed for the load balancing node 111 may include maximally disjoint trees from the load balancing node 111 to the destination node 111 (e.g., maximally disjoint trees for which the load balancing node 111 is the root of the maximally disjoint trees), maximally disjoint trees that traverse the destination node 111 (e.g., maximally disjoint trees for which the load balancing node 111 is the root of the maximally disjoint trees, maximally disjoint trees rooted at neighbor nodes 111 of the load balancing node 111 which may then be extended to the load balancing node 111 using adjacent links between the neighbor nodes 111 and the load balancing node 111, or the like), or the like, as well as various combinations thereof. The communication system 100 may be configured to support load balancing of packets in the packet switched network 110, based on use of paths based on maximally disjoint trees, using equal cost multi-path (ECMP) where packets to a destination node are load balanced across paths of equal costs or unequal cost multi-path (UCMP) where packets to a destination node can be load balanced not only across paths of equal costs but also across paths of unequal cost where such unequal cost paths are available. The communication system 100 may be configured to support load balancing of packets in the packet switched network 110, based on use of paths based on maximally disjoint trees, using per-flow load balancing, per-packet load balancing, RLB, or the like, as well as various combinations thereof. It is noted that, in general, RLB may be considered to provide optimal utilization of network resources and maximization of network throughput, when routing packets to a specific destination, based on random distribution of packets across all possible maximally disjoint paths to the specific destination node.

The communication system 100 may be configured to support load balancing of packets sent by the nodes 111 of the packet switched network 110 using a centralized model or using a distributed model.

The communication system 100, as indicated above, may be configured to support load balancing of packets by the nodes 111 of the packet switched network 110 using a centralized model. In the centralized model, the controller 120 may determine the configuration information for configuring the nodes 111 to support load balancing and may provide the configuration information to the nodes 111 for configuring the nodes to support load balancing, and the nodes 111 may receive the configuration information from the controller 120 and use the configuration information to support load balancing. For example, the centralized model may be realized as follows. The controller 120 may maintain a topology database and a tree computation element. The nodes 111 may push the status of adjacent links and networks to the controller 120 and/or the controller 120 may pull the status of adjacent links and networks from the nodes 111 as needed or periodically. The push model can be implemented by Border Gateway Protocol-Link State (BGP-LS) running between the nodes 111 and the controller 120. The pull model can be implemented by a custom protocol between nodes 111 and the controller 120. The tree computation element computes the maximally disjoint trees for every node 111 based on a topology graph of the packet switched network 110 that is built from the topology database. The controller 120 then programs the routing tables at the nodes 111 with the path for each destination along the maximally disjoint trees computed on behalf of the nodes 111, respectively. The nodes 111 may then perform packet forwarding based on load balancing using the routing tables. It will be appreciated that the various elements of the communication system 100 may be configured to support various other functions in support of load balancing in the packet switched network 110 based on use of maximally disjoint trees, using a centralized model.

The communication system 100, as indicated above, may be configured to support load balancing of packets by the nodes 111 of the packet switched network 110 using a distributed model. In the distributed model, each of the nodes 111 in the packet switched network 110 builds a network topology database and uses the network topology database to compute maximally disjoint trees rooted at the nodes 111, respectively. The network topology databases at the nodes 111 may be built by having the nodes 111 flood state information, such as status of adjacent links and networks at the nodes 111, within the packet switched network 110 such that each of the nodes 111 receives the state information from other nodes 111 and can build a view of the topology of the packet switched network 110. For example, various Interior Gateway Protocols (IGPs) may be used for flooding state information for building the network topology databases at the nodes 111 in a distributed manner. For example, the distributed model may be realized as follows. In the packet switched network 110, each of the nodes 111 may host a topology database built based on the flooding of the topology information among the nodes 111 and a tree computation element configured to compute the maximally disjoint trees based on a topology graph of the packet switched network 110 that is built from the topology database at the node 111, respectively. The nodes 111 then program the routing tables at the nodes 111 with the path for each destination along the maximally disjoint trees computed on behalf of the nodes 111, respectively. The nodes 111 may then perform packet forwarding based on load balancing using the routing tables. It will be appreciated that the various elements of the communication system 100 may be configured to support various other functions in support of load balancing in the packet switched network 110, based on use of maximally disjoint trees, using a distributed model.

It will be appreciated that the communication system 100 may be configured to support load balancing of packets sent by the nodes 111 of the packet switched network 110 based on various other architectures, paradigms, techniques, functions, features, or the like, as well as various combinations thereof.

It will be appreciated that various example embodiments for supporting load balancing of packets in packet switched networks based on use of disjoint trees may be further understood by first considering various other routing paradigms.

Figure 2:
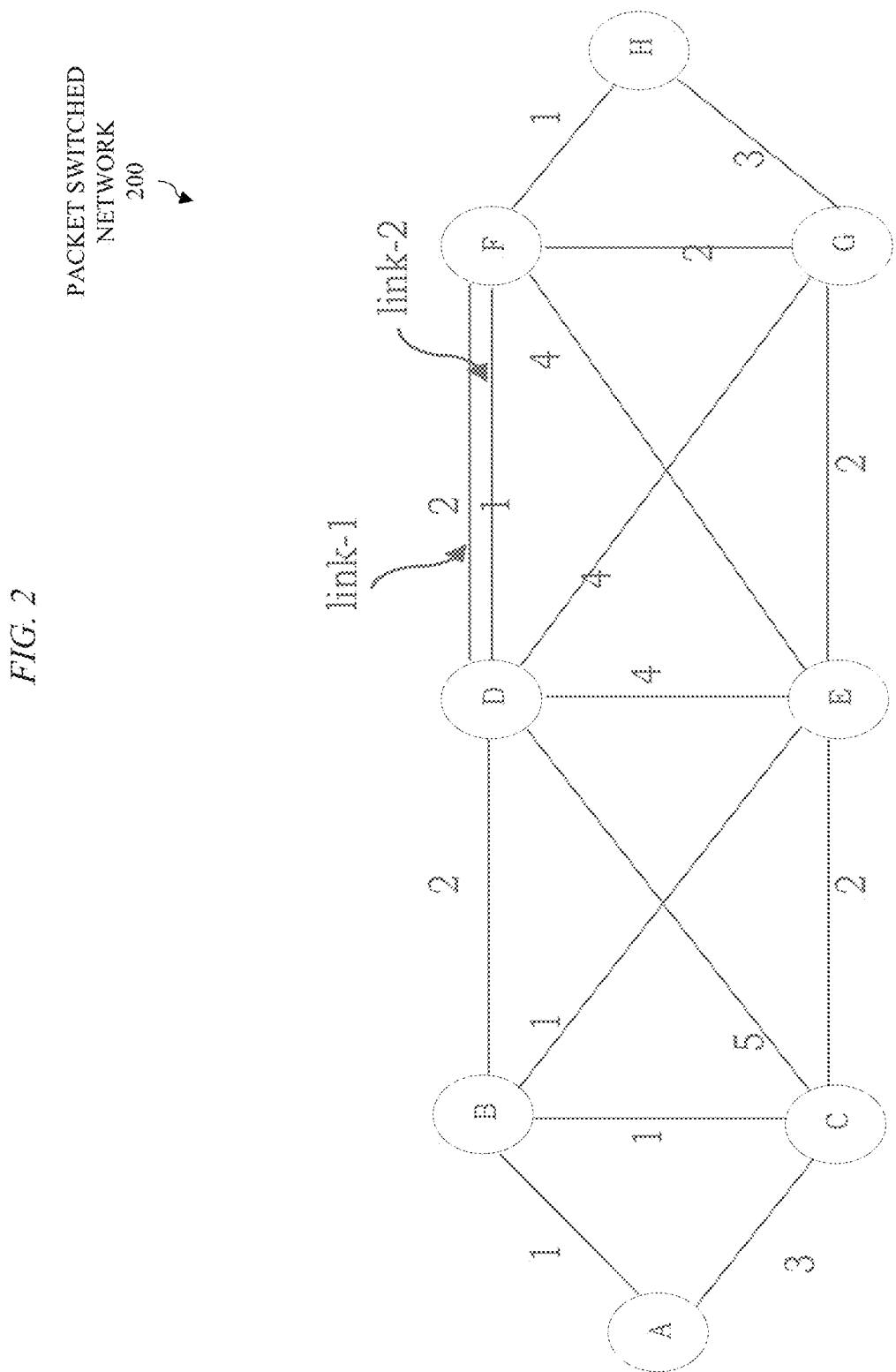
FIG. 2 depicts an example of a packet switched network for illustrating routing paradigms.

FIG. 2 depicts an example of a packet switched network for illustrating routing paradigms. The packet switched network 200 includes a set of nodes interconnected by a set of links. In the packet switched network 200, the set of nodes includes eight nodes which are labeled as nodes A, B, C, D, E, F, G, and H. In the packet switched network 200, a link from node X to Y is denoted as X→Y. If X has multiple links to Y, then first link is denoted as X1→Y1, the second link is denoted as X2→Y2, and so on. For example, nodes D and F have two links between them, so link-1 from D to F is denoted as D1→F1 and link-2 from D to F is denoted as D2→F2. In the packet switched network 200, various routing paradigms may be used to route packets between nodes, such as shortest path routing, explicit path routing, or the like, as well as various combinations thereof.

In shortest path routing, paths to destinations are computed by a Shortest Path Tree (SPT) algorithm, such as Dijkstra's Algorithm. A packet to a destination follows the shortest path to the destination along the network. It is possible that there could be multiple equal cost shortest paths to a destination. In that case, the packets to the destination are load balanced across all equal cost multiple paths (ECMP). The packets can be distributed across all ECMP paths in two ways: (1) flow-based load balancing or (2) per-packet load balancing.

In flow-based load balancing, the load balancing is performed by hashing certain fields in a packet header to choose the next-hop link from the set of ECMP links. Combination of such fields in a packet header are termed as a "flow" from the ECMP load balancing perspective. If a majority of the packets hash to the same next-hop, then it results is unfair load balancing in ECMP.

In per-packet load balancing, packets are distributed over the set of ECMP links in a round-robin fashion, so it guarantees fair load balancing. However, packet of a flow gets distributed over all ECMP links and such packets may get re-ordered as they reach their destination.

There could be several alternate paths to a destination with higher costs, which are not used to forward packets to the destination. Secondly, since all packets to a destination are forwarded along the shortest path, it could lead to congestion along the shortest path, while leaving all other possible alternate paths unutilized for packets to the destination. An example SPT computed by node A to reach all other nodes in the network is depicted in FIG. 3A.

For example, in IP networks, an Interior Gateway Protocol (IGP) running in every node/router floods status of its adjacent links and local networks across the network. Using this flooding mechanism, every router builds an identical topology database of the network. Then, the IGP at every router computes the IP routes to every other node (destination) using an SPT algorithm and builds its IP routing table. Since the routers compute the shortest paths using identical copies of the network topology, the paths computed by the nodes are "coherent", which means that a path from a router to a destination includes the paths from every transit router traversed by the path to the destination. For example, if a first router computes a first path that traverses a second router and a third router to a fourth router (that is the gateway to destination), the second router computes a third path that traverses the third router to the fourth router, and the third router computes a fourth path directly to the fourth router. Thus, the third path includes the fourth path, the second path includes the third path, and the first path includes the second path. In some cases, the path algorithm implemented at a router identifies multiple coherent paths that incur the same costs to convey packets between a source router and a destination router, which becomes the ECMP. Due to the coherency of paths to a destination across the network, every router makes independent decisions in forwarding a packet (along its computed path) based on destination of the packet and the packet gets delivered to the destination without any loop. For example, the IGP may be Open Shortest Path First (OSPF), Intermediate-System-to-Intermediate-System (IS-IS), OSPF version 3 (OSPFv3), or the like. So, routers within the IGP forward packets to respective destinations along the shortest path(s) to the destination. FIG. 3B depicts an example of the Routing Table at node A based on the SPT of FIG. 3A. In the case of IP networks, the destination entries in the table would be IP prefixes (e.g., the IP addresses of the nodes). In the example of FIG. 3A and FIG. 3B, assume that node A sends a packet to node H. A looks up its routing table for entry H and finds next-hop A→B. So, A sends the packet on A→B link. On receiving the packet, B looks up its routing table and forwards the packet on B→D link (as per the SPT computed by B). On receiving the packet, D looks up its routing table and forwards the packet on the D1→F1 link (as per the SPT computed by D). On receiving the packet, F looks up its routing table and forwards the packet on the F→H link (as per the SPT computed by F). On receiving the packet, H looks up its routing table and finds the next-hop as "Local", meaning itself, so the packet is delivered to its destination.

For example, in MPLS networks, the shortest path label switched paths (LSPs) to destinations may be set-up by Label Distribution Protocol (LDP) or Segment Routing (SR), which are based on the shortest path IP routes computed by the IGPs.

For example, in Shortest Path Bridging (SPB) based Ethernet networks, the shortest paths to various destination bridges are computed by IS-IS. Ethernet packets from a source bridge to a destination bridge are sent along the shortest path to the destination bridge.

In explicit path routing, a node classifies the packets entering into the network into packet flows, wherein each packet flow is based on certain fields in the packets or other characteristics of the packets. For the packet flow, an explicit path including a set of nodes and/or links is setup from the source node to a destination node. Then packets belonging to the flow are always sent along the explicit path. An explicit path computed for the flow may be based on Quality of Service (QoS) requirements of the flow, which are called traffic engineered (TE) paths. Explicit paths may be stateful as well as stateless. Unlike shortest path routing, there could be any number of explicit paths between a source node and a destination node.

Figure 4A:
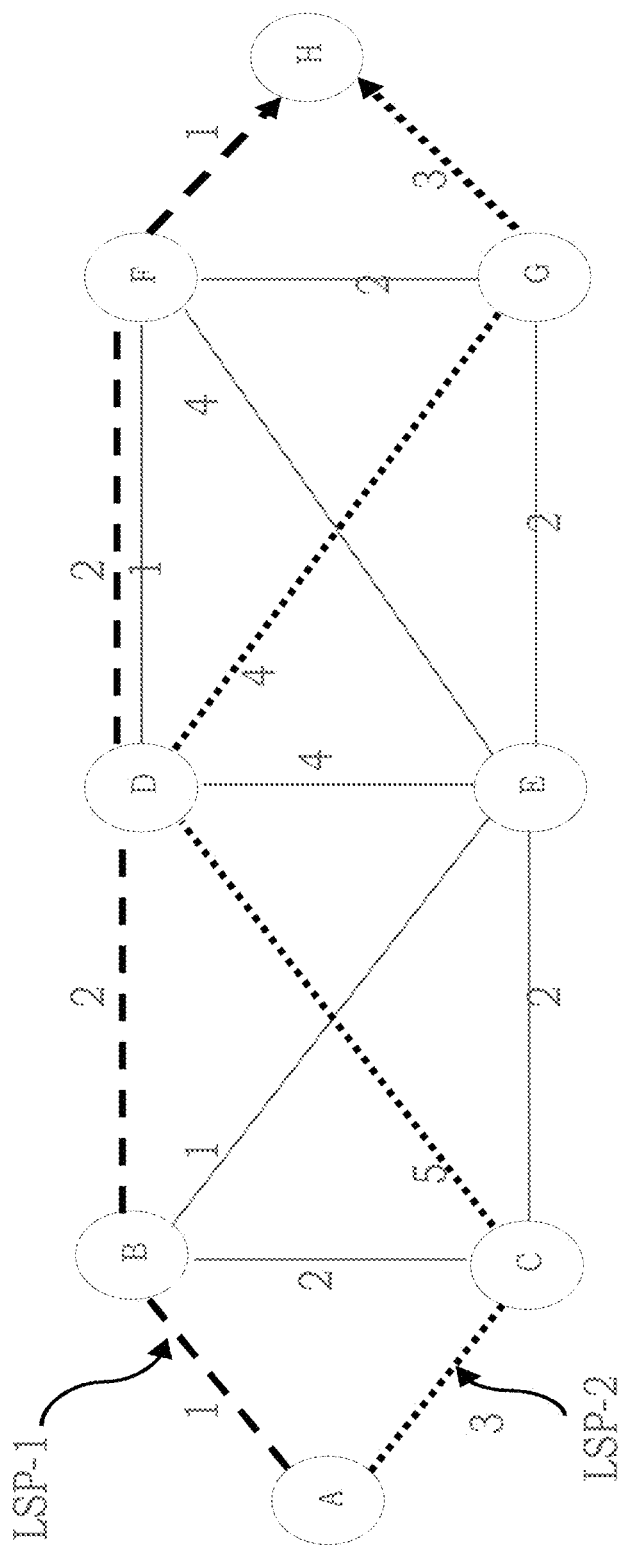
FIG. 4A depicts two traffic-engineered label switched paths between nodes of the packet switched network of FIG. 2 for illustrating stateful explicit path routing.

In a stateful explicit path routing approach, a signaling protocol (control plane) is used to set up states for the flow in the nodes along the explicit path. For example, an MPLS based explicit path, which is called a Traffic Engineered Labeled Switched Path (TE-LSP) could be set up by signaling protocols such as Resource Reservation Protocol-Traffic Engineering (RSVP-TE) Constraint-Based Routing-Label Distribution Protocol (CR-LDP), or the like. It is noted that stateful explicit path routing may be further understood by way of reference to FIG. 4A. FIG. 4A depicts two MPLS LSPs, from node A to node H, which are denoted as LSP-1 and LSP-2. LSP-1 follows the explicit path of links {A→B, B→D, D1→F1, F→H} and LSP-2 follows the explicit path {A→C, C→D, D→G, G→H}. Every node along a path maintains states for the LSPs both in the control plane (e.g., RSVP-TE, CR-LDP, or the like) and in the MPLS dataplane. Every node allocates a label for the LSP from its local label space and distributes the label to its upstream node. Assume that the labels assigned by a node X for LSP-1 is LX-1. For example, node D allocates label LD-1 and distributes it to upstream B. Then, in the MPLS dataplane, node D cross-connects incoming label LD-1 to outgoing label LF-1 (distributed to D by F for LSP-1) on the D1→F1 link. A sends a packet on LSP-1. So, A pushes label LB-1 onto the packet and sends the MPLS packet on the A→B link. B swaps the label LB-1 with LD-1 and sends the MPLS packet on the B→D link. D swaps the label LD-1 with LF-1 and sends the MPLS packet on the D1→F1 link. F swaps the label LF-1 with LH-1 and sends the MPLS packet on the F→H link. H pops the label as the label identifies itself as egress for LSP-1.

Figure 4B:
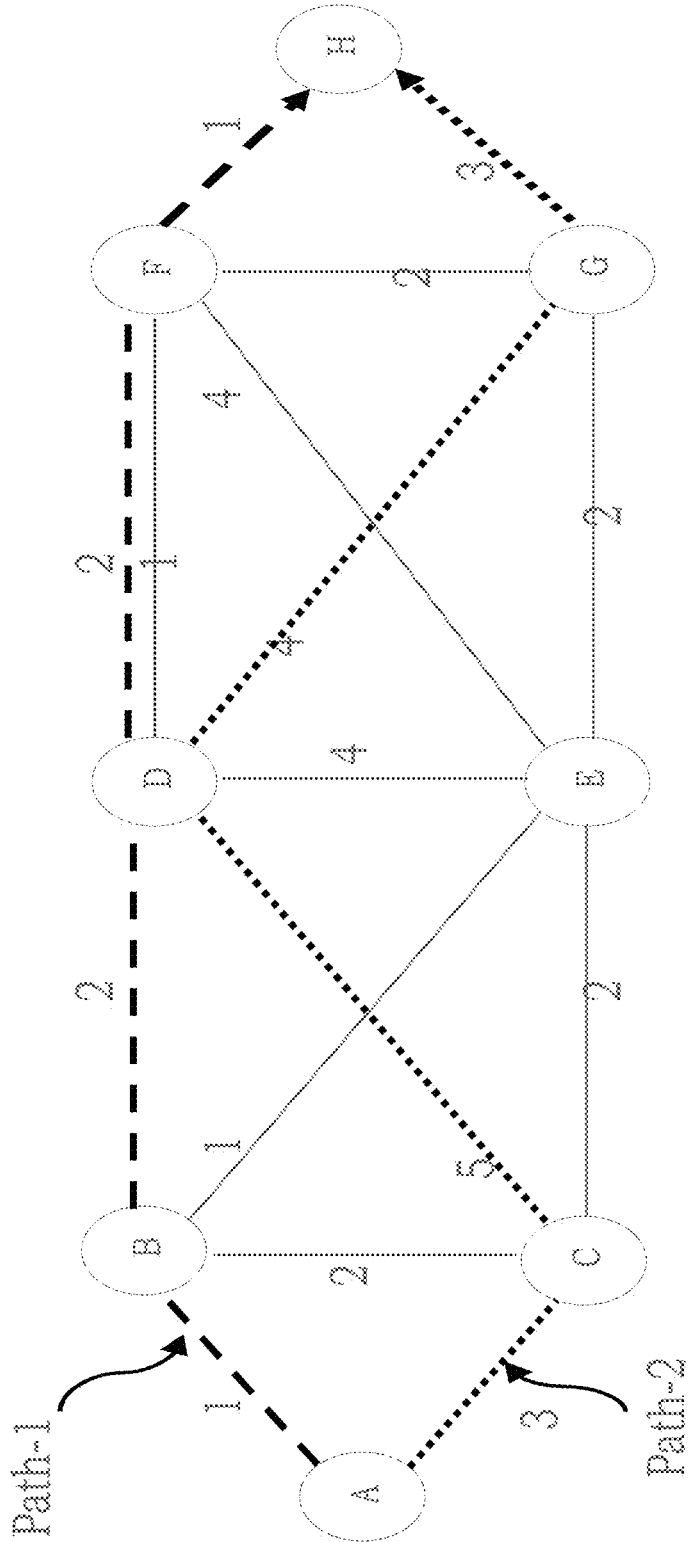
FIG. 4B depicts paths between nodes of the packet switched network of FIG. 2 for illustrating stateless explicit path routing.

In a stateless explicit path routing approach, the nodes along the stateless explicit path, which is called a source routed path, do not maintain states of the explicit path; rather, the source node encodes the set of nodes/links of the explicit path into the packet itself. Each node along the path looks up the topmost entry in the set, pops the entry, and forwards the packet to the next-hop link represented by the entry. In that way, the packet traverses along the explicit path. It is noted that stateless explicit routing may be further understood by way of reference to FIG. 4B. In FIG. 4B, node A determines two explicit paths to H, which are denoted as Path-1 and Path-2. To send a packet along Path-1, A encodes the source route {B→D, D1→F1, F→H} into the packet. It is noted that the first link A→B is not encoded since it is the immediate next-hop of A. A sends the packet on the A→B link. On receiving the packet, B pops up the topmost entry B→D in the source route and identifies the entry as the B→D link. So, B forwards the packet with source route {D1→F1, F→H} on the B→D link. On receiving the packet, D pops up the topmost entry D1→F1 in the source route and identifies the entry as the D1→F1 link. So, D forwards the packet with source route {F→H} on the D1→F1 link. On receiving the packet, F pops up the topmost entry F→H in the source route and identifies the entry as the F→H link. So, F forwards the packet on F→H link. In MPLS, SR using the MPLS dataplane is an architecture for sending MPLS packets along a stateless explicit path. Each router or link is assigned a label. Then, the source router (e.g., A) pushes an MPLS label stack onto the packet, where the label stack is the ordered list of labels assigned to the links/nodes in the explicit path. It is noted that the IPv4 and IPv6 specifications also support source routing, such that a list of IP addresses is encoded into the packet where the list is an ordered list of IP addresses assigned to links/nodes in the explicit path.

In shortest path routing paradigms, a common problem is that all of the packets to a destination are forwarded along the common shortest path to the destination, whereas alternate paths to the destination remain unutilized. As a result, the shortest path may get overloaded, leading to congestion and packet drops. In addition to that, shortest paths to multiple destinations may share common links and, thus, exacerbate the congestion in shared links. ECMP mitigates the problem to a certain extent by load balancing packets to a destination along multiple equal cost shortest paths, but ECMP may suffer from the following limitations: (1) ECMP is topology dependent and is not always possible in all network topologies and (2) even if ECMP is possible, non-ECMP alternate paths to a destination remain may still remain unutilized.

A network may implement TE based explicit path routing to mitigate the problems incurred by shortest path routing. However, explicit path routing requires management of traffic engineered flows, which adds complexity and scalability limitations. There could be millions of packet flows in a TE network. Due to the cost and complexity of TE, a majority of the packet switching network deployments in both data centers and service provider networks today continue to be based on shortest path routing.

Various example embodiments presented herein may be configured to improve or even overcome at least some of these limitations in packet switched networks based on load balancing of packets based on maximally disjoint trees (e.g., based on load balancing of packets from a load balancing node to a destination node across disjoint paths determined based on maximally disjoint trees from the load balancing node to the destination node). Various example embodiments presented herein may be configured to improve or even overcome at least some of these limitations in packet switched networks based on load balancing of packets based on maximally disjoint trees (e.g., based on load balancing of packets from a load balancing node to a destination node across paths, which may be maximally disjoint paths, determined based on maximally disjoint trees from the load balancing node to the destination node), where maximally disjoint means that the links included by the disjoint trees are mutually exclusive between the disjoint trees. Various example embodiments presented herein may be configured to improve or even overcome at least some of these limitations in packet switched networks based on load balancing of packets by computing, for a load balancing node, a set of maximally disjoint trees (e.g., where the maximally disjoint trees computed for the load balancing node 111 may include maximally disjoint trees from the load balancing node 111 to the destination node 111 (e.g., maximally disjoint trees for which the load balancing node 111 is the root of the maximally disjoint trees), maximally disjoint trees that traverse the destination node 111 (e.g., maximally disjoint trees for which the load balancing node 111 is the root of the maximally disjoint trees, maximally disjoint trees rooted at neighbor nodes 111 of the load balancing node 111 which may then be extended to the load balancing node 111 using adjacent links between the neighbor nodes 111 and the load balancing node 111, or the like), or the like, as well as various combinations thereof) and enabling the load balancing node to load balance packets to the destination node over a set of paths (e.g., maximally disjoint paths) available from the maximally disjoint trees. It will be appreciated that, where the set of maximally disjoint trees for the load balancing node includes all possible maximally disjoint trees for the load balancing node, the load balancing node can load balance packets to the destination node over all possible maximally disjoint paths. It will be appreciated that the load balancing may be based on ECMP where packets to a destination node are load balanced across paths of equal costs or may be based on UCMP where packets to a destination node can be load balanced not only across paths of equal costs but also across paths of unequal cost where such unequal cost paths are available. It will be appreciated that the load balancing may be performed using per-flow load balancing, per-packet load balancing, RLB, or the like, as well as various combinations thereof. It is noted that, for purposes of clarity, various example embodiments presented herein for supporting load balancing are primarily presented within the context of use of RLB; however, such example embodiments may be extended to or adapted for use with other types of load balancing (e.g., per-flow load balancing, per-packet load balancing, or the like, as well as various combinations thereof).

Various example embodiments presented herein may be configured to improve or even overcome at least some of these limitations in packet switched networks based on use of RLB in the packet switched networks. In general, RLB may be considered to be optimal utilization of network resources, and maximization of network throughput, when routing packets to a specific destination node based on random distribution of packets across a set of maximally disjoint paths from the load balancing node to the destination node. It is noted that RLB, by ensuring optimal utilization of network resources, eliminates congestion altogether or at least reduces congestion to the lowest possible level and, thus, maximizes throughput of packets. It is noted that, in various example embodiments, RLB may be implemented as an extension to shortest path routing, thereby supporting easier upgrading of existing shortest path based networks to use of RLB.

In general, conceptually, RLB can be formalized as follows. There are N incoming balls, one after another. There are N bins. So, the question is how to distribute N balls among N bins. Typically, the hash based schemes (e.g., like used in ECMP) look at colors of the balls and decide in which bins to put the balls. Thus, balls of the same color goes to the same bin. If a majority of the N balls belong to same color, then all such balls land up in same bin, i.e., balancing is skewed. The ideal goal is to fairly distribute N balls among N bins, which is achieved by RLB. The simplest method of RLB is to evenly spread the N balls among N bins in round-robin fashion irrespective of color of the balls, so that each bin gets one ball. It will be appreciated that RLB may be applied in various other ways.

In various example embodiments, RLB may mean load balancing of packets fairly across all possible maximally disjoint paths to their destinations irrespective of the flows of the packets or the characteristics of packets. First, this approach of RLB can be used for evenly load balancing traffic to a destination node across all possible maximally disjoint paths in the network to the destination node, thereby guaranteeing optimal utilization of network resources, maximized throughput, and minimal congestion, which in turn translates into better return of capital expenditures (CAPEX) and operational expenditures (OPEX). Second, this approach of RLB also guarantees even load balancing of traffic across the network irrespective of the destination nodes. It is noted that various example embodiments may be implemented as an extension to shortest path routing to also include all alternate paths to a destination node, with the guarantee that sending a packet along an alternate path does not lead to network loops.

It is noted that one side effect of RLB in packet switched networks is the possibility of out-of-order delivery of packets at the destination node. Note that packet reordering is now considered naturally prevalent within complex networks like the Internet. Due to various reasons, such as multipath routing, route fluttering, and retransmissions, packets belonging to the "same flow" may arrive out of order at a destination node anyway. As the delay difference between alternative paths decreases, the occurrence of out-of-order delivery also decreases. For example, in datacenter (DC)/WebScale networks, for the intra-DC traffic, the latency of packets across all paths is almost uniform. So the benefits of RLB prevails over insignificant accounts out-of-order delivery that may occur in DC networks. In the past, packet reordering used to violate the design principles of some traffic control mechanisms in Transmission Control Protocol (TCP) and, thus, posed performance problems. Currently, TCP is the most popular transport layer protocol for the Internet. Reordering could cause performance problems for TCP's fast retransmission algorithm, which uses the arrival of duplicate acknowledgments to detect segment loss. Duplicate acknowledgments can be caused by the loss of a segment or by the reordering of segments by the network. To overcome such performance issues, a number of mitigations have been added to TCP, such as Selective Acknowledgement (SACK) and Duplicate Acknowledgement (D-SACK). D-SACK specifies the use of the SACK option for acknowledging out-of-sequence data not covered by TCP's cumulative acknowledgement field. A TCP sender could then use this information for more robust operation in an environment of reordered packets, ACK loss, packet replication, and/or early retransmit timeouts. In addition to SACK or D-SACK, a host of other features are in place in various TCP implementations and, generally speaking, out-of-order delivery of packets is no longer a problem for TCP. In other words, out-of-order delivery of packets is not a pathological behavior in the Internet or any networking applications. It is noted that various features of RLB may be further understood by way of reference to FIG. 5.

FIG. 5 depict an example embodiment of a directed topology graph for the packet switched network of FIG. 2. In the network, each node A-H builds an identical topology database, similar to the one used for shortest path routing. An identical topology database of the network may be built by every node by running IGPs or other distributed algorithms among the nodes. Each node computes multiple maximally disjoint trees, wherein each maximally disjoint tree connects every other node in the network. Maximally disjoint trees mean that "logical links" among the trees are mutually exclusive. The notion of "logical link" and "physical link" herein is as follows. A "physical link" is the physical connectivity from one node to a neighboring node. In FIG. 5, B→D and D→B are considered as two physical links, the two directions of a "physical connection" or just "connection". A "logical link" is an association of one node to another neighboring node irrespective of number of physical links between them. There are two physical links from D to F, D1→F1 (link 1) with cost 2 and D2→F2 (link-2) with cost 1, and both combines into a single logical link D→F. Similarly, F1→D1 and F2→D2 combine into the logical link F→D. The cost of the physical links in each direction of a connection may be asymmetric, but, for simplicity and without loss of generality, the same cost is used in both directions herein (unless indicated otherwise). The cost of the logical link D→F may be determined as the maximum cost among all member physical links, which is 2, or may be based on other suitable mechanisms for determining the maximum cost. In the "directed" topology graph used for computing the maximally disjoint trees, a logical link is a directed edge and every node is a vertex. FIG. 5 is the directed topology graph 500 of the packet switched network 200 in FIG. 2, considering only the logical links between the nodes. Examples of maximally disjoint trees determined based on the directed topology graph of FIG. 5 are presented with respect to FIGS. 6A and 6B.

Figure 6A:
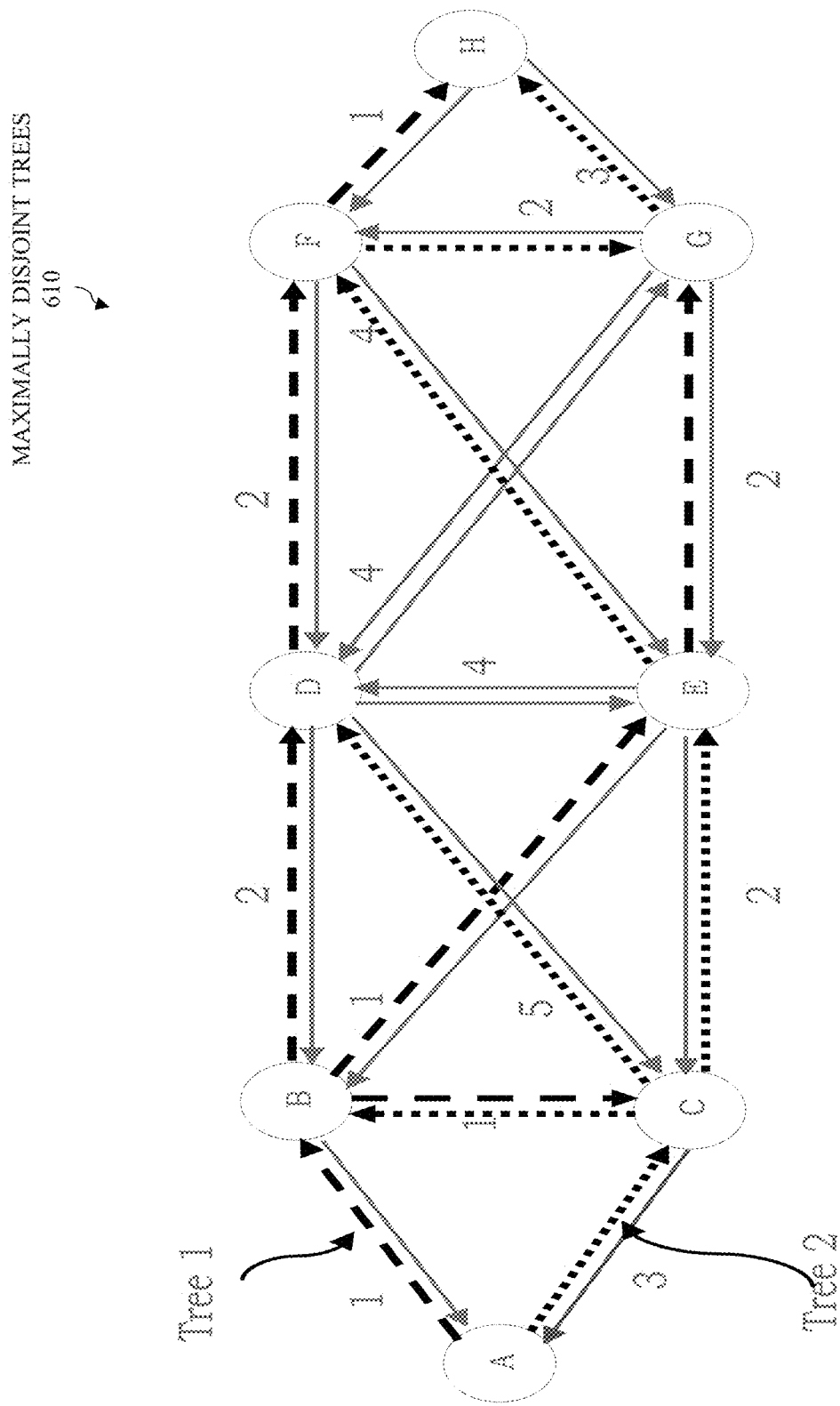
FIGS. 6A and 6B depict example embodiments of maximally disjoint trees computed by a node of the packet switched network of FIG. 2 based on the directed topology graph of FIG. 5.
Figure 6B:
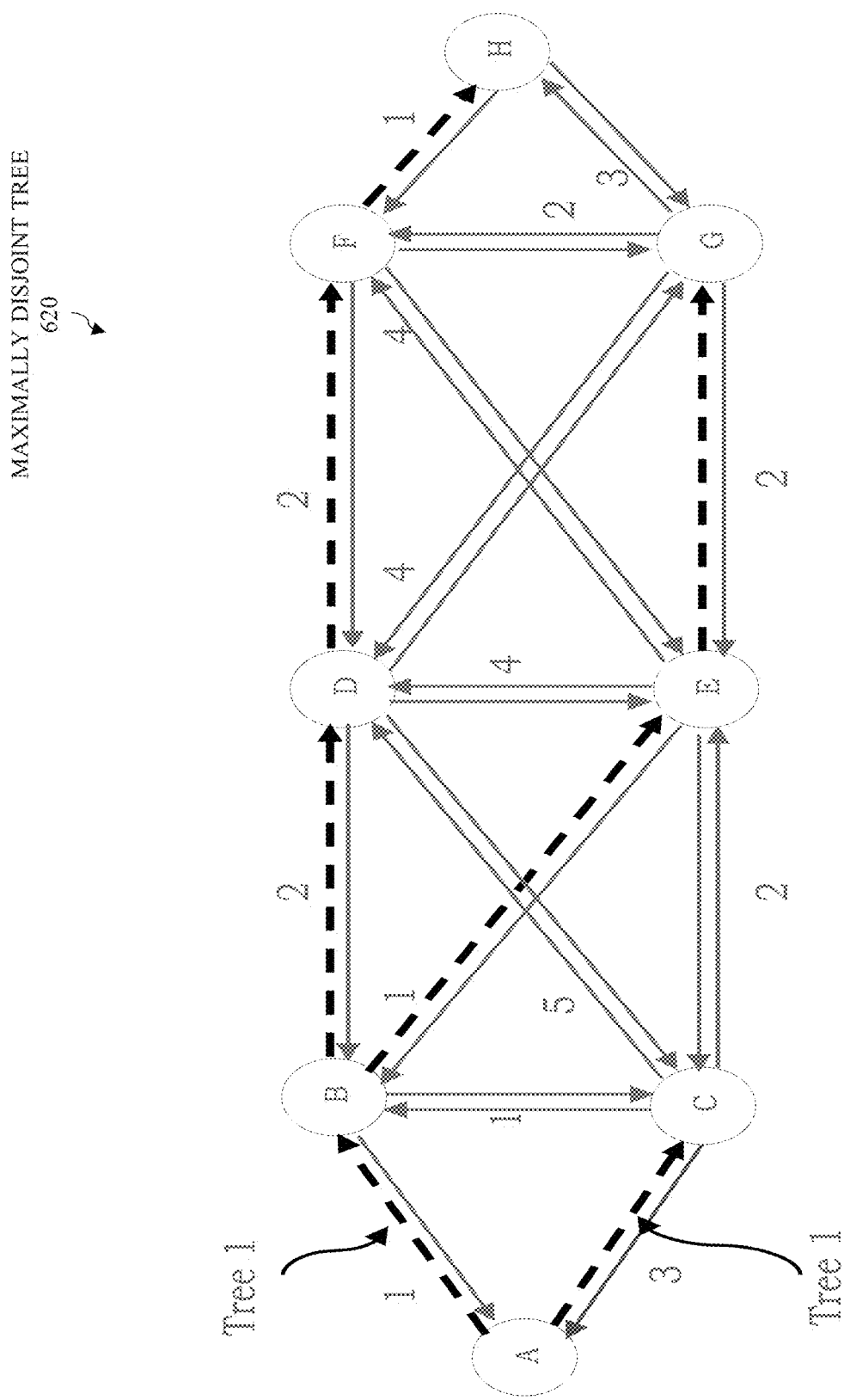

FIGS. 6A and 6B depict example embodiments of maximally disjoint trees computed by a node of the packet switched network of FIG. 2 based on the directed topology graph of FIG. 5. FIG. 6A depicts two maximally disjoint trees computed by node A—Tree 1 and Tree 2—on the topology of FIG. 5A. A node performs RLB of packets over the maximally disjoint trees computed by the node. A packet is sent to its destination along a chosen tree by encoding the path to the destination along the tree into the packet itself. A transit node inspects the next-hop node in the path encoded in the packet and sends the packet to the next node in the path by performing RLB. So, the packet reaches the destination by traversing the path encoded by the source. This form of forwarding is used since the maximally disjoint trees are specific to a load balancing node and are not coherent across other nodes in the network. So, this approach guarantees that a packet does not encounter any loop during transit. However, there is a problem with the maximally disjoint trees computed by a node. If a node computes a maximally disjoint tree with itself as the root, then it is possible that all adjacent links of the node get included in the maximally disjoint tree, which results in only a single maximally disjoint tree and thus defeating the purpose of RLB. FIG. 6B, depicts a maximally disjoint tree computed by node A where both the links A→B and A→C get included in the maximally disjoint tree. As a result, then node A only has one maximally disjoint tree. Various example embodiments presented herein may be configured to solve this problem in various ways (described hereinbelow while also being referred to as Option A, Option B, Option C, and Option D), using different approaches for computing the maximally disjoint trees, at least some of which are discussed further below.

Figure 7A:
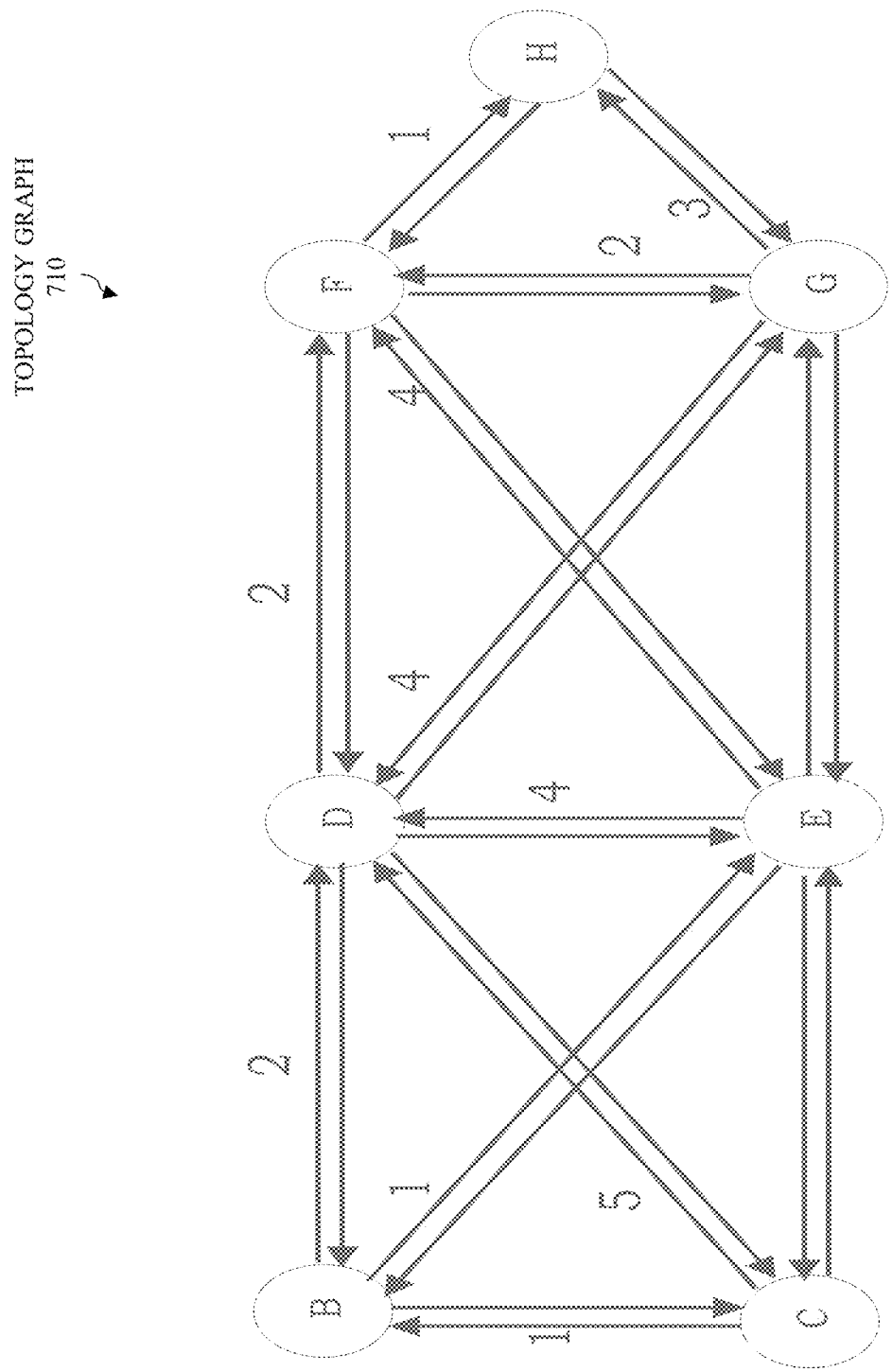
FIG. 7A depicts an example embodiment of a directed topology graph, based on the packet switched network of FIG. 2, for use in computing maximally disjoint trees.
Figure 7B:
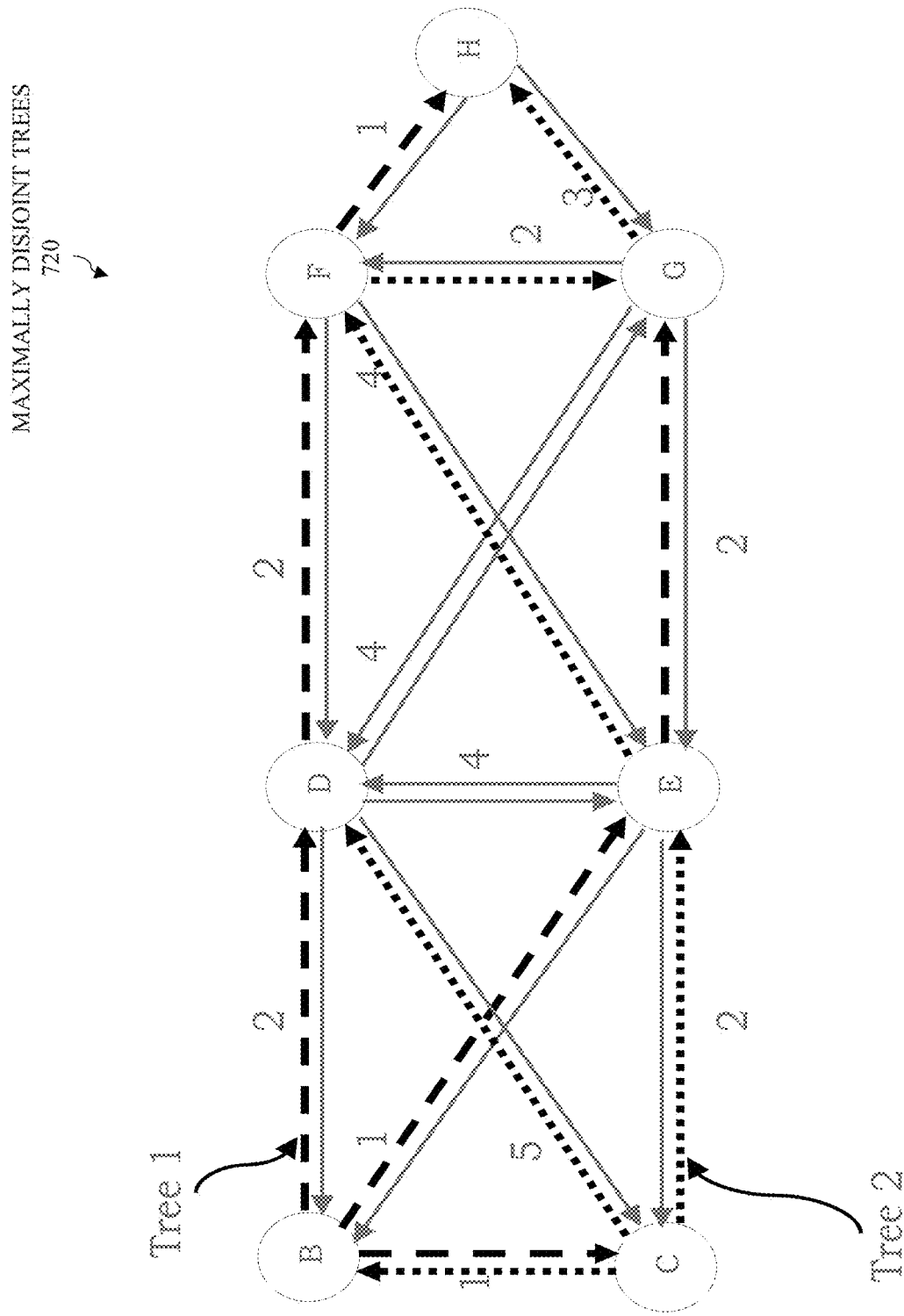
FIG. 7B depicts an example embodiment of maximally disjoint trees computed based on the directed topology graph of FIG. 7A.

In at least some example embodiments (also referred to herein in various places as Option A), a node computes maximally disjoint trees from each neighbor as the root of a tree, wherein the node removes itself from the topology graph used to compute a maximally disjoint tree. Then each maximally disjoint tree rooted at a neighbor is extended to the node by joining the adjacent link to the neighbor. So, the adjacent link to the neighbor is common for all maximally disjoint trees rooted at the neighbor. For example, in FIG. 5, node A had two directly connected neighbors—B and C. So, node A computes maximally disjoint trees rooted at B and C by removing itself from the topology graph. This directed topology graph is depicted in FIG. 7A. FIG. 7B depicts the maximally disjoint trees computed from B and C on the topology graph of FIG. 7A. Tree 1 is rooted at B and Tree 2 is rooted at C. Then the A→B link is common for all maximally disjoint trees from B and the A→C link is common for all maximally disjoint trees from C. This rule guarantees that there will be at least one maximally disjoint tree per neighbor. Secondly, this approach can be leveraged to also include shortest paths to each destination as the byproduct of the maximally disjoint trees (described in detail later). So the approach offers backward compatibility with existing shortest path routing. For purposes of clarity, this approach is described in detail herein.

In at least some example embodiments (also referred to herein in various places as Option B), a node computes maximally disjoint trees by including only one adjacent link at a time into the topology graph. This rule enforces only that the maximally disjoint tree would use only one adjacent link. For example, in FIG. 5, this approach results in at least two maximally disjoint trees, one over link A→B and another over link A→C. However, this approach may not be leveraged to include shortest paths to destinations and, thus, may not be backward compatible with existing shortest path routing.

In at least some example embodiments (also referred to herein in various places as Option C), the network topology is segregated into sub-topologies by assigning a color (or sub-topology identifier) to each link. The adjacent links of a node are included in a mix of sub-topologies by assigning different colors. Then, the maximally disjoint trees are computed by the node for each color in its adjacent links. This approach guarantees that not all adjacent links are included by a single tree.

In at least some example embodiments (also referred to herein in various places as Option D), maximally disjoint trees are computed from each node as the root. If a maximally disjoint tree happens to include all neighboring links then it results in a single tree from the node. In that case, a packet to a destination node is sent to the next-hop neighbor in the path to the destination node in the tree, as a "regular" packet, i.e., without encoding the path into the packet. The idea is that the next-hop neighbor may have built multiple trees and so would perform RLB. If the neighbor also built only one tree, then it forwards the packet further to its next-hop neighbor as a regular packet until the packet reaches a node that can perform RLB. In the worst case, it is possible that every node along the path to the destination has built only one maximally disjoint tree, thus defeating the purpose of RLB.

It will be appreciated that, although primarily described as independent options, the various options may be related in various ways, may be used in various combinations, or the like, as well as various combinations thereof. It is noted that a "stub" node, i.e., a node with only one adjacent link, will always have only one maximally redundant tree in Options B and C. It is noted that, for a stub-stub node, i.e., a node has only one adjacent link and its neighbor also had only one adjacent link to rest of the network, then Option A will also result in only one maximally redundant tree. In such cases, nodes in Options A-C with one maximally disjoint tree will employ Option D style of forwarding packets on the single tree with the intent that a downstream node will perform RLB. So, Option D is also a subset case of Options A-C. Additionally, Option C also may be used in conjunction with Option A or Option B.

It will be appreciated that various options allow maximally disjoint trees at the granularity of physical links or logical links between two nodes, but the approach with logical links result in maximum benefit in RLB (explained in details later). So, various example embodiments presented herein are described with trees based on a topology of logical links, unless specified otherwise.

It will be appreciated that a node may build as many maximally disjoint trees as permissible by the topology. In Option A, the node may compute maximally disjoint trees from the neighbors in a round-robin fashion so that the trees are fairly distributed among neighbors.

It will be appreciated that various aspects of Option A may be further understood by considering an example for using load balancing for sending packets over the maximally disjoint trees of FIG. 6A.

In this example, A computed maximally disjoint trees from each neighbor B and C. From B, only one maximally disjoint tree was possible as it included all its neighboring links B→C, B→D and B→E in the tree, which is shown as Tree 1. From C, only one maximally disjoint tree was possible as it included all its neighboring links C→B, C→D and C→E in the tree, which is shown as Tree 2. So, in the topology, A can have up to two maximally disjoint trees. Then Tree 1 is extended to A as root by joining link A→B into the tree. Similarly, Tree 2 is extended to A as root by joining link A→C into the tree. Tree-1 includes the set of links {A→B, B→C, B→D, B→E, E→G, D→F, F→H} with the leaf nodes as C, G and H. Tree-2 includes the set of links {A→C, C→B, C→D, C→E, E→F, F→G, G→H} with leaf nodes as B, D, H.

In this example, every other node in the network computes maximally disjoint trees to reach other nodes in the network. Since each tree is maximally disjoint, the maximum number of trees from an ingress node is limited by redundant paths in the network. An implementation may also set an upper bound K as the limit on the maximum number of maximally disjoint trees to be computed by an ingress node.

In this example, once the maximally disjoint trees are computed by a node, the node load balances packets across the trees using a fair scheduling scheme, which is as follows.

If there are T maximally disjoint trees, the trees are indexed from 1 to T. Irrespective of the destinations of the packets, the packets are sprayed across the trees in round-robin fashion. For this purpose, the node maintains a "tree scheduler" that keeps the record of the index of the tree selected for the last packet. For example, if the previous packet was sent along tree T', then the next packet is sent on tree (T+1) if the total number of trees T>=(T'+1), otherwise Tree-1 is chosen.

After a tree is selected for a packet, the packet is sent to its destination by encoding into the packet the explicit path (of logical links) to the destination in the selected tree. The explicit path is referred to as an "RLB-path" and the packet encoded with the RLB-path is referred to as an "RLB-packet". When the RLB-path is constituted of logical links then it can be encoded into the packet as an ordered list of nodes. For example, the RLB-path from node A to node H in Tree 1 is {B, D, F, H}.

On receiving an RLB-packet, a node pops the topmost entry in the RLB-path and forwards the packet to that next-hop node by performing RLB, because the next-hop node may be reachable by multiple trees. Note that one key benefit of a logical link based tree computation is that it empowers a transit node to fairly load balance packets across the trees to a next-hop. If the RLB-path to the next-hop is not empty (which means that the path is not the directly connected link(s) to the next-hop), then the node pushes the RLB-path to the next-hop onto the existing RLB-path of the packet. With this pop-and-forward action at each node in the RLB-path, the packet finally gets delivered to the destination. Since the RLB-packet strictly follows the RLB-path encoded into it by the originating node, this mode of transmission ensures loop free forwarding.

If there are multiple physical links to a next-hop of an RLB-packet, then the forwarding node further sprays the packets to the next-hop in round-robin fashion over the links, i.e., if a previous packet to the next-hop (irrespective of the destination) was sent on link L' then this packet will be sent on (L'+1) if the number of links L>=(L'+1), otherwise the packet is sent on link 1. For this purpose, a node maintains a "link scheduler" per next-hop that keeps the record of the link on which the last packet was sent to the next-hop. It is noted that one key benefit of logical link based tree computation is that it empowers a transit node to fairly load-balance packets across the physical links to a next-hop.

In this example, in order to illustrate the fairness of the load-balancing algorithm in FIG. 6A, take the following sequence of packets to be forwarded by A in the order, right after the trees are set up: (1) packet PH1 to destination node H, (2) packet PH2 to destination node H, (3) packet PG1 to destination node G, (4) packet PF1 to destination node F, (5) packet PH3 to destination node H. Node A maintains a tree scheduler for transmitting packets on Tree 1 and Tree 2 in round-robin fashion.

In this example, node A selects Tree 1 for PH1 and records in its tree scheduler that the last packet has been sent on Tree 1. In Tree 1, the RLB-path to H is {B, D, F, H}, which is encoded into PH1. It is noted that the first hop B is not encoded since it is the immediate next-hop of A. A sends the RLB-packet {D, F, H}<PH1> to next-hop node B. Node B pops the topmost entry D from the RLB-path and forwards the RLB-packet {F, H}<PH1> to next-hop node D. Node D pops the topmost entry F from the RLB-path and finds that it has two links to node F. Node D decides to forward the packet {H}<PH1> to next-hop node F via link D1→F1. Node D records in its link scheduler to node F that the last packet has been sent on D1→F1. Node F pops the topmost entry H from the RLB-path and forwards the packet PH1 to node H.

In this example, node A selects Tree 2 for PH2 since the last packet was sent by its tree scheduler on Tree 1. Node A records in its tree scheduler that the last packet has been sent on Tree 2. In Tree 2, the RLB-path to H is {C, E, F, G, H}, which is encoded into PH2. The first hop node C is not encoded since it is the immediate next-hop of node A. Node A sends the RLB-packet {E, F, G, H}<PH2> to next-hop node C. Node C pops the topmost entry E from the RLB-path and forwards the RLB-packet {F, G, H}<PH2> to next-hop node E. Node E pops the topmost entry F from the RLB-path and forwards the RLB-packet {G, H}<PH2> to next-hop node F. Node F pops the topmost entry G from the RLB-path and forwards the RLB-packet {H}<PH2> to next-hop node G. Node G pops the topmost entry H from the RLB-path and forwards the packet PH2 to next-hop node H.

In this example, node A selects Tree 1 for PG1 since the last packet was sent by its tree scheduler on Tree 2. Node A records in its tree scheduler that the last packet has been sent on Tree 1. In Tree 1, the RLB-path to node G is {B, E, G}, which is encoded into PG1. The first hop B is not encoded since it is the immediate hop of node A. The packet eventually gets delivered to node G after traversing the path A→E→B→G.

In this example, node A selects Tree 2 for PF1 since the last packet was sent by its tree scheduler on Tree 1. Node A records in its tree scheduler that the last packet has been sent on Tree 2. In Tree 2, the RLB-path to node F is {C, E, F}, which is encoded into PF1. The first hop node C is not encoded since it is the immediate next hop of node A. The packet eventually gets delivered to node G after traversing the path A→C→E→F.

In this example, node A selects Tree 1 for PH3 and records in its tree scheduler that last packet has been sent on Tree 1.

In Tree 1, the RLB-path to node H is {B, D, F, H}, which is encoded into PH1. The first hop node B is not encoded since it is the immediate next hop of node A. The packet eventually gets delivered to node H after traversing the path A→B→D→F→H. It is noted that when the packet was received by node D and node D makes a forwarding decision to next-hop node F, node D encounters two links to node F. Node D chooses the link D2→F2, since the link scheduler to next-hop node F has the record that the last packet to F was sent on link D1→F1 (which was the PH1 packet). After forwarding this packet to node F, node D updates the record on the link scheduler has the last packet has been sent on D2→F2.

In this example, it may be seen that the efficiency an RLB solution in a packet switched network can be benchmarked across following three dimensions: (1) B1: fairness of load balancing by an ingress node to a destination, (2) B2: fairness of load balancing by an ingress node among all links in the network, irrespective of destinations, and (3) B3: fairness of load balancing across all links in the network, irrespective of ingress node and destinations, i.e., in holistic view of the network. It can be proved, as discussed further below, that various example embodiments for supporting load balancing based on RLB may excel across all the three benchmarks of an efficient RLB solution.

On B1, since an ingress node sends each subsequent packet to a destination on a different tree and trees are maximally disjoint, it is guaranteed that each subsequent packet traverses mutually exclusive links. So, the packets to a destination are most optimally load balanced. For example, packet PH1 is sent on path A→B→D→F→H and subsequent packet PH2 is sent on path A→C→E→F→G→H, and the paths are entirely disjoint.

On B2, assume that, in packets ingressing at A, there is a uniform distribution of all nodes B-I as destinations, i.e., there is an equal probability Pia [i=ingress, d=destination] that a node in the network is a destination. Since each node in a tree has equal probability Pid of being a destination, packets have fairly traversed all links in a tree. Secondly, from node A, all the trees combined have traversed all possible path in the network from node A. In a densely connected network, all possible paths in the network from node A would include almost all links in the network. Since node A sends subsequent packets on alternate trees, it may be said that there is an absolute fairness of load balancing by an ingress node among all links in the network.

On B3, assume that (a) there is a uniform distribution of traffic ingressing at each node into the network and that Pi is the probability for each node being ingress to packets and (b) among the packets ingressing at a node, there is a uniform distribution of all other nodes as destinations, i.e., probability Pia (as was the case in the proof for B2). Since it has been proved that in the case of Pia, there is an absolute fairness of load balancing so, in the case of Pi*Pid, there is a uniform load distribution too, i.e., across the network.

It is noted that various example embodiments do not mandate specific methods for computing the maximally disjoint trees. However, there may be certain advantages or potential advantages of using Dijkstra's Shortest Path Tree (SPT) algorithm as the fundamental building block in computations of maximally disjoint trees from a neighboring node. Using the SPT-based approach results in backward compatibility to shortest path routing since there will be at least one tree among the maximally disjoint trees from a neighboring node that includes the shortest paths to each destination node. It will be appreciated that other algorithms or mechanisms may be used for computing the maximally disjoint trees.

FIGS. 8A-8E depict an example embodiment of a manner in which the maximally disjoint trees of FIG. 7B are computed using a shortest path tree algorithm. More specifically, FIGS. 8A-8E depict how Tree 1 and Tree 2 in FIG. 7B are computed using SPT.

Figure 8A:
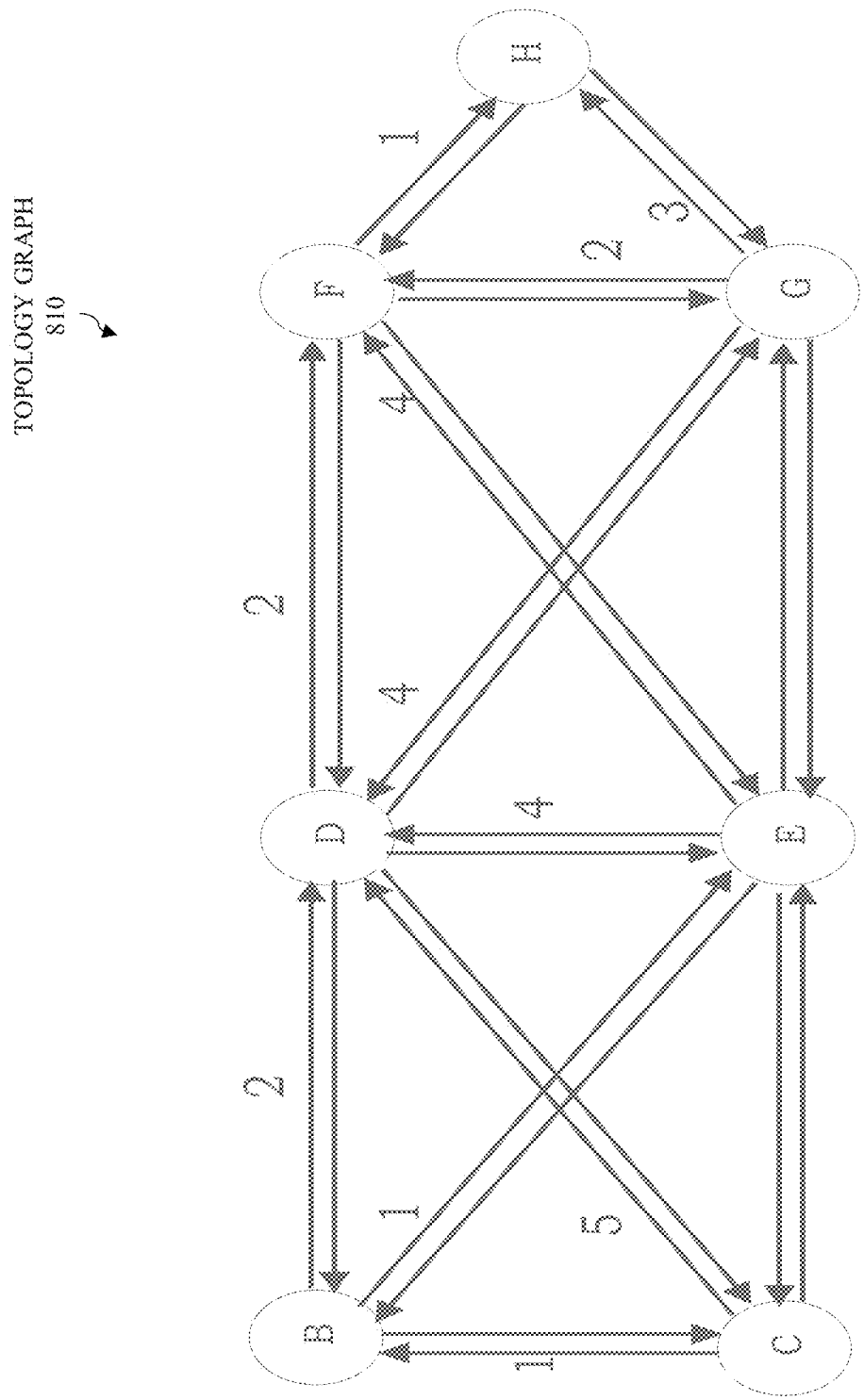
FIGS. 8A-8E depict an example embodiment of a manner in which the maximally disjoint trees of FIG. 7B are computed using a shortest path tree algorithm.

FIG. 8A depicts a directed topology graph of the network with logical links between the nodes wherein node A is removed from the graph. The two physical links between D-F are absent from FIG. 8A as only logical links are considered. The costs of the logical links D→F and F→D are derived from the cost of the physical link with maximum cost, which was link D1→F1. Each logical link is a directed edge in the directed topology graph.

Figure 8B:
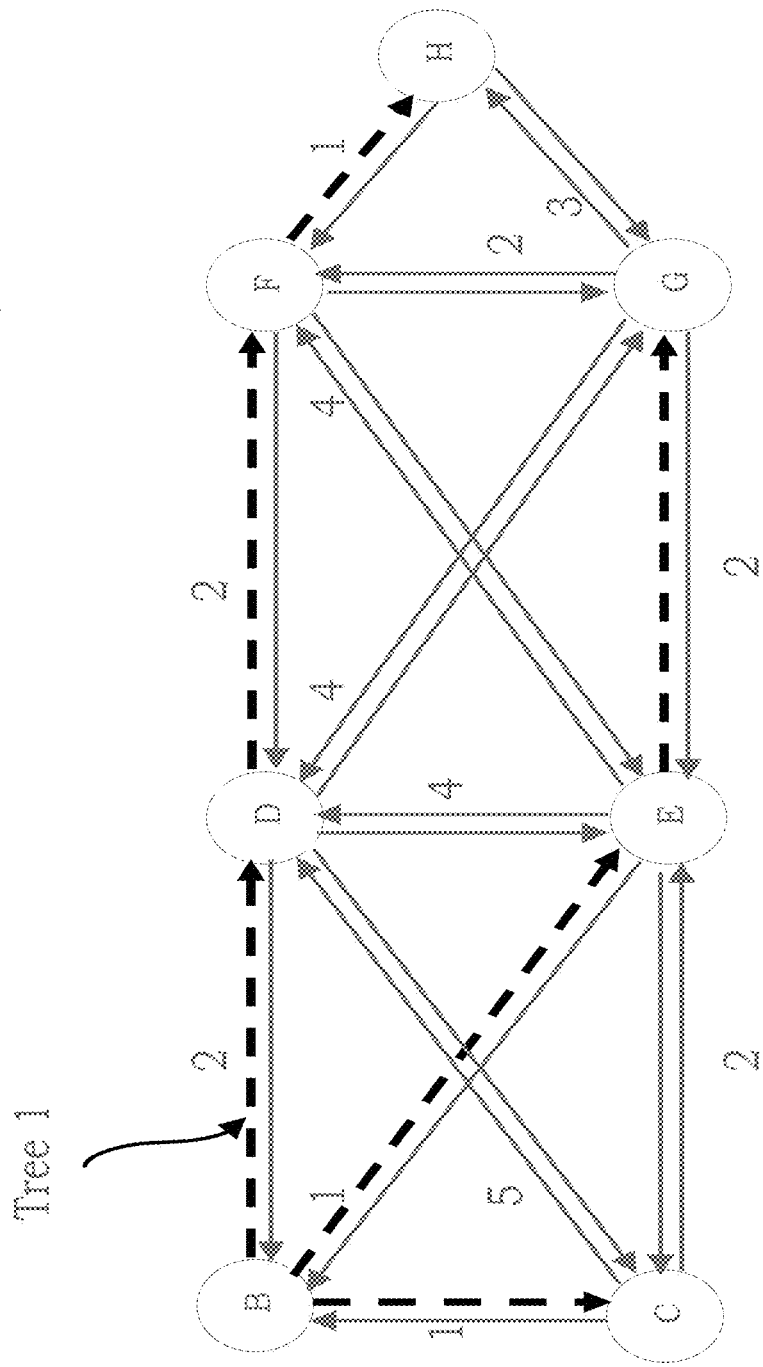

FIG. 8B depicts a first SPT, Tree 1, computed based on the directed topology graph of FIG. 8A. Assume that node A chooses node B as the first neighbor to compute the first SPT. It is noted that the paths to each destination node C-H in Tree 1 are also the shortest paths that would have been computed by SPT in B in a shortest path routing network. Thus, the first SPT always includes the shortest paths to each destination node from the neighboring node.

Figure 8C:
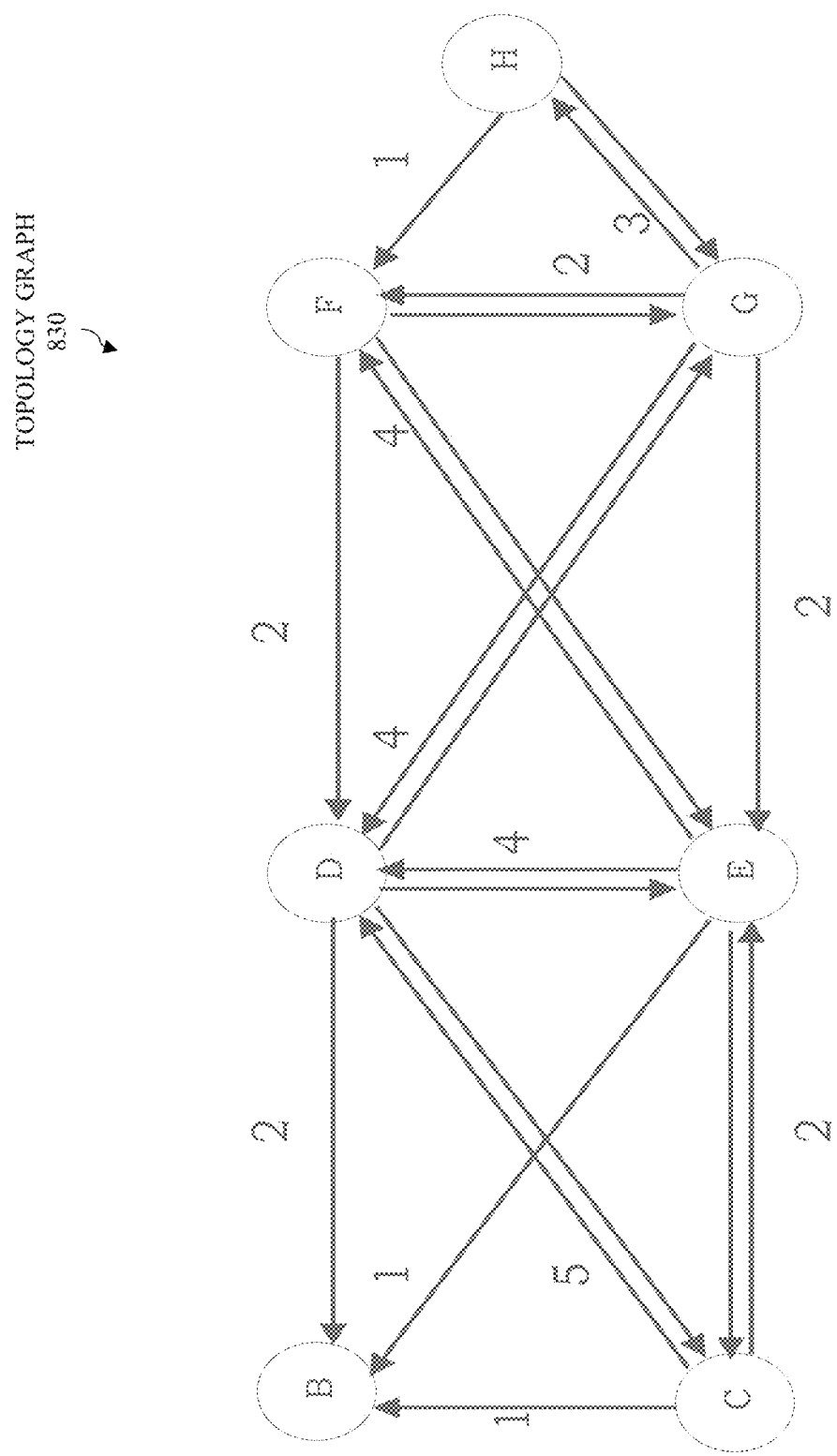

FIG. 8C depicts a directed topology graph used to compute a next SPT that is maximally disjoint from Tree 1. After Tree 1 is computed, to compute the next SPT that is maximally disjoint from Tree 1, the next neighbor in the round-robin order is chosen, which is C. All edges (logical links) that are included in Tree 1 are excluded from the topology graph. For example, B→C is excluded but C→B remains. The resultant topology graph is depicted in FIG. 8C.

Figure 8D:
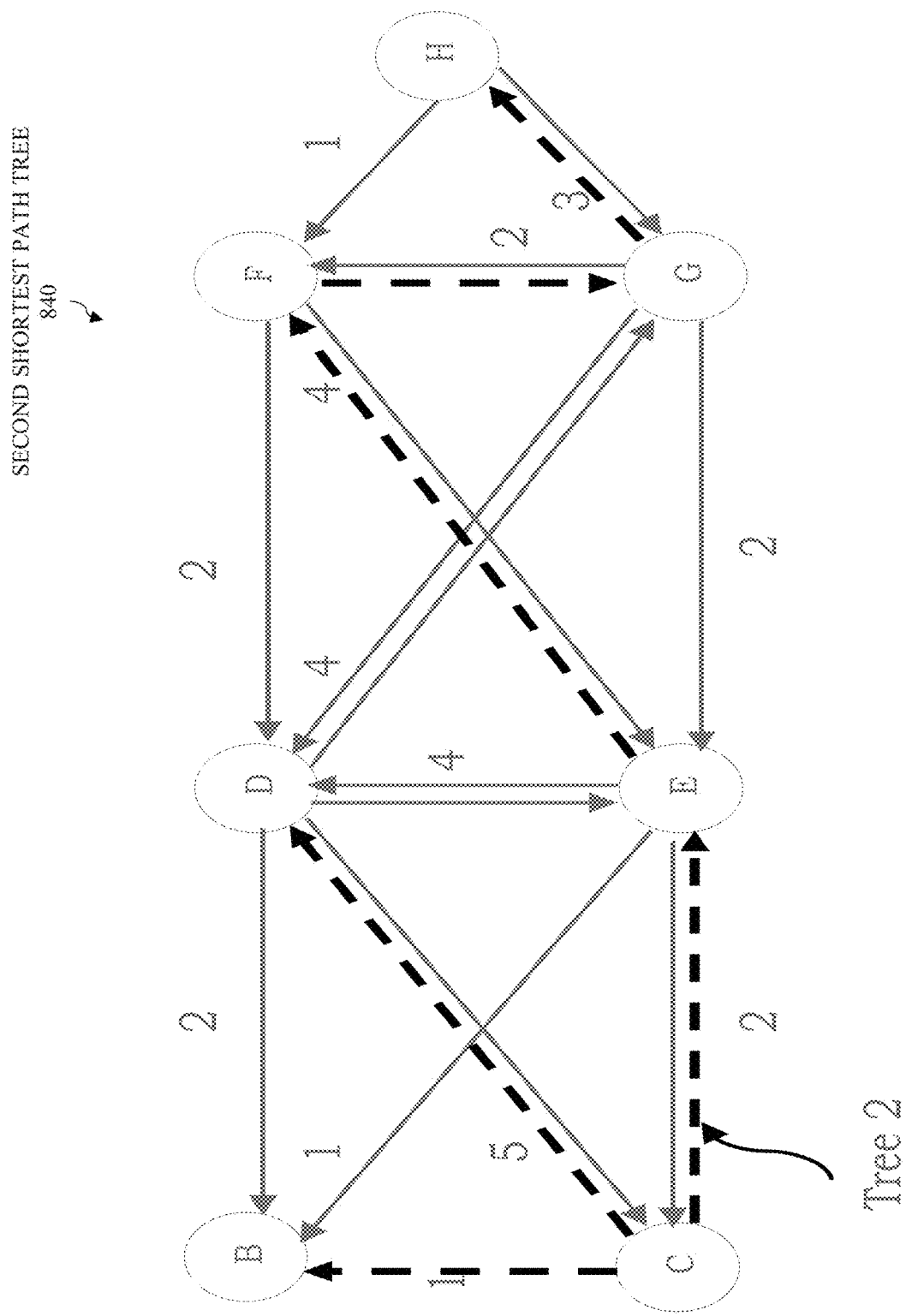

FIG. 8D depicts a second SPT, Tree 2, computed based on the directed topology graph of FIG. 8C. The second SPT is computed from node C on the directed topology graph of FIG. 8C.

Figure 8E:
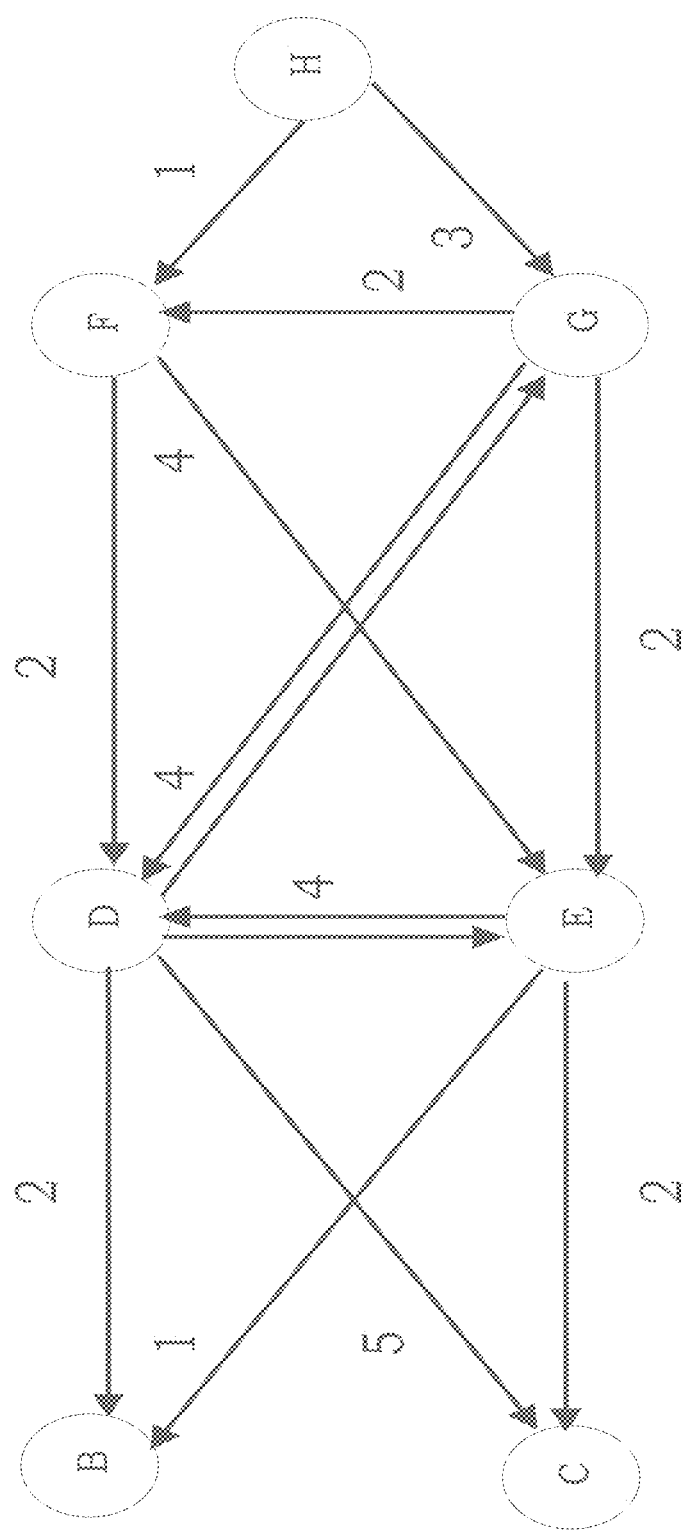

FIG. 8E depicts a directed topology graph used to compute a next SPT that is maximally disjoint from Tree 2 (and Tree 1). After Tree 2 is computed, to compute the next SPT that is maximally disjoint from Tree 2 (and Tree 1), the next neighbor in the round-robin order is chosen, which is B. All edges (logical links) that are included in Tree 2 are excluded from the topology graph.

In FIG. 8E, since neither node B nor node C has any outgoing links, no more SPTs are possible. Thus, Tree 1 and Tree 2 are the only possible maximally disjoint trees for node A in the topology, where Tree 1 includes the shortest paths to all destinations from node B. Tree 1 and Tree 2 are extended to node A by joining the logical links A→B and A→C, respectively. It is noted that physical connections D-G and D-E are the only ones never traversed by the maximally disjoint trees from node A. There are a total of 15 connections in the topology so the maximally disjoint trees from node A traverse 86.6% of the network, which is an example of fulfillment of the benchmark B2, i.e., fairness of load balancing by an ingress node among all links in the network, irrespective of destinations. It is further noted that A can load balance packets to a neighboring node (e.g., node B or node C) over the directly connected link as well as via the trees through alternate neighbor(s). For example, B is reachable from A by directly connected A→B link as well as by path {A→C, C→B} in Tree 2. The shortest path to the neighbor would be the one with the least cost.

Various example embodiments for supporting load balancing in packet switched networks based on RLB may be configured to provide various advantages or potential advantages. Various example embodiments may be implemented as extensions to shortest path routing with minor modifications. The various example embodiments may be very simple to implement, as it reuses all the infrastructure already in place for shortest path routing. So, the various example embodiments provide a natural upgrade path for all shortest path routing based networks for achieving optimal utilization of network resources and maximize throughput. Various example embodiments, by allowing shortest path routing (e.g., using SPT to compute a maximally disjoint tree), may be backward compatible with existing shortest path routing based networks. Various example embodiments may obviate the need for use of explicit fast reroute (FRR) since FRR may be an automatic byproduct of various example embodiments. Various example embodiments, by ensuring the RLB-packets are strictly forwarded along the RLB-path (encoded by source node), the RLB-packets will not encounter loops during network convergence (unlike existing shortest path routed network in which loops may occur during network convergence). Various example embodiments may be applicable to any packet switching technologies (e.g., IP, MPLS, Ethernet, or the like). It will be appreciated that various example embodiments for supporting load balancing in packet switched networks based on RLB may be configured to provide various other advantages or potential advantages.

FIG. 9 depicts an example of a packet switched network for illustrating routing of packets based on RLB. In the packet switched network 900, node A is the ingress node performing RLB. The packets switched network 900 of FIG. 9 is an extension of the packet switched network 200 of FIG. 2 in which a "stub network" (nodes I-M) has been added. A stub network is a part of a network which is connected to rest of the network by only one link. The stub network (including nodes I-M) is connected to rest of the network (including nodes A-H) by the connection G-I only (which is called the "stub connection"). Similarly, from the perspective of any of the nodes I-M, the network A-H is the stub network of the network I-M. The case for the stub network requires some additional considerations while computing the maximally disjoint trees. There are two problems with the stub network. With the method of maximally disjoint trees described herein outside of the context of stub networks, node A can have only one maximally disjoint tree to reach the nodes I-M, which is the first tree. Since the stub link G→I included by the first tree to reach the nodes I-M, the stub link is excluded from the topology graph while computing the subsequent trees and thus, node A is unable to perform RLB to any of the nodes I-M in the stub network. For the same reason, any of the nodes I-M will be unable to compute more than one maximally disjoint tree that includes rest of the network A-H. The handling of stub networks when computing maximally disjoint trees may be further understood by way of reference to FIGS. 10A-10D.

Figure 10A:
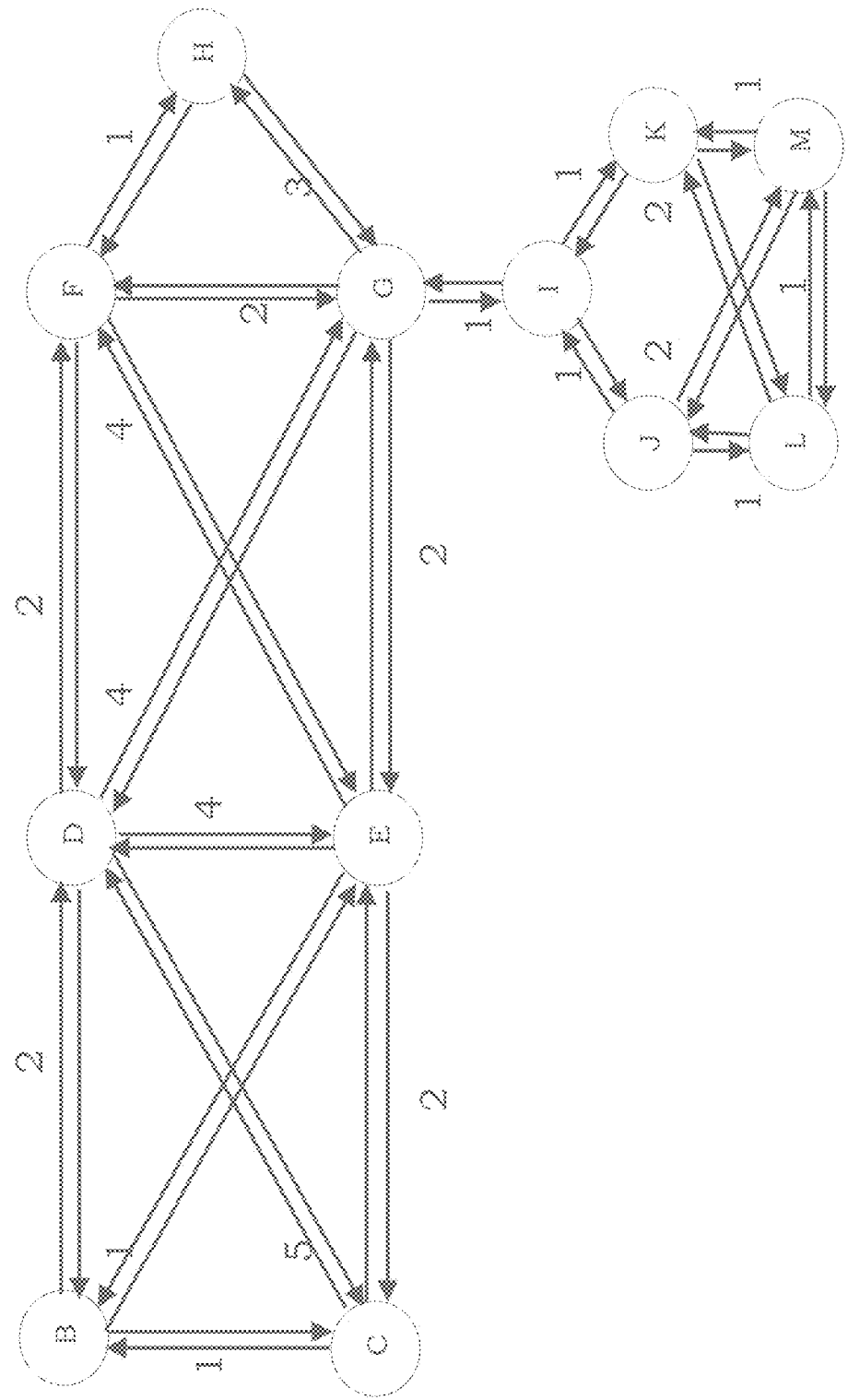
FIGS. 10A-10D depict an example embodiment for computing maximally disjoint trees in a packet switched network including a stub network.
Figure 10B:
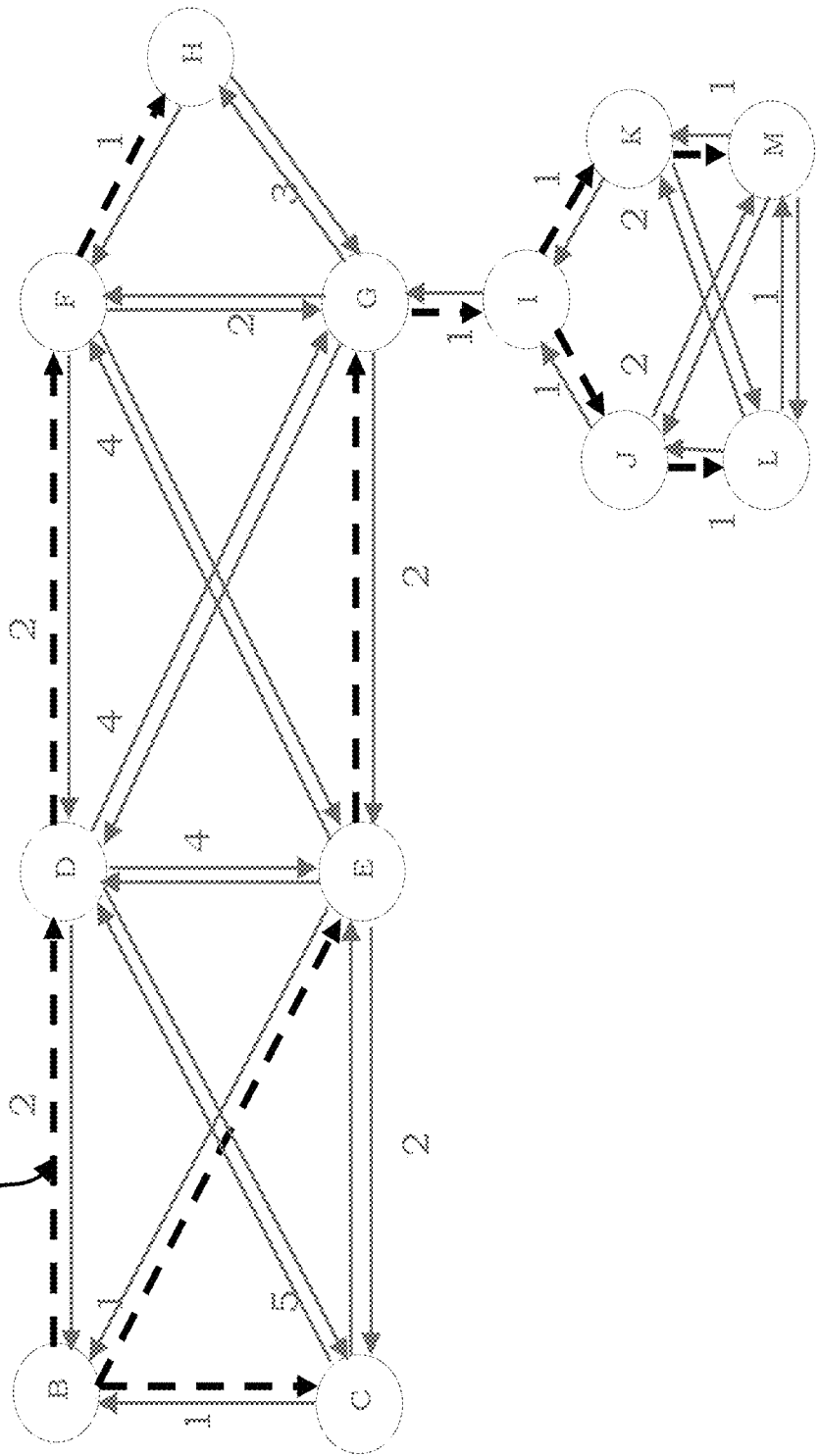
Figure 10C:
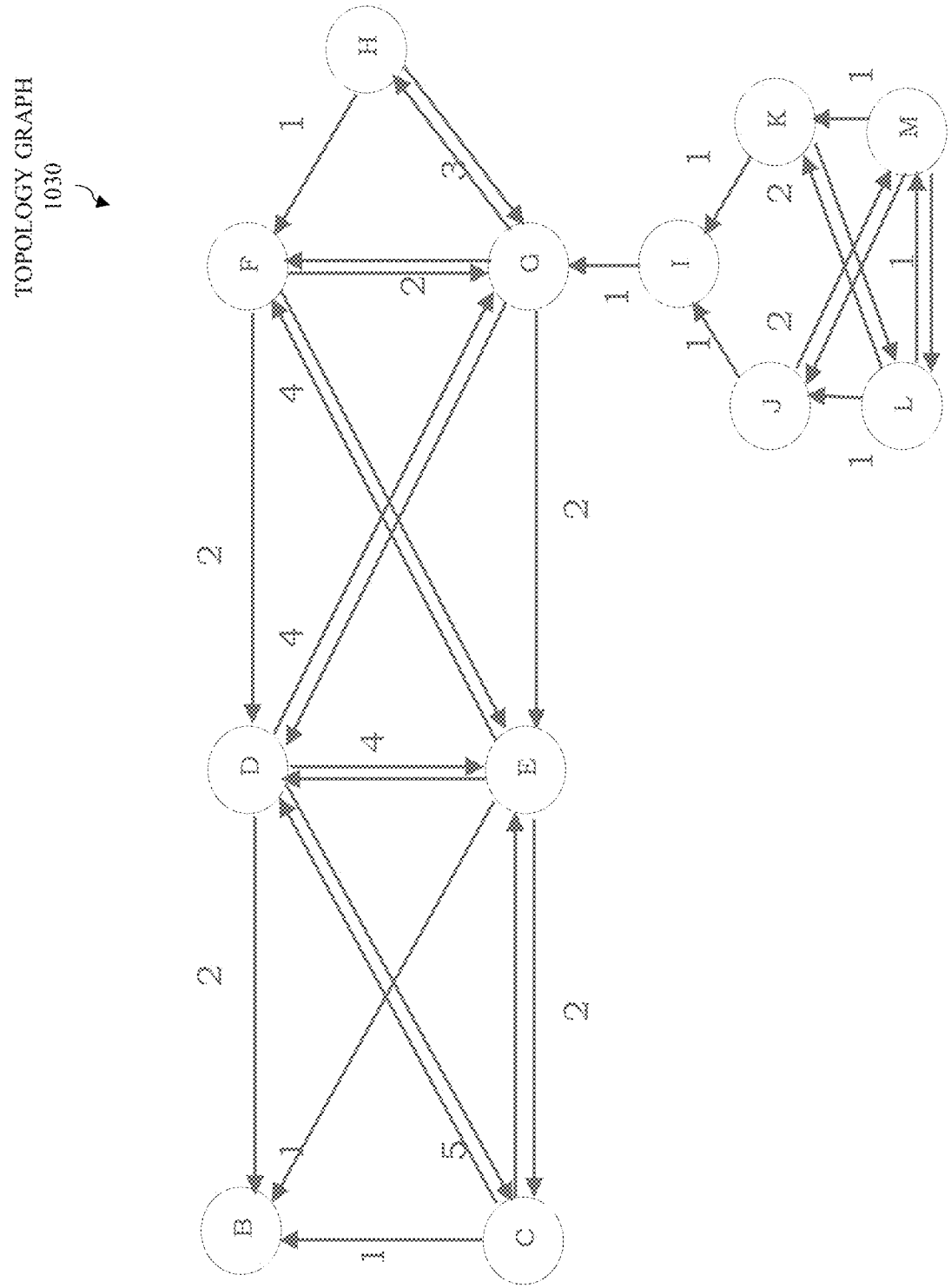
Figure 10D:
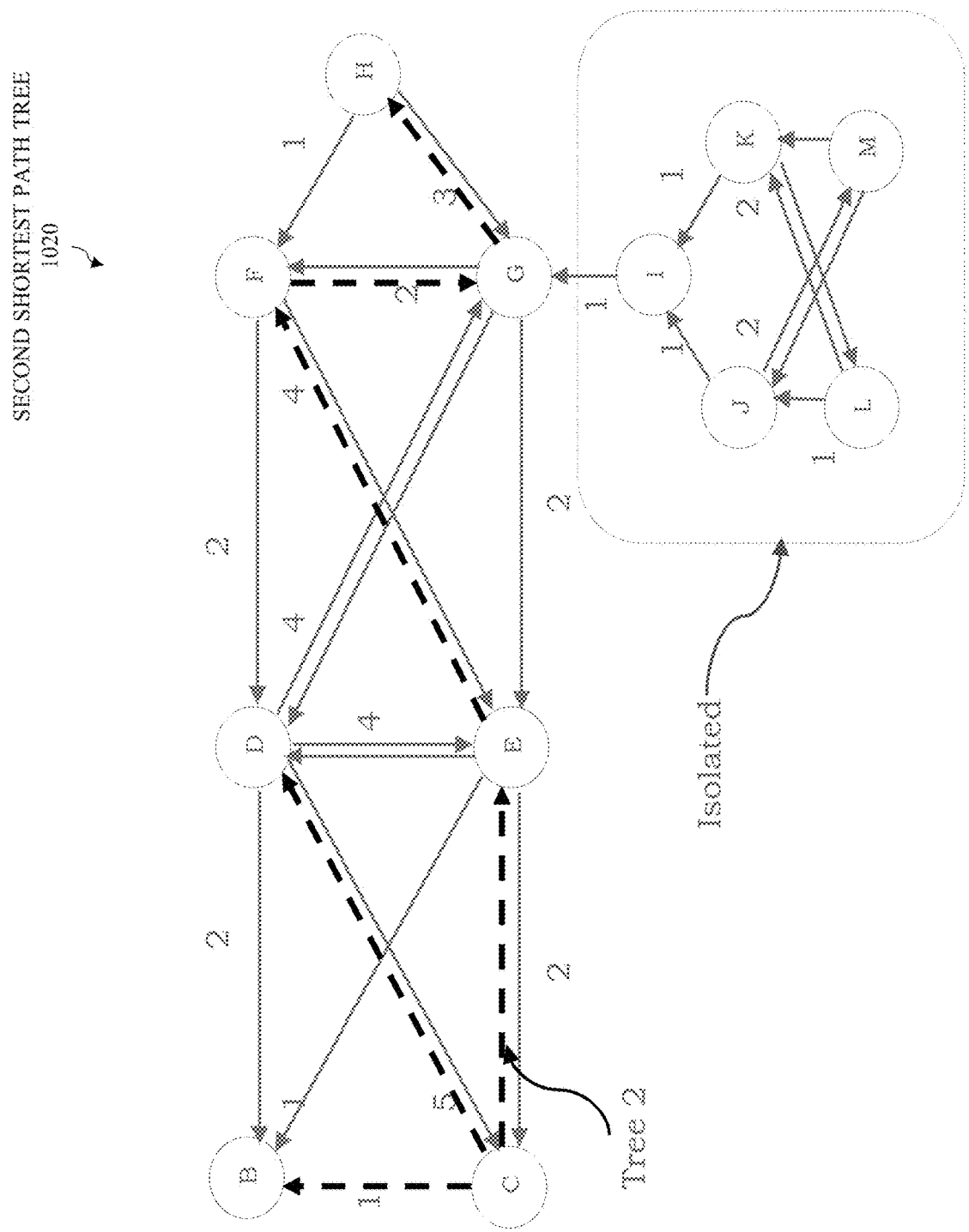

FIGS. 10A-10D depict an example embodiment for computing maximally disjoint trees in a packet switched network including a stub network. FIGS. 10A-10D depict network topology graphs and maximally disjoint trees computed from the neighboring nodes of node A, which are node B and node C, respectively. FIG. 10A depicts a topology graph 1010 which is used to compute the first SPT from node B. FIG. 10B depicts the first SPT 1020 (also denoted as Tree 1), which is computed from node B. After Tree 1 is computed, the logical links traversed by Tree 1 are removed from the topology graph. This results in the topology graph 1030 in FIG. 10C, which is used to compute next SPT. FIG. 10D depicts the second SPT 1040 (also denoted as Tree 2), which is computed from node C. It is found that nodes I-M are isolated and no longer participates is Tree 2. To include the nodes I-M in Tree 2, the following Tree Node Indirection technique may be used.

Various example embodiments may be configured to support use of tree node indirection (which also may be referred to herein as path indirection) in order to support use of RLB in stub networks. The parental hierarchy for each of the isolated nodes I-M is evaluated in the previous tree (Tree 1) to see if a second node in its parental hierarchy is a node in Tree 2. If yes, then the isolated node is included into Tree 2 as an "indirect" child of the second node, where the second node is a "gateway" for the isolated node in Tree 2. This is called tree node indirection. The nodes can be picked up in any order for the evaluation. The use of tree node indirection may be further understood by way of the following example based on the example of FIGS. 10A-10D.

In this example, computation of the maximally disjoint trees and use of the maximally disjoint trees for routing based on RLB may be performed as follows.

In this example, computation of the maximally disjoint trees may be performed as follows.

In this example, considering the example in FIG. 10D, the order of evaluation of isolated nodes I-M is as follows:

(1) L is picked first. In Tree 1, the parent of L is J. A determination is made as to whether J is included in Tree 2. J is not included in Tree 2, so a determination is made as to whether J's parent I in Tree 1 is included in Tree 2. I is not included in Tree 2, a determination is made as to whether I's parent G in Tree 1 is included in Tree 2. Since G is in Tree 2, G becomes the "gateway" for L, J, and I in Tree 2. So, the nodes L, J, and I are then marked as evaluated and resolved to their gateway.

(2) K is the next unresolved node. In Tree 1, the parent of K is I. Since I has already resolved its gateway as G, G becomes the gateway for K as well.

(3) M is the next unresolved node. In Tree 1, the parent of M is K. Since K has already resolved its gateway as G, G becomes the gateway for M as well. At this point, there are no more unresolved (isolated) nodes.

Figure 11:
FIG. 11 depicts an example embodiment of a routing table of a node that is configured to support tree node indirection.

In this example, after visiting each of the nodes I-M once, all nodes are resolved to G as their gateway by a recursive algorithm. Nodes I-M get included in Tree 2 by tree node indirection. The algorithm that implements the blocks outlined above is referred to herein as a "Gateway_Resolution" algorithm, an example embodiment of which is presented in FIG. 12. The routing table entries to nodes I-M in Tree 2 are programmed with the RLB-path of their gateway node G in Tree 2. Such a path is called an "path indirection". Since no more maximally disjoint trees are possible from either B or C, the resultant routing table in A is shown in FIG. 11 (which, it will be appreciated, may be compared to routing table in shortest path routed networks as depicted in FIG. 3B). Entries for I-M on Tree-2 are shown with Cost as "Indirect" since absolute cost cannot be computed for path indirections. It is noted that the RLB-path to a destination on each tree has a cost. The RLB-path with the least cost is the shortest path to the destination. As stated earlier, this approach also includes shortest path to every destination as a byproduct of the maximally disjoint trees.

In this example, use of the maximally disjoint trees for routing based on RLB may be performed as follows. When node A sends a packet via Tree 2 to any of the nodes in I-M, then it encodes the RLB-path to G into the packet. For example, when node A sends a packet on Tree 2 to node M then the packet is sent with RLB-path {E, F, G}. After traversing the RLB-path, the packet reaches node G as a "regular" packet. G finds that the destination of the packet is node M, so G performs RLB on its maximally redundant trees to send the RLB-packet to node M.

It will be appreciated that, although primarily presented with respect to use of example embodiments of tree node indirection in stub networks, various example embodiments of tree node indirection also may be applied in various other contexts (e.g., other suitable networks or portions thereof) as tree node indirection is a powerful technique for maximizing load balancing to nodes in packet networks. For example, tree node indirection may be applied to maximize load balancing to nodes in a portion of the network that does not have enough redundant path. Such portions of the network may get isolated after computation of certain number of maximally disjoint trees, whereas more trees are possible across rest of the network. In that case, the isolated portion of the network can be made reachable in subsequent trees with path indirection to the isolated nodes. It can also result in a path indirection hierarchy, wherein a gateway node further sends a packet to its indirect child via the RLB-path of another gateway node. In other words, the path indirection technique ensures that every node in the network is reachable by every maximally disjoint tree.

Various example embodiments presented herein are based on computation of maximally disjoint trees by a node based on topology database of the network (which, as discussed herein, may be performed using centralized or distributed mechanisms).

Various example embodiments for computation of maximally disjoint trees may be further understood by way of reference to FIG. 13-FIGS. 15A-15E. It will be appreciated that such example embodiments are primarily presented with the context of example embodiments of Option A and may be extended or adapted to support Option B, Option C, Option D, or the like, as well as various combinations thereof.

Figure 13:
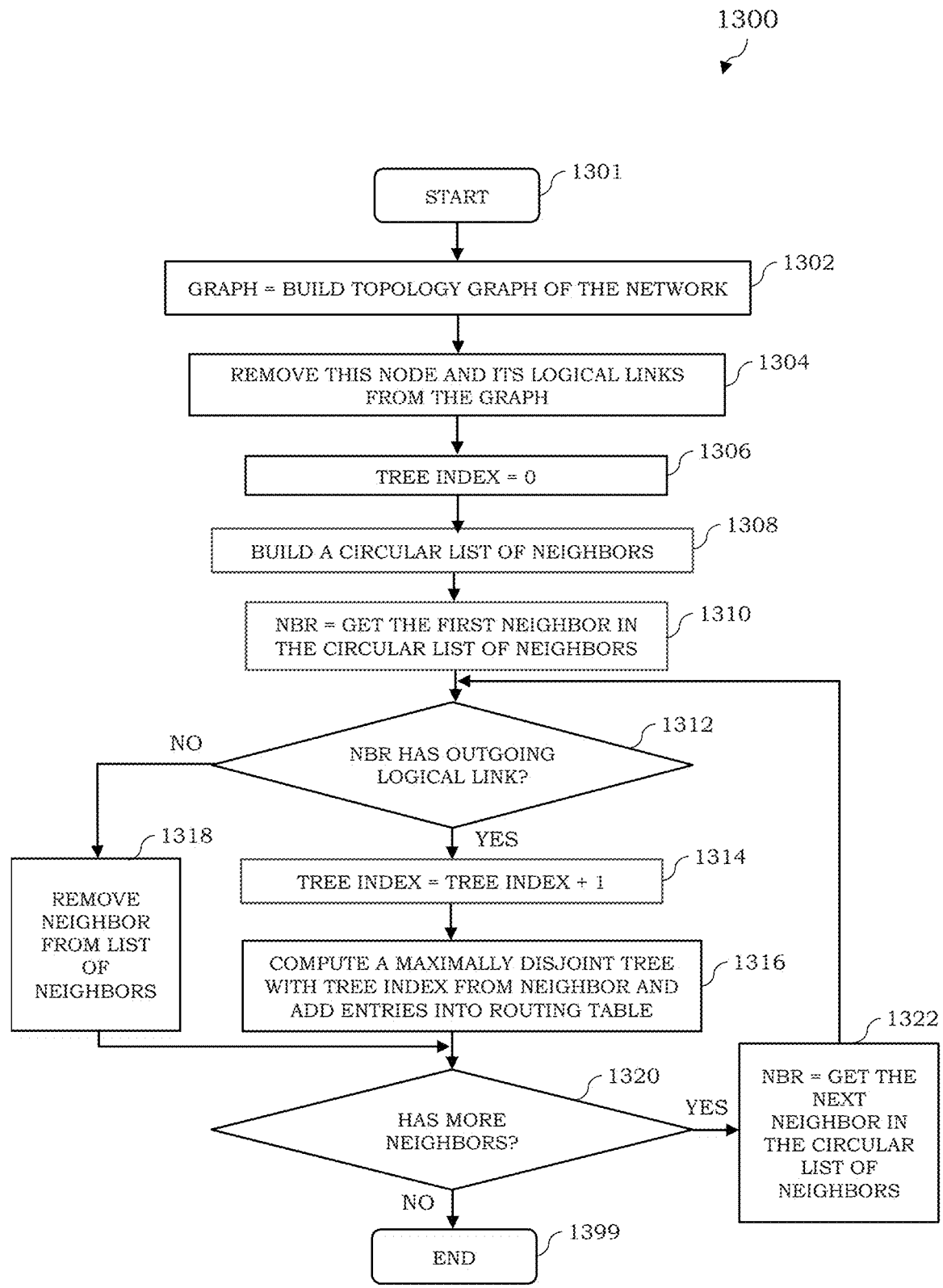
FIG. 13 depicts an example embodiment of a method for use by a node to compute maximally disjoint trees for RLB of packets by the node.

FIG. 13 depicts an example embodiment of a method for use by a node to compute maximally disjoint trees for RLB of packets by the node. It will be appreciated that the method 1300 of FIG. 13 is based on example embodiments of Option A and may be extended or adapted to support Option B, Option C, Option D, or the like, as well as various combinations thereof. It will be appreciated that, although primarily presented herein as being performed serially, at least a portion of the functions of method 1300 may be performed contemporaneously or in a different order than as presented in FIG. 13. At block 1301, the method 1300 begins. Block 1302 builds the topology graph of the network. The topology graph may be built with logical links or physical links. For purpose of clarity, it is assumed that the topology graph is built with logical links. From block 1302, the method 1300 proceeds to block 1304. Block 1304 removes this node and its logical links from the topology graph since a maximally disjoint tree is to be computed with a neighbor as the root of the tree and this node cannot be a destination node in that tree. From block 1304, the method 1300 proceeds to block 1306. Block 1306 initializes a local variable "Tree Index" to 0. For every tree to be computed, this variable is incremented and its value would be assigned to the tree. From block 1306, the method 1300 proceeds to block 1308. Block 1308 builds a circular list of all neighbors of this node, and the method 1300 then proceeds to block 1310. Block 1310 retrieves the first neighbor of this node, and then proceeds to block 1312. Block 1312 checks if the neighbor has at least one outgoing logical link in the topology graph. If the neighbor has at least one outgoing logical link in the topology graph, which means that a tree can be computed with the neighbor as the root, then the method 1300 proceeds to block 1314, otherwise the method 1300 proceeds to block 1318. Block 1318 removes the neighbor from the circular list of neighbors, since no more tree can be computed from this neighbor, and the method 1300 then proceeds to block 1320. Block 1314 computes the Tree ID for the next tree to be computed, by incrementing the value of Tree Index by one, and the method 1300 then proceeds to block 1316. Block 1316 computes a maximally disjoint tree rooted at the neighbor from the topology graph and then removes the logical links traversed by the tree from the topology graph. Then, if there are any nodes isolated from the tree, then block 1316 includes such nodes into the tree by Tree Node Indirection. So every other node in the network is included in the tree. This tree is assigned the Tree ID as its identification. Every node included in the tree is added into the routing table as a destination entry with the Tree ID and its RLB-path in the tree (or path indirection if an indirect node). From block 1316, the method 1300 proceeds to block 1320. Block 1320 checks if there are more neighbors in the circular list of neighbors. If there are no more neighbors in the list of neighbors, then the method 1300 proceed to block 1399 where the method 1300 ends, otherwise the method 1300 proceeds to block 1322. Block 1322 retrieves the next neighbor of this node and the method 1300 then returns to block 1312 to execute the subsequent blocks for computation of a maximally disjoint tree with the next neighbor as the root. It is noted that the method 1300 computes the trees among the neighbors in a round-robin fashion which guarantees a fairness among neighbors in utilization of the network resources (nodes, links) for its trees. The method of FIG. 13 is illustrated with the network described in FIG. 9. Blocks 1302-1304 results in the topology graph in FIG. 10A.

FIG. 14 depicts an example embodiment of a method for use by a node to compute a maximally disjoint tree from a neighbor of the node. It will be appreciated that the method 1400 of FIG. 14 may be used to provide block 1316 of the method 1300 of FIG. 13. It will be appreciated that, although primarily presented herein as being performed serially, at least a portion of the functions of method 1400 may be performed contemporaneously or in a different order than as presented in FIG. 14. The inputs to the method 1400 include a neighbor and the Tree ID for the tree to be computed from the neighbor as the root. At block 1401, the method 1400 begins. Block 1402 computes an SPT from the topology graph where the neighbor is the root of the SPT. It will be appreciated that various example embodiments may use alternate algorithms for computation of the tree, but Dijkstra's SPT is the algorithm leveraged here to also build shortest paths to every destination as the byproduct of a maximally disjoint tree. From block 1402, the method 1400 proceeds to block 1404. Block 1404 removes the logical links traversed by the tree from the topology graph, which is a key criteria to keep the trees computed from the graph maximally disjoint. From block 1404, the method 1400 proceeds to block 1406. Block 1406 adds the nodes of the computed tree as destination entries into routing table with the neighbor as the next hop, where the path to a node in the tree is added into its destination entry as RLB-path in the Tree ID. From block 1406, the method 1400 proceeds to block 1408. Block 1408 checks if there are any nodes in the network that are not included in the tree. If there are any nodes in the network that are not included in the tree then the method 1400 proceeds to block 1410, otherwise the method 1400 proceeds to block 1499 where the method 1400 ends. Block 1410 executes Tree Node Indirection procedure to resolve the gateway nodes into this tree for the isolated nodes. As a result, all isolated nodes are included into the tree as indirect nodes. From block 1410, the method 1400 proceeds to block 1412. Block 1412 adds each indirect node as destination entry into the routing table with the neighbor as the next hop, where the path to a node is added into its destination entry as path indirection (RLB-path of gateway) in the Tree ID. From block 1412, the method 1400 proceeds to block 1499 where the method 1400 ends.

Various example embodiments presented herein define an algorithm that integrates the blocks 1402-1406 of the method 1400 of FIG. 14. This integration is achieved by superimposing Dijkstra's SPT algorithm with the enhancements needed to compute maximally disjoint trees, while keeping the overall runtime complexity of the algorithm the same as Dijkstra's SPT algorithm. This integrated algorithm is referred to herein as "SPT-Ext", wherein "Ext" means "Extended".

It will be appreciated that various aspects of SPT-Ext may be further understand by first considering various principles of Dijkstra's SPT.

Dijkstra's SPT is a greedy algorithm to find the shortest path from a single source vertex to all other vertices in a given graph. In the algorithm, two sets are maintained as follows: (1) a shortest path tree set (denoted as "sptSet") includes vertices included in SPT and (2) a shortest path tree exclusion set (denoted as "sptExcludeSet") includes vertices not yet included in SPT.

Every vertex in sptSet includes information on the {next-hop, distance}. The next-hop is the next-hop from the source (i.e., edge from source) on the shortest path to the vertex. At the end of the SPT algorithm, every vertex in sptSet is programmed as a destination entry in the routing table (at the source), where the next-hop of the entry is the edge from the source on the shortest path to the destination. The distance is the cost of the shortest path to the vertex.

Every vertex in the sptExcludeSet includes information on the {next-hop, distance}. The distance is the cost of a vertex from source in a tentative path and next-hop is edge from source in the tentative path. Tentative path means that the path is a path through which the vertex is reachable from source, but that the path is not yet concluded to be the shortest path.

At every block of the algorithm, a vertex which is in the sptExcludeSet and has the minimum distance from the source among all remaining vertices in the sptExcludeSet is identified. The blocks of the algorithm are:

Block 1: Create a set sptSet that keeps track of vertices included in SPT, i.e., whose minimum distance from source is calculated and finalized. Initially, this set is empty.

Block 2: Create a set sptExcludeSet and put all vertices of the input graph in sptExcludeSet. For every vertex, initialize distance values as INFINITE and next-hop values as NONE, because no tentative path to it is found yet. Assign distance value as 0 for the source vertex so that it is picked first.

Block 3: While sptExcludeSet is not empty, (a) pick a vertex u from sptExcludeSet that has the minimum distance value, (b) include u to sptSet, and (c) update the distance and next-hop values of all adjacent vertices of u in sptExcludeSet. To update the distance and next-hop values, iterate through all adjacent vertices. For every adjacent vertex v, if the sum of distance value of u and the weight of edge u→v is less than the distance value of v, then update the distance value of v. The next-hop value of v is set to the next-hop value of u. It will be appreciated that Block 3 is the greedy algorithm that moves all the vertices from sptExcludeSet to sptSet.

The SPT algorithm is illustrated in the network in FIG. 9 with B as the source. The algorithm uses the network's topology graph in FIG. 10A.

Initially, sptSet={ } and sptExcludeSet={B={NONE, 0}, C={NONE, INF}, D={NONE, INF}, E={NONE, INF}, F={NONE, INF}, G={NONE, INF}, H={NONE, INF}, I={NONE, INF}, J={NONE, INF}, K={NONE, INF}, L={NONE, INF}, M={NONE, INF}}, where INF indicates infinite and NONE means no next-hop.

Figure 15A:
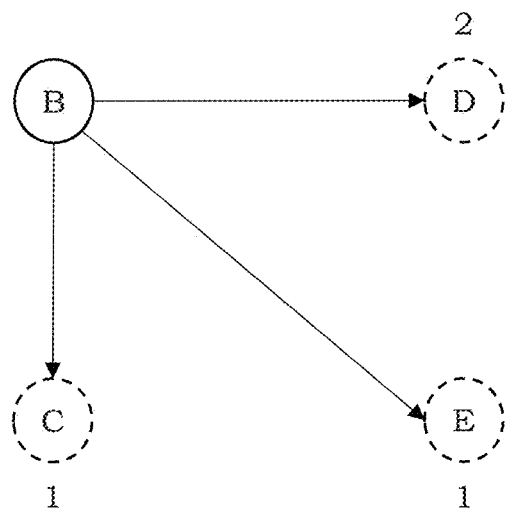
FIGS. 15A-15E depict an example embodiment of computation of a maximally disjoint tree for use in RLB.
Figure 15B:
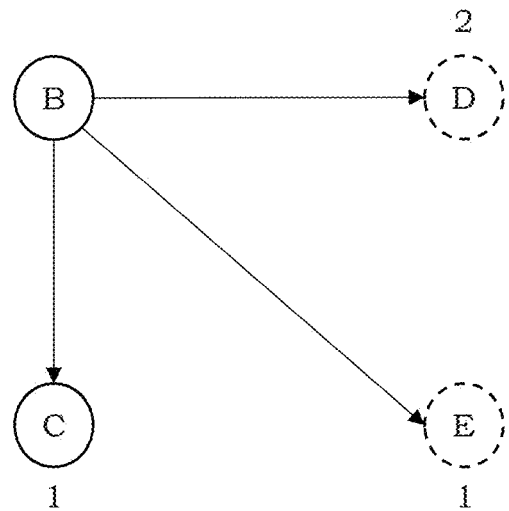
Figure 15C:
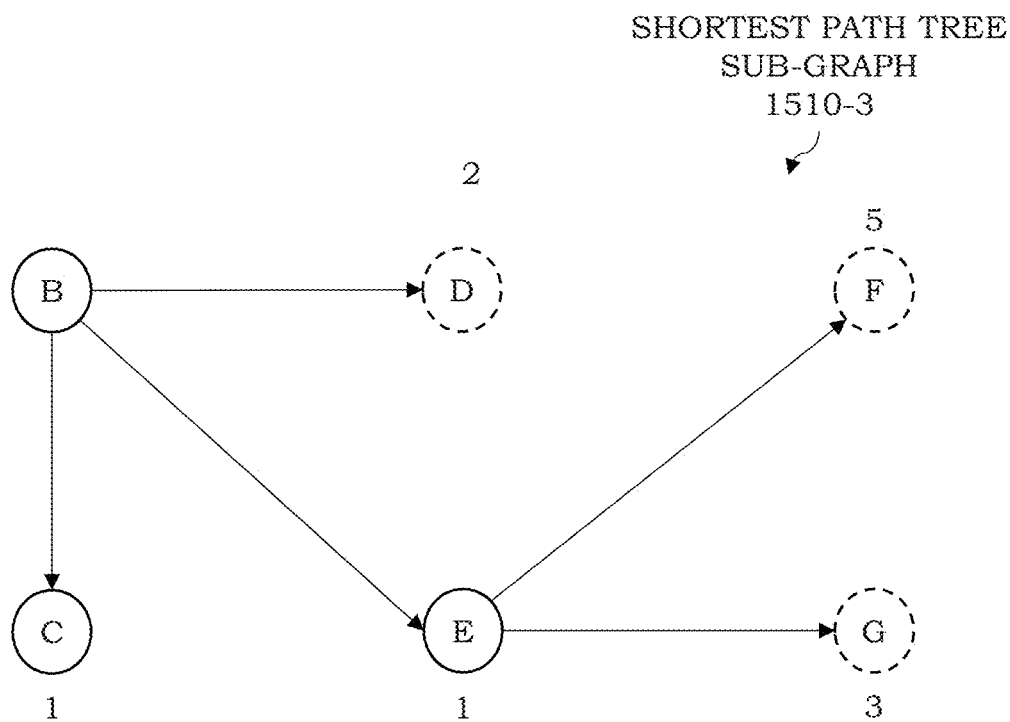
Figure 15D:
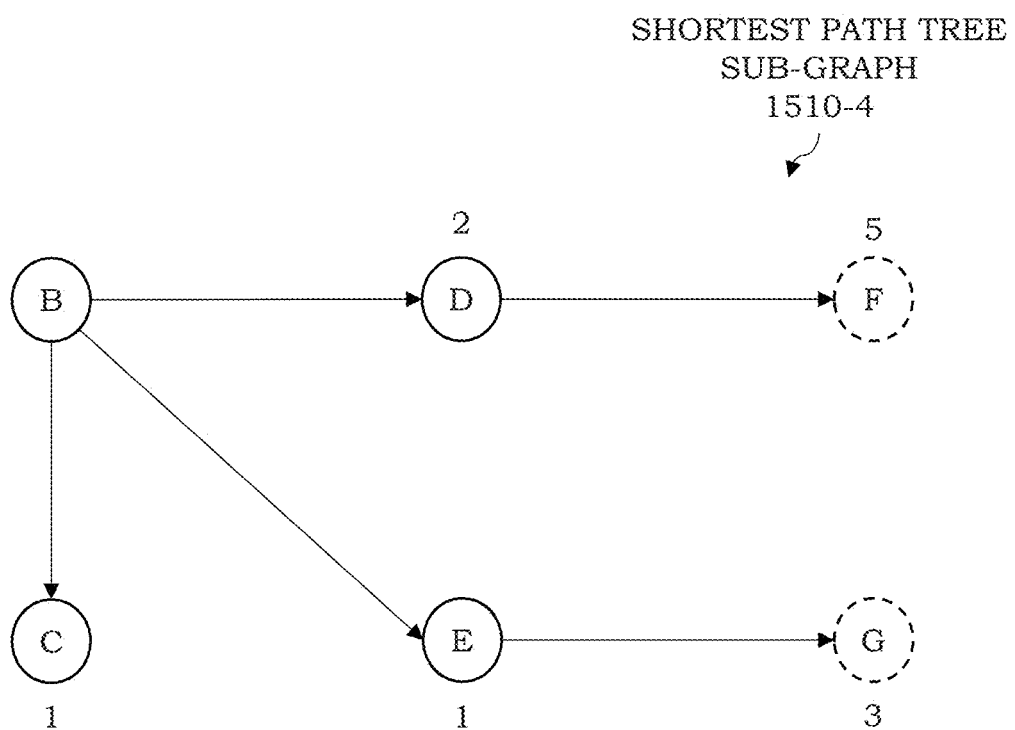

Pick the vertex from sptExcludeSet with minimum distance value and include it in sptSet. The vertex B is picked, so sptSet becomes {B={NONE, 0}}. After including the selected vertex to sptSet, update the distance values of its adjacent vertices in sptExcludeSet. The adjacent vertices of B are C, D, and E, so the distance values of C, D, and E are updated as 1, 2, and 1, respectively. Since B is the source (next-hop NONE), keep the next-hop values of C, D, and E as themselves. sptExcludeSet now becomes {C={C, 1}, D={D, 2}, E={E, 1}, F={NONE, INF}, G={NONE, INF}, H={NONE, INF}, I={NONE, INF}, J={NONE, INF}, K={NONE, INF}, L={NONE, INF}, M={NONE, INF}}. The subgraph in FIG. 15A shows vertices and their distance values, where only the vertices with finite distance values are shown. The vertices included in SPT are shown with dashed lines.

Pick the vertex from sptExcludeSet with the minimum distance value. There are two vertices C and E with minimum value 1. Assume that the vertex C is picked and added to sptSet. So sptSet now becomes {B={NONE, 0}, C={C, 1}}. Update the distance and next-hop values of adjacent vertices of C in sptExcludeSet. None of the adjacent vertices D or E changed. sptExcludeSet now becomes {D={D, 2}, E={E, 1}, F={NONE, INF}, G={NONE, INF}, H={NONE, INF}, I={NONE, INF}, J={NONE, INF}, K={NONE, INF}, L={NONE, INF}, M={NONE, INF}}. The sub-graph now is the one depicted in FIG. 15B.

Pick the vertex from sptExcludeSet with minimum distance value. The vertex E is picked and added to sptSet. So sptSet now becomes {B={NONE, 0}, C={C, 1}, E={E, 1}}. Update the distance and next-hop values of adjacent vertices of E in sptExcludeSet. The distance value of vertex F becomes 5 and G becomes 3. sptExcludeSet now becomes {D={D, 2}, F={E, 5}, G={E, 3}, H={NONE, INF}, I={NONE, INF}, J={NONE, INF}, K={NONE, INF}, L={NONE, INF}, M={NONE, INF}}. The sub-graph now is the one depicted in FIG. 15C.

Pick the vertex from sptExcludeSet with minimum distance value. The vertex D is picked and added to sptSet. So sptSet now becomes {B={NONE, 0}, C={C, 1}, E={E, 1}, D={D, 2}}. Update the distance and next-hop values of adjacent vertices of D in sptExcludeSet. The distance value of vertex F is updated to 4. Next-hop to F changes from E to D. sptExcludeSet now becomes {F={D, 4}, G={E, 3}, H={NONE, INF}, I={NONE, INF}, J={NONE, INF}, K={NONE, INF}, L={NONE, INF}, M={NONE, INF}}. The sub-graph now is the one depicted in FIG. 15D.

Figure 15E:
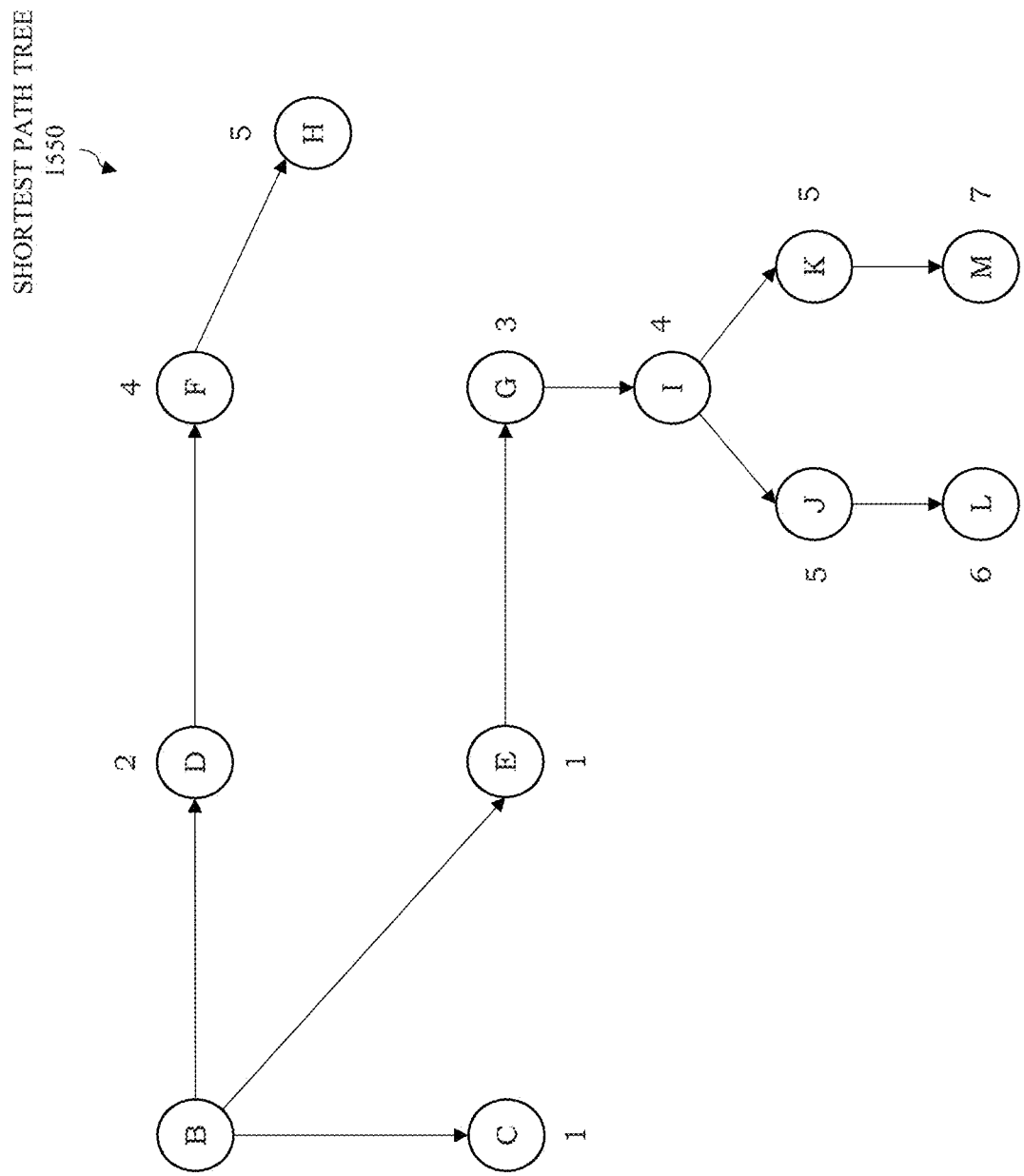

The above blocks are repeated until the sptExcludeSet becomes empty, eventually resulting in the SPT depicted in FIG. 15E. The sptSet becomes {B={NONE, 0}, C={C, 1}, D={D, 2}, E={E, 1}, F={D, 4}, G={E, 3}, H={D, 5}, I={E, 4}, J={E, 5}, K={E, 5}, L={E, 6}, M={E, 6}} which contains the entries for the routing table in B.

It will be appreciated that the SPT algorithm can be implemented with complexity O(E log V), where E is the number of edges and V is the number of vertices in the topology graph.

SPT-Ext uses Dijkstra's SPT algorithm with enhancements for computing the maximally disjoints trees. In SPT-Ext, two sets are maintained as follows: (1) a shortest path tree set (denoted as "sptSet") includes vertices included in SPT-Ext and (2) a shortest path tree exclusion set (denoted as "sptExcludeSet") includes vertices not yet included in SPT-Ext.

Every vertex in the sptSet includes information on the {path, distance}. The path is the ordered set of edges on the shortest path from source of the SPT to the vertex. If the edges are logical links then the path can be an ordered set of vertices on the shortest path from source to the vertex. The distance is the cost of the shortest path from the source to the vertex.

Every vertex in the sptExcludeSet includes information on the {parent's edge, distance}. The parent's edge is the edge that connects the parent (or previous) vertex to this vertex on a tentative path from source to the vertex. The distance is the cost of the vertex from source in the tentative path. A tentative path means that the path is a path through which the vertex is reachable from source, but that the path is not yet concluded to be the shortest path.

At every block of the algorithm, we find a vertex which is in the sptExcludeSet and has a minimum distance from the source. The blocks of the algorithm are:'

Block 1: Create a set sptSet that keeps track of vertices included in SPT-Ext, i.e., whose minimum distance from source is calculated and finalized. Initially, this set is empty.

Block 2: Create a set sptExcludeSet and put all vertices of the input graph in sptExcludeSet. For every vertex, initialize distance values as INFINITE and parent's edge values as NONE, because no tentative path to it is found yet. Assign distance value as 0 for the source vertex so that it is picked first.

Block 3: While sptExcludeSet is not empty: (a) pick a vertex u from sptExcludeSet that has the minimum distance value, (b) find the parent from the parent's edge value and append the parent's edge to the parent's path to obtain the shortest path from source to u, (c) remove the parent's edge from the topology graph, (d) include u to sptSet and set the path in u to the shortest path obtained from block b, and (e) update distance and parent's edge values of all adjacent vertices of u in sptExcludeSet. To update the distance and parent's edge values, iterate through all adjacent vertices. For every adjacent vertex v, if sum of distance value of u and weight of edge u→v, is less than the distance value of v, then update the distance value of v. The parent's edge value of v is set to the edge u→v. It will be appreciated that, in block 3, the sub-blocks a, d, and e are similar to Dijkstra's SPT. The sub-blocks b and c involve O(1) operations. So, the computational complexity of SPT-Ext=SPT=O(E log V).

It will be appreciated that various blocks of the SPT-Ext algorithm may correspond to blocks of the method 1400 of FIG. 14. Blocks 1, 2, and 3 (a,d,e) are the implementation of block 1402 in FIG. 14 by the originating node. Block 3*c* is the implementation of block 1404 in FIG. 14. In block 3*d*, adding a vertex to sptSet is conceptually the same as adding a RLB-path to a destination (vertex) along a tree (Tree ID) into the routing table of the node performing RLB. The next-hop neighbor for the RLB-path is the source in the sptSet. So block 3*d* is the implementation of block 1406 in FIG. 14. Thus, SPT-Ext integrates the blocks 1402-1406 in FIG. 14.

It will be appreciated that various aspects of SPT-Ext may be further understood with respect to the following example.

In this example, assume that the topology graph in block 1402 is the one in FIG. 10A, i.e., the first maximally disjoint tree is being computed, i.e., inputs in FIG. 14 are Neighbor=B, Tree ID=1.

Initially, sptSet={ } and sptExcludeSet={B={NONE, 0}, C={NONE, INF}, D={NONE, INF}, E={NONE, INF}, F={NONE, INF}, G={NONE, INF}, H={NONE, INF}, I={NONE, INF}, J={NONE, INF}, K={NONE, INF}, L={NONE, INF}, M={NONE, INF}}, where INF indicates infinite distance and NONE means no parent's edge.

Pick the vertex from sptExcludeSet with the minimum distance value and include the vertex in sptSet. In this example, the vertex B is picked and, since B is the source, the path is empty (NONE). So, sptSet becomes {B={NONE, 0}}. After including B in sptSet, update the distance and parent's edge values of its adjacent vertices in sptExcludeSet. The adjacent vertices of node B are nodes C, D, and E. The distance values of C, D, and E are updated as 1, 2, and 1, respectively. The parent's edge values of C, D, and E are updated to B→C. sptExcludeSet now becomes {C={B→C, 1}, D={B→D, 2}, E={B→E, 1}, F={NONE, INF}, G={NONE, INF}, H={NONE, INF}, I={NONE, INF}, J={NONE, INF}, K={NONE, INF}, L={NONE, INF}, M={NONE, INF}}. The subgraph at this stage is same as in FIG. 15A.

Pick the vertex from sptExcludeSet with minimum distance value. There are two vertices C and E with minimum value 1. Assume that the vertex C is picked and added to sptSet. Its parent's edge B→C is appended to the path of parent (which is NONE), thereby resulting in only the edge B→C in the path to C. So, sptSet now becomes {B={NONE, 0}, C={B→C, 1}}. Update the distance and parent's edge values of adjacent vertices of C in sptExcludeSet. None of the adjacent vertices D, E changed. sptExcludeSet now becomes {D={B→D, 2}, E={B→E, 1}, F={NONE, INF}, G={NONE, INF}, H={NONE, INF}, I={NONE, INF}, J={NONE, INF}, K={NONE, INF}, L={NONE, INF}, M={NONE, INF}}. The sub-graph at this stage is same as in FIG. 15B.

Pick the vertex from sptExcludeSet with minimum distance value. The vertex E is picked and added to sptSet. Its parent's edge B→E is appended to the path of the parent (which is NONE), thereby resulting in only the edge B→E in the path to E. So, sptSet now becomes {B={NONE, 0}, C={B→C, 1}, E={B→E, 1}}. Update the distance and parent's edge values of adjacent vertices of E in sptExcludeSet. The distance value of vertex F becomes 5 and the distance value of G becomes 3. The parent's edge values of F and G are updated to E→F and E→G, respectively. sptExcludeSet now becomes {D={B→D, 2}, F={E→F, 5}, G={E→G, 3}, H={NONE, INF}, I={NONE, INF}, J={NONE, INF}, K={NONE, INF}, L={NONE, INF}, M={NONE, INF}}. The sub-graph at this stage is same as in FIG. 15C.

Pick the vertex from sptExcludeSet with minimum distance value. The vertex D is picked and added to sptSet. Its parent's edge B→D is appended to the path of parent (which is NONE), thereby resulting in only the edge B→D in the path to D. So, sptSet now becomes {B={NONE, 0}, C={B→C, 1}, E={B→E, 1}, D={B→D, 2}}. Update the distance and parent's edge values of adjacent vertices of D in sptExcludeSet. The distance value of vertex F is updated to 4. Parent's edge of F changes from E→F to D→F. sptExcludeSet now becomes {F={D→F, 4}, G={E→G, 3}, H={NONE, INF}, I={NONE, INF}, J={NONE, INF}, K={NONE, INF}, L={NONE, INF}, M={NONE, INF}}. The sub-graph at this stage is same as in FIG. 15D.

The above blocks are repeated until the sptExcludeSet becomes empty, eventually resulting in the SPT depicted in FIG. 15E, which is the first maximally disjoint tree (Tree 1) of FIG. 10B. The topology graph at this stage is the one in FIG. 10C. The sptSet becomes {B={NONE, 0}, C={B→C, 1}, D={B→D, 2}, E={B→E, 1}, F={{B→D, D→F}, 4}, G={{B→E, E→G}, 3}, H={{B→D, D→F, F→H}, 5}, I={{B→E, E→G, G→I}, 4}, J={{B→E, E→G, G→I, I→J}, 5}, K={{B→E, E→G, G→I, I→K}, 5}, L={{B→E, E→G, G→I, I→J, J→L}, 6}, M={{B→E, E→G, G→I, I→K, K→M}, 6}}. Since, the links in the topology graph were logical links, so the paths in the sptSet can be expressed by the sequence of nodes: {B={NONE, 0}, C={C, 1}, D={D, 2}, E={E, 1}, F={{D, F}, 4}, G={{E, G}, 3}, H={{D, F, H}, 5}, I={{E, G, 4}, J={{E, G, I, J}, 5}, K={{E, G, I, K}, 5}, L={{E, G, I, J, L}, 6}, M={{E, G, I, K, MI, 6}}.

If the weight of the edge from vertex A to vertex B (the source of the SPT) is added to the each vertex in the sptSet, then vertices in the sptSet are the destination entries in the routing table in node A (FIG. 11) with their RLB-path in Tree 1. This addition could be performed with O(1) complexity in block 3d, while including a vertex into sptSet. The SPT-Ext algorithm can be implemented with complexity O(E log V), which is same as the SPT algorithm.

After computation of Tree 1, the check in block 1408 results in false (NO) since all nodes in the network are included in Tree 1. So the method in FIG. 14 terminates.

Now, the method in FIG. 14 is executed again for the second SPT rooted at node C, i.e., inputs in FIG. 14 are Neighbor=C, Tree ID=2. So, the topology graph in block 1402 is the one in FIG. 10C. By executing the SPT-Ext algorithm on the topology in FIG. 10C in blocks 1402-1406, the second SPT is computed, which results in the Tree 2 in FIG. 10D. If the weight of the edge from vertex A to vertex C (the source of the SPT) is added to the each vertex in the sptSet, then vertices in the sptSet are the destination entries A-H in the routing table in node A (FIG. 11) with their RLB-path in Tree 2.

After computation of Tree 2, the check in block 1408 results in true (YES) since nodes I-M are not included in Tree 2. So block 1410 is executed to include the nodes I-M into Tree 2 by using Tree Node Indirection Procedure on Tree 1, which is implemented by Gateway_Resolution( ) described in FIG. 12. Block 1412 can be integrated into Gateway_Resolution( ) where, after the gateway for a node is resolved, the node can be programmed into the routing table in FIG. 11 as a destination entry with path indirection in Tree 2. To generalize, assume that V3 is the number of isolated nodes (vertices) and V2 is the number of nodes included in previous tree. In Gateway_Resolution( ) each isolated node is visited once and for each visit its parent is looked up in the previous tree (e.g., Tree 1) of V2 nodes. Each lookup can be implemented with complexity O(1) if the nodes included in the previous tree are marked or colored. So, the overall complexity of Gateway_Resolution( ) becomes O(V3). Assume that V1 is the number of vertices and E1 be the number of edges in the topology graph of the current tree (e.g., Tree 2). Then, the complexity of blocks 1402-1406 is O(E1 log V1)+O(V3), which is less than or equal to O(E log V), where E is the number of edges and V is number of nodes/vertices in the topology graph of the network (i.e., the graph used to compute the first tree). It is noted that the complexity of Dijkstra's SPT computation in a shortest path routed network is O(E log V).

Various example embodiment configured to enable a node to support RLB of packets across maximally disjoint trees may be further understood by way of reference to FIG. 16, FIGS. 17A and 17B, FIG. 18, and FIGS. 19A and 19B. For example, in FIG. 9, node A would use such methods to perform RLB of packets across Tree 1 and Tree 2, and node G would use such methods to forward path-indirected packets from node A to nodes I-M.

Figure 16:
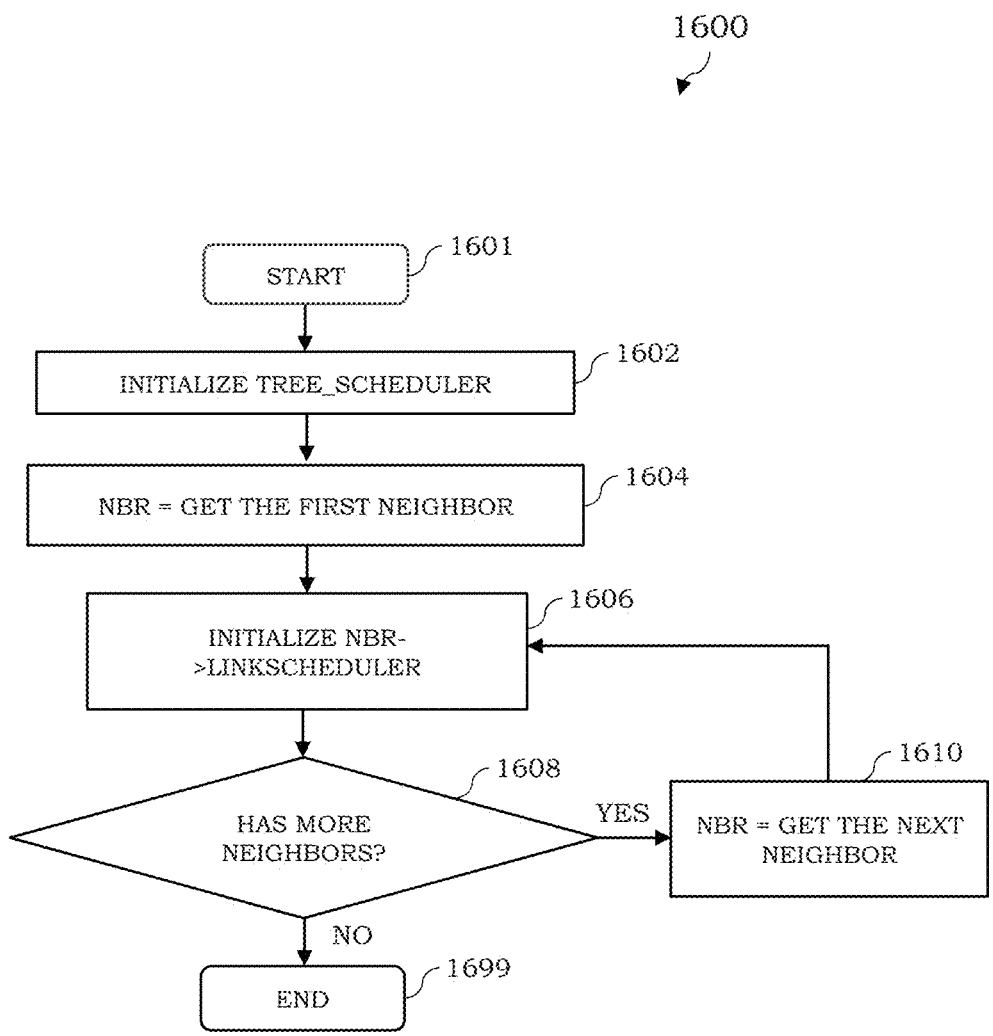
FIG. 16 depicts an example embodiment of a method for use by a node to configure packet schedulers used for RLB of packets in the node.

FIG. 16 depicts an example embodiment of a method for use by a node to configure packet schedulers used for RLB of packets in the node. It will be appreciated that, although primarily presented herein as being performed serially, at least a portion of the functions of method 1600 may be performed contemporaneously or in a different order than as presented in FIG. 16. At block 1601, the method 1600 begins. Block 1602 initializes the round-robin tree scheduler to be used by the node for RLB of packets across the maximally disjoint trees. The tree scheduler at least keeps the index of the tree (namely, the Tree ID) on which the last packet was transmitted. From block 1602, the method 1600 proceeds to block 1604. Block 1604 retrieves the first neighboring node of this node, and the method 1600 then proceeds to block 1606. Block 1606 initializes a round-robin link scheduler for RLB of packets over the links to the neighbor (if there are multiple links to neighbor). The link scheduler at least keeps the index of the link (namely, the Link ID) to the neighbor on which the last packet was transmitted. From block 1606, the method 1600 proceeds to block 1608. Block 1608 checks if there are more neighboring nodes. If there are more neighboring nodes then the method 1600 proceeds to block 1610, otherwise the method 1600 proceeds to block 1699 where the method 1600 ends. Block 1610 retrieves the next neighboring node, and the method 1600 then returns to block 1606 to repeat subsequent blocks for this neighbor.

Figure 17A:
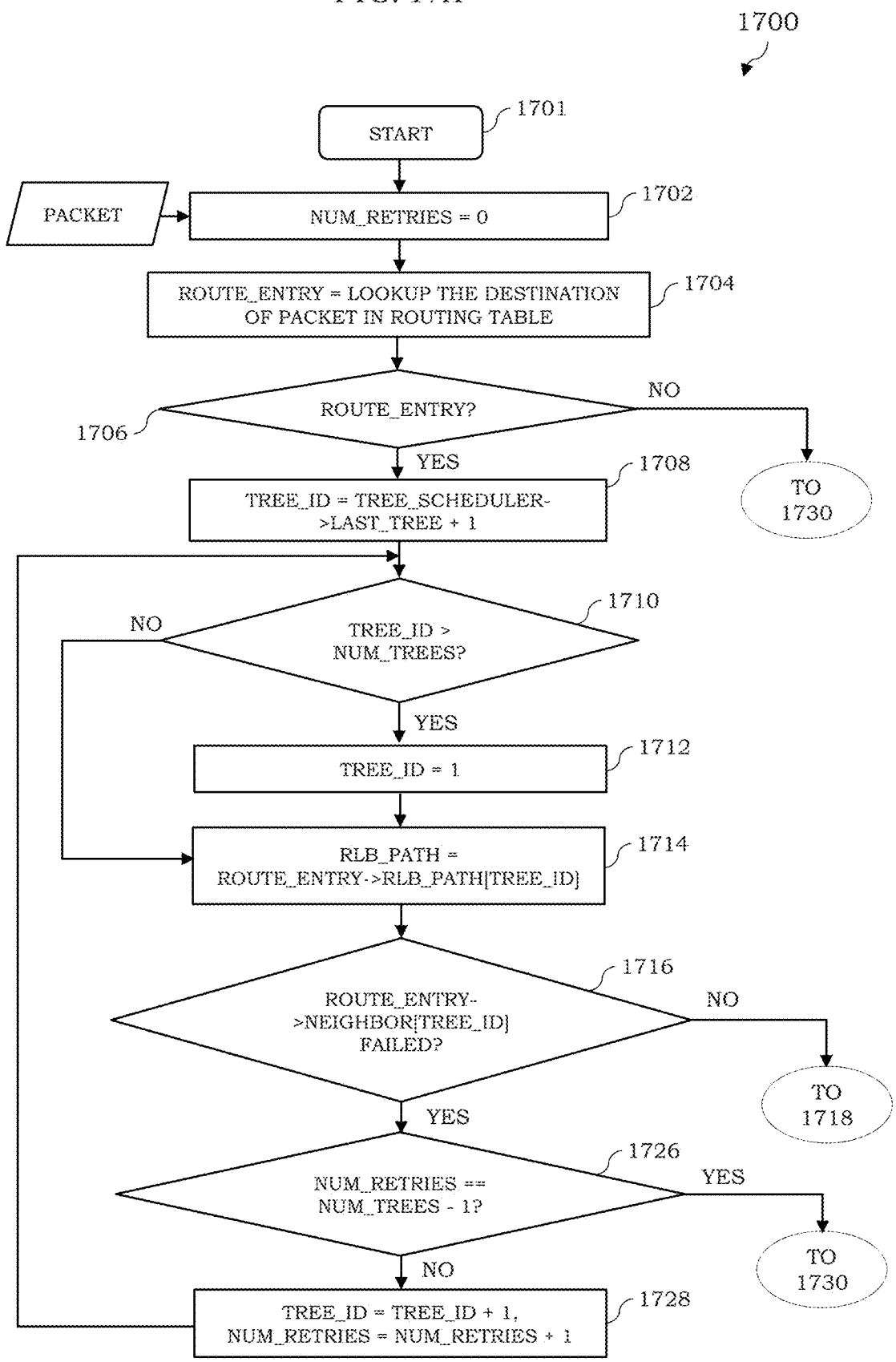
FIGS. 17A and 17B depict an example embodiment of a method for use by a node to send a packet using RLB.
Figure 17B:
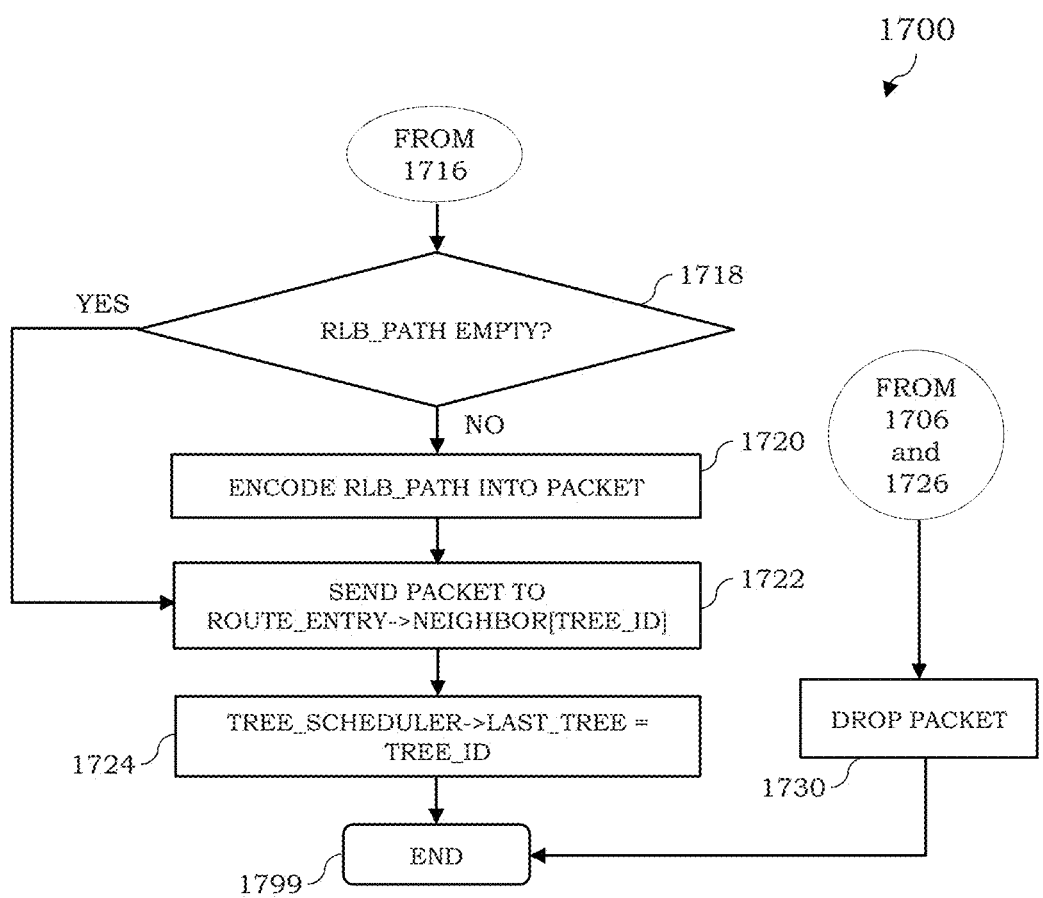

FIGS. 17A and 17B depict an example embodiment of a method for use by a node to send a packet using RLB. It is noted that the node could be any node that is ingress for a packet to be routed through the RLB domain, or a gateway node that receives a packet via path indirection which needs to be forwarded to its destination (child) by RLB. It will be appreciated that, although primarily presented herein as being performed serially, at least a portion of the functions of method 1700 may be performed contemporaneously or in a different order than as presented in FIGS. 17A and 17B. The input to the method 1700 is a packet to be routed by using RLB. At block 1701, the method 1700 begins. Block 1702 initializes a local variable Num_Retries to 0. This variable is used to retry sending the packet via alternate trees if the neighbor for the tree selected to send the packet to next-hop has failed (see blocks 1726-1728). From block 1702, the method 1700 proceeds to block 1704. Block 1704 looks up the destination node of the packet in the routing table, and the method 1700 then proceeds to block 1706. Block 1706 checks if a matching route entry is found. If no matching route entry is found then the method 1700 proceeds to 1730, otherwise the method 1700 proceeds to 1708. Block 1730 drops the packet, and the method 1700 then proceeds to block 1799 where the method 1700 ends. Block 1708 determines the Tree ID for the packet by incrementing the Tree ID on which the last packet was sent (which is kept on record by the tree scheduler). It is noted that a transit node of an RLB-packet sends a packet to the next-hop by RLB, which guarantees absolute fairness of all kinds of traffic at the transit node. From block 1708 the method 1700 proceeds to block 1710. Block 1710 checks if the computed Tree ID is greater than the total number of maximally disjoint trees from this node. If the computed Tree ID is greater than the total number of maximally disjoint trees from this node then the method 1700 proceeds to block 1712, otherwise the method 1700 proceeds to block 1714. Block 1712 determines the Tree ID for the packet as 1 (i.e., the round-robin scheduling is wrapping around), and the method 1700 then proceeds to block 1714. Block 1714 reads the RLB-path in the route entry for the chosen Tree ID, and the method 1700 then proceeds to block 1716. Block 1716 checks if the neighbor in the route entry for the chosen Tree ID has failed. This is the case when the neighbor has failed and the node is yet to re-compute the maximally disjoint trees due to the topology change. If the neighbor in the route entry for the chosen Tree ID has failed then the method 1700 proceeds to block 1726, otherwise the method 1700 proceeds to block 1718. Block 1726 checks if the method 1700 already retried sending the packet via all remaining alternate trees (because this block is repeated while trying to find alternate trees). This check is performed by checking if Num_Retries is equal to the total number of trees minus one. If the method 1700 has already retried sending the packet via all remaining alternate trees then it means that neighbors to all maximally disjoint trees have failed and, thus, the method 1700 proceeds to block 1730. At block 1730, the packet is dropped. From block 1730, the method 1700 proceeds to block 1799 where the method 1700 ends. If the method 1700 has not yet retried sending the packet via all remaining alternate trees then the method 1700 proceeds to block 1728. Block 1728 increments both Tree ID and Num_Retries by 1, which means trying to send the packet by the next tree in the sequence. From block 1728, the method 1700 returns to block 1710 to try sending the packet over the next Tree ID. Block 1718 checks if the RLB-path is empty. This would be the case when the destination of the packet is a neighbor and the packet is sent on the tree that includes the logical link to the neighbor. For example, this would be the case in FIG. 9 if this node is A and it is sending a packet to B over Tree 1. If the RLB-path is empty then the method 1700 proceeds to block 1722, otherwise the method 1700 proceeds to block 1720. Block 1720 encodes the RLB-path into the packet, and the method 1700 then proceeds to block 1722. Block 1722 sends the packet to the neighbor for the chosen Tree ID in the route entry, and the method 1700 then proceeds to block 1724. Block 1724 updates the Tree ID in the tree scheduler to the Tree ID on which the RLB-packet was sent. From block 1724, the method 1700 proceeds to block 1799 where the method 1700 ends. At block 1799, the method 1700 ends.

FIG. 18 depicts an example embodiment of a method for use by a node to send a packet to a neighbor for a chosen tree. It will be appreciated that the method 1800 of FIG. 18 may be used to implement block 1722 of the method 1700 of FIGS. 17A and 17B. It will be appreciated that, although primarily presented herein as being performed serially, at least a portion of the functions of method 1800 may be performed contemporaneously or in a different order than as presented in FIG. 18. The inputs to the method 1800 include a packet (e.g., a regular packet or an RLB-packet) and an indication of a neighbor to which the packet is to be transmitted. At block 1801, the method 1800 begins. Block 1802 initializes a local variable Num_Retries to 0. This variable is used to retry sending the packet via alternate links if the link selected to send the packet to next-hop has failed (see blocks 1818-1820). From block 1802, the method 1800 proceeds to block 1804. Block 1804 checks if there are multiple links to the neighbor. For example, in the network in FIG. 9, this would be the case of sending of a packet by node D to node F. If there are multiple links to the neighbor then the method 1800 proceeds to block 1806, otherwise the method 1800 proceeds to block 1810. Block 1806 determines the Link ID for this packet by incrementing the Link ID on which the last packet was sent (which is kept on record by the link scheduler for the neighbor), and the method 1800 then proceeds to block 1808. Block 1808 checks if the computed Link ID is greater than the number of links to the neighbor. If the computed Link ID is greater than the number of links to the neighbor then the method 1800 proceeds to block 1810, otherwise the method 1800 proceeds to block 1812. Block 1810 determines the Link ID for the packet as 1 (i.e., round-robin scheduling is wrapping around or there is only one link to the neighbor), and the method 1800 then proceeds to block 1812. Block 1812 checks if the link for the Link ID has failed. If the link for the Link ID has failed then the method 1800 proceeds to block 1818, otherwise the method 1800 proceeds to block 1814. Block 1818 checks if the method 1800 has already retried sending the packet via all remaining links (because this block is repeated while trying to find alternate links). This check is performed by checking if Num_Retries is equal to the total number of links minus one. If the method 1800 has already retried sending the packet via all remaining links then it means that all links to the neighbor have failed and, thus, the method 1800 proceeds to block 1822. Block 1822 drops the packet. From block 1822, the method 1800 proceeds to block 1899 where the method 1800 ends. If the method 1800 has not retried sending the packet via all remaining links, then the method proceeds to block 1820. Block 1820 increments both Link ID and Num_Retries by 1, which means trying to send the packet by the next link in the sequence. From block 1820, the method 1800 returns to block 1808 to try sending the packet over the next Link ID. Block 1814 sends the packet on the link of the chosen Link ID to the neighbor, and then the method 1800 proceeds to block 1816. Block 1816 updates the Link ID in the link scheduler of the neighbor to the Link ID on which the RLB-packet was sent to neighbor. From block 1816, the method 1800 proceeds to block 1899 where the method 1800 ends. At block 1899, the method 1800 ends.

Figure 19A:
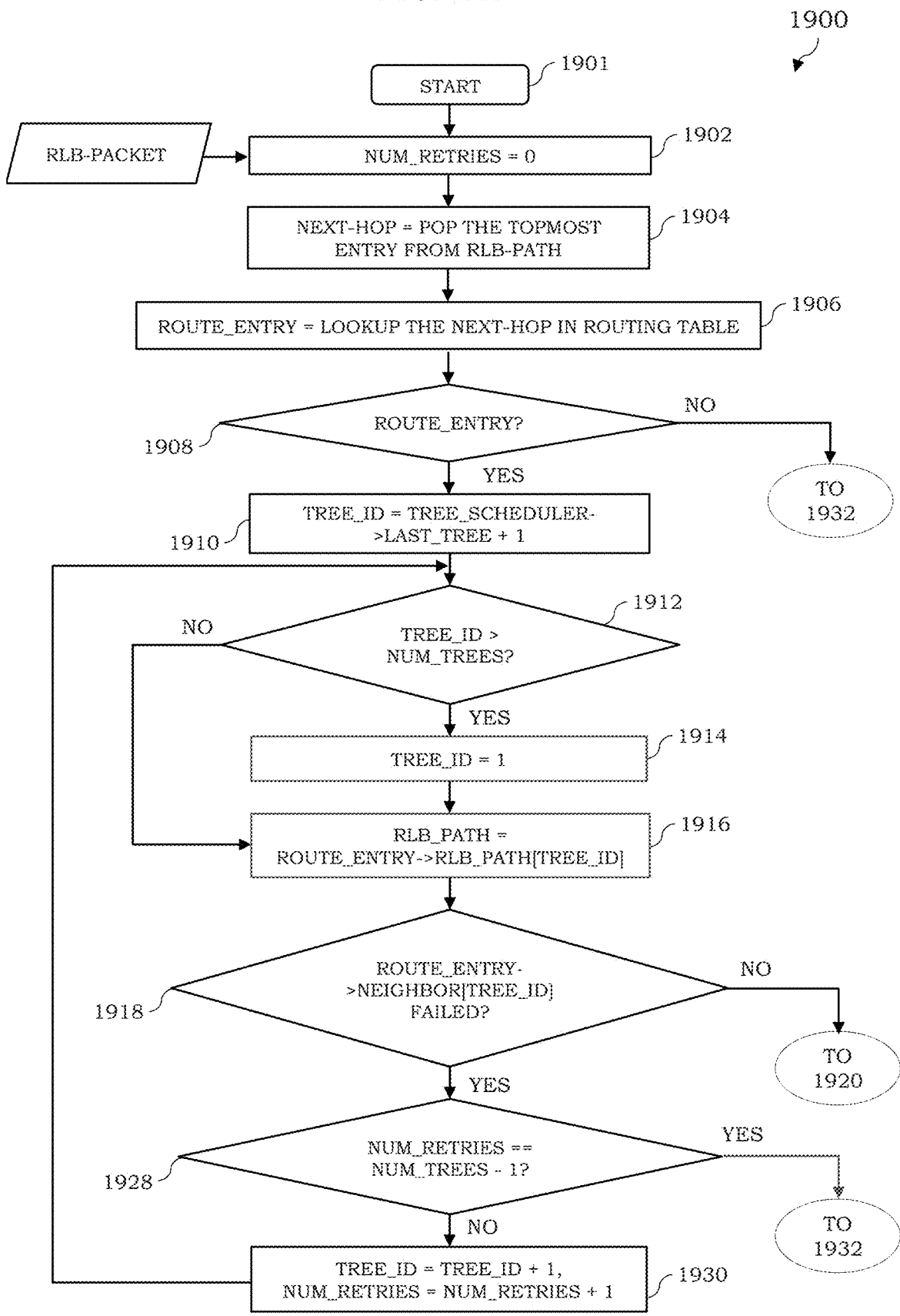
FIGS. 19A and 19B depict an example embodiment of a method for use by a node to process a received RLB-packet.
Figure 19B:
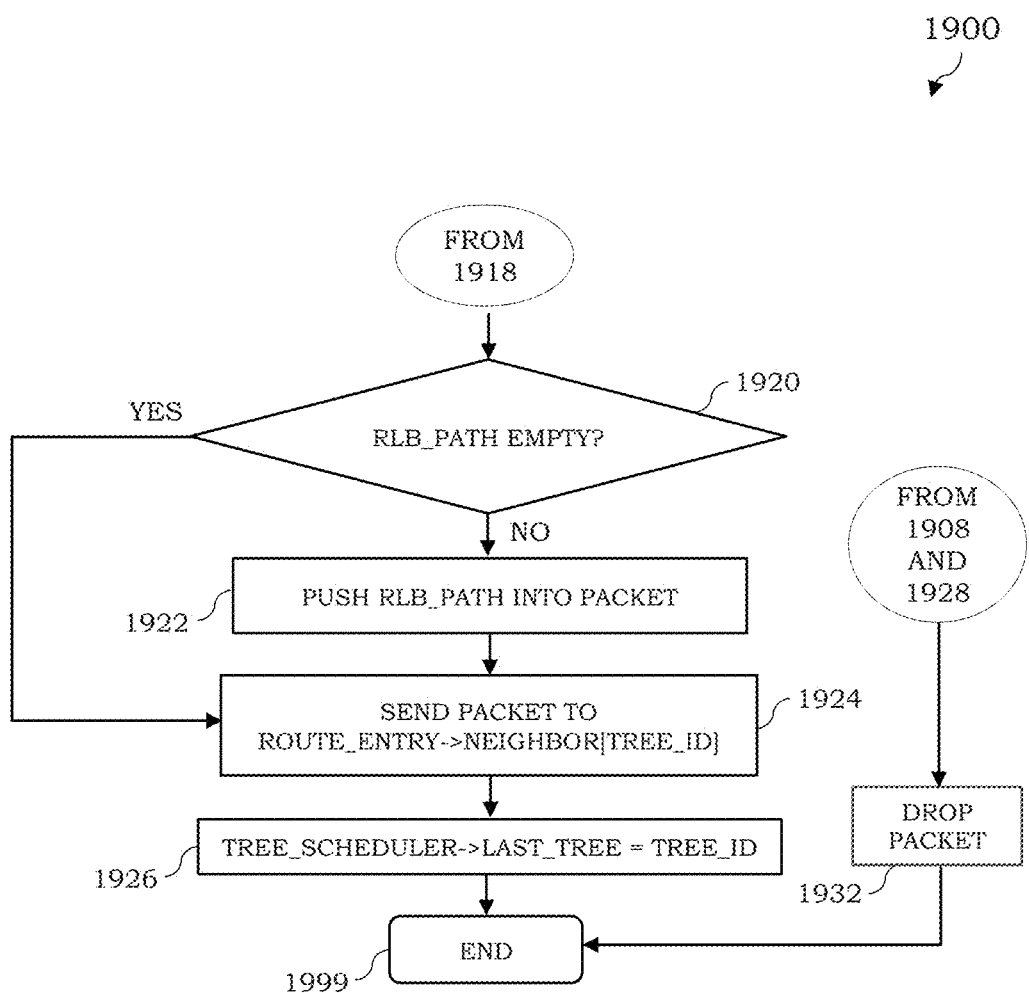

FIGS. 19A and 19B depict an example embodiment of a method for use by a node to process a received RLB-packet. For example, in FIG. 10, node D would use this method to process RLB-packets to H sent by node A via Tree 1. It will be appreciated that, although primarily presented herein as being performed serially, at least a portion of the functions of method 1900 may be performed contemporaneously or in a different order than as presented in FIGS. 19A and 19B. The input to the method 1900 is an RLB-packet received by the node. At block 1901, the method 1900 begins. Block 1902 initializes a local variable Num_Retries to 0. This variable is used to retry sending the packet via alternate trees if the neighbor for the tree selected to send the packet to next-hop has failed (see blocks 1928-1930). Block 1904 pops the topmost entry from the RLB-path in the packet, which is the next-hop for the packet, and the method 1900 then proceeds to block 1906. Block 1906 looks up the next-hop in the routing table, and the method 1900 then proceeds to block 1908. Block 1908 checks if a matching route entry is found. If no matching route entry is found then the method 1900 proceeds to 1932, otherwise the method 1900 proceeds to 1910. Block 1932 drops the packet and then the method 1900 proceeds to block 1999 where the method 1900 ends. Block 1910 determines the Tree ID for the packet by incrementing the Tree ID on which the last packet was sent (which is kept on record by the tree scheduler). It is noted that a transit node of an RLB-packet sends a packet to the next-hop by RLB, which guarantees absolute fairness of all kinds of traffic at the transit node.

From block 1910, the method 1900 proceeds to block 1912. Block 1912 checks if the computed Tree ID is greater than the total number of maximally disjoint trees from this node. If the computed Tree ID is greater than the total number of maximally disjoint trees from this node, then the method 1900 proceeds to block 1914, otherwise the method 1900 proceeds to block 1916. Block 1914 determines the Tree ID for the packet as 1 (i.e., the round-robin scheduling is wrapping around) and the method 1900 then proceeds to block 1916. Block 1916 reads the RLB-path in the route entry for the chosen Tree ID, and the method 1900 then proceeds to block 1918. Block 1918 checks if the neighbor in the route entry for the chosen Tree ID has failed. This is the case when the neighbor has failed and the node is yet to re-compute the maximally disjoint trees due to the topology change. If the neighbor in the route entry for the chosen Tree ID has failed then the method 1900 proceeds to block 1928, otherwise the method 1900 proceeds to block 1920. Block 1928 checks whether the method 1900 already retried sending the packet via all remaining alternate trees (because this block is repeated while trying to find alternate trees). This check is performed by checking if Num_Retries is equal to the total number of trees minus one. If the method 1900 has already retried sending via all of the remaining trees then it means that neighbors to all trees have failed and, thus, the method 1900 proceeds to block 1932. Block 1932 drops the packet, and the method 1900 then proceeds to block 1999 where the method 1900 ends. If the method 1900 has not yet retried with all remaining trees, then the method 1900 proceeds to block 1930. Block 1930 increments both Tree ID and Num_Retries by 1, which means trying to send the packet by the next tree in the sequence, and the method 1900 then returns to block 1912 to try sending the packet over the next Tree ID. Block 1920 checks if the RLB-path is empty. This would be the case when the packet is being sent on the tree that includes the logical link to the next-hop. If the RLB-path is empty then the method 1900 proceeds to block 1924, otherwise the method 1900 proceeds to block 1922. Block 1922 "pushes" the RLB-Path into the existing RLB-path in the packet, or encodes the RLB-path if there is no RLB-path in the packet (the entry popped at block 1904 was the last entry in RLB-path in the packet), and the method 1900 then proceeds to block 1924. Block 1924 sends the packet to the neighbor for the chosen Tree ID in the route entry. It is noted that block 1924 may be implemented by the method 1800 of FIG. 18. From block 1924, the method 1900 proceeds to block 1926. Block 1926 updates the Tree ID in the tree scheduler to the Tree ID on which the RLB-packet was sent. From block 1926, the method 1900 proceeds to block 1999 where the method 1999 ends. At block 1999, the method 1900 ends.

Various example embodiments may be configured to support fast reroute (FRR) of RLB-packets on the failure along RLB-paths.

In shortest path routing networks, when a link or a router fails, distributed algorithms running in the nodes re-compute the routes by taking the failure into consideration. The time taken for computation is called routing convergence. Until the convergence is complete and all nodes are converged on a common view of the network, the connectivity between the source and destination pair is interrupted. FRR is a technique used by shortest path routing networks to reduce the routing convergence time to less than 50 milliseconds. FRR uses a precomputed repair path that bypasses the failure. When a router is notified of a next hop link or a next hop node failure, the router immediately switches over to the repair path to reduce traffic loss until the network re-converges.

In case of IP networks, the repair paths are computed by the IGPs using Loop Free Alternate (LFA) algorithms. After computation of shortest paths to all known destinations, a router executes the LFA procedure to compute a repair path to each destination. LFA ensures that sending a packet along the repair path will not lead to a loop. If the next-hop link or the next-hop router in the shortest path to a destination fails then the router fast-reroutes the packets along the corresponding repair path.

It will be appreciated that existing FRR solutions typically only protect against a single failure. If the repair path also fails then packets are dropped. LFA computation is a complex process and an LFA path may not be possible in all network topologies.

It is noted that various example embodiments presented herein are configured such that no special handling is required for FRR, as it is an automatic byproduct of the solution. Since various types of nodes (e.g., ingress, transit, gateway, or the like) perform RLB on a packet, the nodes have choices of multiple maximally disjoint trees on which to send a packet. If the neighbor of the tree selected for a packet fails then alternate trees are available for FRR of the packet. Unlike LFA, there could be multiple alternate trees, so there is tolerance for multiple failures. In the method of FIGS. 17A and 17B, when implemented by an ingress node or a gateway node for performing RLB on a packet, blocks 1716 and 1726-1728 may implement FRR on failure of the neighbor of the selected tree. In the method of FIGS. 19A and 19B, when implemented by a transit node for forwarding a RLB-packet, blocks 1918 and 1928-1930 may implement FRR on failure of the neighbor of the selected tree. Further, if there are multiple links to a neighbor and if the link selected for the packet fails, then the packet can be sent on alternate links. In the method of FIG. 18, when implemented by any node to send a packet to a neighbor, blocks 1812 and 1818-1820 may implement FRR on failure of the link selected for RLB.

Various example embodiments may be configured to support selective RLB. A node that is ingress for a packet into the RLB-domain may decide to exempt the packet from RLB and, rather, send the packet to its destination by the shortest path. For example, if the packet is marked with expedited forwarding (EF) class (e.g., TOS/DSCP markings in an IP header, an EXP field in an MPLS label, P/DEI fields in an Ethernet 802.1Q/VLAN Header, or the like), which means the packet needs to be forwarded with lowest latency, then the ingress router may decide to forward the packet over the shortest path. Packets from an application that is sensitive to out-of-order delivery also may mark its packets with EF class. One elegance of various example embodiments presented herein is that the shortest path to any destination is an automatic byproduct of the maximally disjoint trees. For example, in the routing table of A in FIG. 11, the shortest path to a destination is the RLB-path for the Tree ID with the least cost. However, it needs to be ensured that the rate of such packets are low enough not to destabilize the equilibrium of RLB across the domain. For example, VoIP is a low bandwidth application that is sensitive to latency as well as out-of-order delivery of packets.

Various example embodiments for supporting load balancing in packet switched networks based on RLB may be configured to be applied in packet switched networks using various packet switching technologies (e.g., IP, MPLS, Ethernet, or the like).

Various example embodiments for supporting load balancing in packet switched networks based on RLB may be configured to be applied in IP networks.

Various example embodiments may be configured to enhance IGPs for computation of maximally disjoint trees (e.g., Dijkstra's SPT may be enhanced to SPT-Ext). In IP networks, IGPs employed for shortest path routing already build the network topology database in every node (router), and the network topology databases may be reused for computing maximally disjoint trees. Shortest paths are automatic byproducts of the maximally disjoint trees. Assume that the network is IPv4. The address of node X may be denoted as IP-X. Then, the IPv4 Routing Table of node A in FIG. 11 will be as shown in FIG. 20. The destination entries are IPv4 Prefixes. Since the prefixes are IPv4 host addresses of routers, the prefixes are installed as/32 prefix masks. The RLB-path is encoded into an IP packet as a source route. Both IPv4 and IPv6 already support source routing. In source routing, an ordered list of node or link addresses is encoded into an IP packet by an ingress router, where the list describes the path to be traversed by the packet (the encoded path is called the source route). A node that receives a source routed packet, looks up the topmost entry in the source route and forwards the packet to the node or link identified by the entry. If the entry identifies a link or the forwarding router itself then the entry is skipped from the source route. IPv4 provides Strict Source Route (SSR) and Loose Source Route (LSR) as Options in the IPv4 header. SSR typically includes an ordered set of link addresses to be traversed by the packet. LSR typically includes at least one node address, which makes it a "loose" route because there could be multiple paths to the node from its upstream node. RLB-paths in FIG. 20 are suitable for encoding as LSRs since the entries are node addresses.

Assume that the network is IPv6. IPv6 provides a Routing Header (an IPv6 extension header) for encoding an ordered set of node or link addresses to be traversed by the packet. So, in IPv6, the RLB-path may be encoded in the Routing Header.

It is noted that, although the existing source routing in IPv4 and IPv6 may be used to encode the RLB-path, the processing of a RLB-packet is different in transit routers from typical source routing. It is noted that if both source routing and RLB-path routing are supported in a network, various source routing extensions may be defined in IPv4 and IPv6 to distinguish the RLB-path from existing types of source routes.

It will be appreciated that various example embodiments for supporting load balancing in packet switched networks based on RLB may be configured to be applied in IP networks in various other ways.

Various example embodiments for supporting load balancing in packet switched networks based on RLB may be configured to be applied in MPLS networks.

MPLS networks based on SR use the IGPs to build the network topology and to distribute MPLS labels for network components such as link/adjacencies and routers.

Various example embodiments may be configured to enhance IGPs for computation of maximally disjoint trees (e.g., Dijkstra's SPT may be enhanced to SPT-Ext). The topology database built by every router may be reused for computing maximally disjoint trees. Shortest paths are automatic byproducts of the maximally disjoint trees.

An MPLS router maintains two forwarding tables to make forwarding decisions on MPLS packets: an FTN (FEC-to-NHLFE) Table and an Incoming Label Map (ILM) Table. FEC in MPLS means a classification of packets that are mapped to a MPLS label switched path (LSP). For example, an IP Prefix FEC means packets to all destinations within an IP Prefix are transmitted on the LSP.

An FTN Table is used by a router that can act as an ingress for an LSP. An FTN Table entry maps a FEC to its Next-Hop Label Forwarding Entry (NHLFE). The NHLFE includes all information needed to push MPLS label(s) to the next-hop. When an unlabeled packet needs to be sent over an LSP, the router looks up the FTN entry for the FEC associated with the packet and then pushes the required label(s) and sends the MPLS packet to the next-hop of the LSP.

An ILM Table is used by a router that can act as transit or egress router for an LSP. An ILM table maps a label to its NHLFE. When a router receives an MPLS packet, it looks up the topmost label into the ILM Table, pops the topmost label, and makes a forwarding decision based on the NHLFE, i.e., either pushes label(s) and forwards to next-hop of the LSP (this is transit router) or forwards based on native forwarding tables for the FEC of the packet (this is egress router).

In case of IP Prefix FECs, typically a router other than the egress router acts as both ingress router as well as transit router for the corresponding MPLS LSP. This would be the case with SR. Assume that the network in FIG. 9 is an SR-based MPLS network. Assume that the IP Prefix FEC is of type IPv4 and the IPv4 address of node X is IP-X. Then, the IP Prefix FEC for node X is IP-X/32. Assume that LX-Y is the label assigned by router Y for IP Prefix FEC IP-X/32 (i.e., identification of router X). The label LX-Y may be assigned from the local label space of router Y or may be assigned from a network wide unique global label space. An example FTN Table for router A of the topology graph of FIG. 9, when the network is an MPLS network, is presented in FIG. 21A. An example ILM Table for router A of the topology graph of FIG. 9, when the network is an MPLS network, is presented in FIG. 21B.

When a router sends a packet over an RLB-path, then the RLB-path is encoded as an MPLS label stack. For example, assume that router A sends a packet to router H. Then router A looks up the FEC IP-H/32 in the FTN table and then performs RLB on the trees in the entry. Assume that A decided to send the packet on Tree 1. So, router A pushes the label stack {LD-B, LF-D, LH-F} onto the packet and sends the MPLS packet (i.e., the RLB-packet) to neighbor router B. Router B pops the topmost label LD-B and looks up the label in its ILM Table, which indicates the LSP to router D. Assume that router B decided to send the packet on its tree that includes the logical link B→D. So, router B sends the MPLS packet {LF-D, LH-F} to neighbor router D. Router D pops the topmost label LF-D and looks up the label in its ILM Table, which indicates the LSP to router F. Assume that router D decides to send the packet on its tree that includes the logical link D→F. So, router D sends the MPLS packet {LH-F} to neighbor router F. Router F pops the topmost label LH-F and looks up the label in its ILM Table, which indicates the LSP to router H. Assume that router F decides to send the packet on its tree that includes the logical link F→H. So, router F sends the regular packet to neighbor router H. If there is a need or a desire to indicate an MPLS label stack as being an RLB-packet then a router may push an special label called "RLB Label Indicator" (RLB-LI) on top of the MPLS label stack. For example, this may be used if a network supports both the RLB way of forwarding MPLS packets as well as existing methods of forwarding MPLS packets. For example, the MPLS packet from router A to router H on Tree 1 can be encoded with the label stack {RLB-LI, LD-B, LF-D, LH-F}.

It will be appreciated that various example embodiments for supporting load balancing in packet switched networks based on RLB may be configured to be applied in MPLS networks in various other ways.

Various example embodiments for supporting load balancing in packet switched networks based on RLB may be configured to be applied in Ethernet networks.

Ethernet networks includes nodes, which may be referred to as switches or bridges, which operate at the Ethernet layer and forward Ethernet packets. Ethernet bridges use a table called a MAC forwarding table to control the forwarding of packets between ports. The table starts empty, and entries are added as the bridge receives packets. The source MAC address (in the Ethernet header) of a packet is added as an entry into the table with the link of arrival as the forwarding link for the MAC address. If the destination MAC address entry is not found in the table, the packet is flooded to all other links of the bridge, except the one from which it was received. By means of these flooded packets, a host in the network will respond and a MAC database entry will be created. So, both source and destination addresses are used in this process: source addresses are recorded as entries in the MAC forwarding table, while destination addresses are looked up in the table and matched to the proper link to send the packet to. Such bridges are also termed as "self-learning bridges" since the MAC forwarding table is built automatically by snooping source MAC addresses of received packets.

Assume that the network in FIG. 9 is an Ethernet network. Now the network in FIG. 9 has redundant paths for resilience, but will cause loops for flooded Ethernet packets. To avoid loops in packet forwarding paths, traditional Ethernet networks deploy STP and its variants, such as rapid spanning tree protocol (RSTP), multiple spanning tree protocol (MSTP), or the like. STP builds a loop-free logical topology for Ethernet networks and the basic function is to prevent loops and the broadcast radiation that results from such loops. The STP also allows a network design to include backup links providing fault tolerance if an active link fails. However, there are some limitations of traditional Ethernet bridging: (1) STP convergence of the network is quite slow and inefficient (e.g., the convergence time depends on the size of the network and it can take minutes to converge), (2) since STP convergence time is dependent on the size of the network, there is a limit on the size of an Ethernet network, and (3) multipath routing is not possible since a learned MAC address is bound to a specific link and thus, all packets destined to a specific MAC address are forwarded along a fixed path.

SPB is intended to simplify the creation and configuration of Ethernet networks. SPB eliminates STP and its variants. STP blocked any redundant paths that could result in a loop, whereas SPB allows all paths to be active with multiple equal cost paths, provides much larger layer Ethernet topologies, supports faster convergence times, and improves efficiency by allowing traffic to load share across all paths of a mesh network. SPB provides logical Ethernet networks on native Ethernet infrastructures using a link state protocol to advertise both topology and logical network membership. The control plane is based on the IS-IS routing protocol, leveraging a small number of extensions defined in IS-IS-SPB. SPB may be considered to be an equivalent of IGP-based (e.g., based on OSPF, IS-IS, OSPFv3, or the like) IP networks in the Ethernet networks. So, in SPB, bridges are not self-learning bridges, but build the MAC forwarding table based on the topology database built by link state protocols. Every bridge computes the paths to all external MAC addresses in the topology database by using a variable of Dijkstra's SPT algorithm called Equal Cost Tree (ECT), and installs their entries in the MAC forwarding table. SPB, however, typically suffers the same set of problems as any shortest path routed networks.

Various example embodiments may be configured to enhance SPB networks for optimal utilization of the bridges and links in the network and maximization of throughput. Various example embodiments may be configured to enhance IS-IS for computation of maximally disjoint trees (e.g., Dijkstra's SPT may be enhanced to SPT-Ext). In SPB networks, IS-IS typically is already employed to build the network topology database in every node (bridge), and these network topology databased may be reused for computing maximally disjoint trees of this invention. Shortest paths are automatic byproducts of the maximally disjoint trees.

Assume that the network in FIG. 9 is an SPB-based Ethernet network. Assume that each node/bridge in the network is assigned a unique MAC address. Assume that the MAC address assigned to node X is M-X. Then the MAC forwarding table of node A in FIG. 9 will be as shown in FIG. 22.

In at least some example embodiments, the RLB-path is encoded as a list of MAC addresses of the nodes in the path. Since the example uses only the logical links which can be described by the addresses of nodes, so only a MAC address per node is sufficient. Instead, if physical links are used to compute the maximally disjoint trees, then each physical link would be assigned a MAC address. An ordered list of node or link MAC addresses is encoded into an Ethernet packet by an ingress router, where the list describes the path to be traversed by the Ethernet packet. The encoded path is called the Ethernet Source Route. A node that receives a packet with an Ethernet Source Route looks up the topmost entry in the Ethernet Source Route and forwards the packet to the node or link identified by the entry. If the entry identifies an adjacent link or the forwarding node itself, then the entry is skipped from the Ethernet Source Route.

In at least some example embodiments, each node/bridge in the network may be assigned a network-wide unique VLAN Identifier (VID). The VID space used for the bridge identifier is orthogonal to the VIDs used for VLAN-based partitioning of network segments, as the former is not encoded into the packet as a VLAN tag, but, rather, is encoded within an Ethernet Source Route. The VID space used to allocate network-wide unique bridge identifiers may be referred to herein as the "bridge identifier VID space". It is noted that one benefit of using the VID as the bridge identifier is that it enables compact encoding of the Ethernet Source Route since size of a VID is 12 bits, as opposed to 6-octets of a MAC address. However, a VID based scheme requires centralized management of the VID space and explicit configuration of VIDs into bridges as identifiers. If the VID is used to as identifier of a bridge, then, in the entries in FIG. 22, assume that the VID assigned to node X is M-X.

It will be appreciated that various example embodiments for supporting load balancing in packet switched networks based on RLB may be configured to be applied in Ethernet networks in various other ways.

It will be appreciated that various example embodiments for supporting load balancing in packet switched networks based on RLB may be configured to be applied in packet switched networks using various other packet switching technologies.

Figure 23:
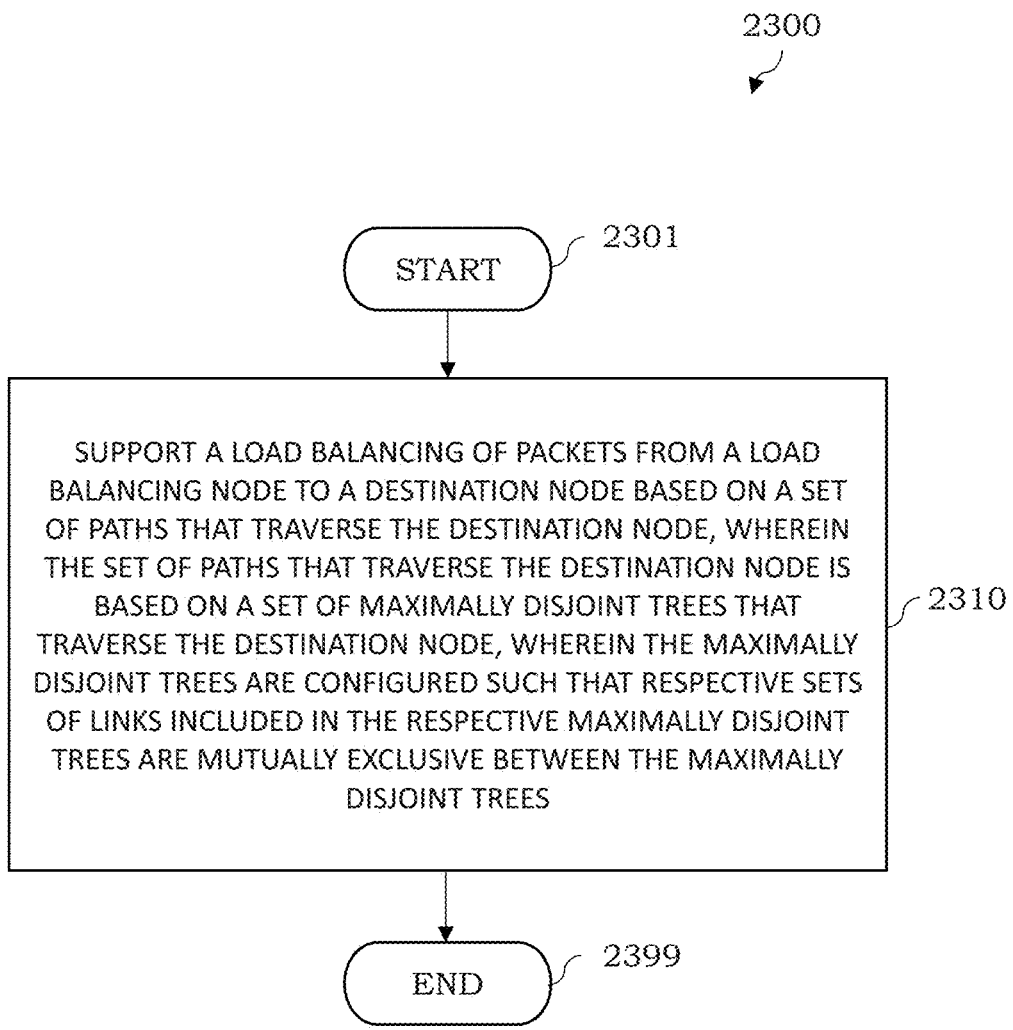
FIG. 23 depicts an example embodiment of a method for supporting load balancing in a packet switched network.

FIG. 23 depicts an example embodiment of a method for supporting load balancing in a packet switched network. It will be appreciated that although primarily presented as being performed serially, at least a portion of the blocks of method 2300 may be performed contemporaneously or in a different order than as presented in FIG. 23. At block 2301, the method 2300 begins. At block 2310, support a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the respective maximally disjoint trees are mutually exclusive between the maximally disjoint trees. The set of maximally disjoint trees may include all maximally disjoint trees permissible by a network topology of a network including the load balancing node and the destination node. The set of maximally disjoint trees may include a subset of all maximally disjoint trees permissible by a network topology of a network including the load balancing node and the destination node. The maximally disjoint trees each may include at least one of at least one logical link or at least one physical link. The maximally disjoint trees may be rooted at one or more neighbor nodes of the load balancing node. The maximally disjoint trees may be rooted at the load balancing node. The method may include computing, based on network topology information for a network including the load balancing node and the destination node, the set of maximally disjoint trees. The computing of the set of maximally disjoint trees may include determining, based on the network topology information, a topology graph that excludes the load balancing node and computing, for each of one or more neighbor nodes of the load balancing node based on the topology graph, a respective set of maximally disjoint trees rooted at the respective neighbor node. The neighbor nodes, when the load balancing node has multiple neighbor nodes, may be considered in a round robin manner for computing the respective sets of maximally disjoint trees rooted at the respective neighbor nodes. The maximally disjoint trees rooted at the respective neighbor nodes may be extended from the respective neighbor nodes to the load balancing node by joining adjacent links between the respective neighbor nodes and the load balancing node. The computing of the set of maximally disjoint trees may include determining, based on the network topology information, a topology graph and computing the set of maximally disjoint trees while including one adjacent link of the load balancing node at a time into the topology graph. The computing of the set of maximally disjoint trees may include separating the network topology into a set of sub-topologies based on assignment of a sub-topology identifier to each link in the network topology, including, for each of at least one node, a set of adjacent links of the respective node in a mix of sub-topologies based on assignment of different colors, and computing the set of maximally disjoint trees based on computing, for each of the at least one node, maximally disjoint trees for each of the colors in the adjacent links of the respective node. The computing of the set of maximally disjoint trees may include computing, for each node of the network based on the network topology information, a respective set of maximally disjoint trees from the respective node using the respective node as a root. The load balancing of packets may include a per-flow load balancing, a per-packet load balancing, or a randomized load balancing. The load balancing of packets may be a randomized load balancing of the packets across the paths independent of any characteristics of the packets. The load balancing of packets may be based on a scheduling scheme in which packets are distributed across the paths in a round robin manner. The maximally disjoint trees may include a logical link representing a logical association between a node and a next-hop node irrespective of a number of physical links between the node and the next-hop node. A scheduling scheme, based on a determination that there are multiple physical links associated with the logical link, may distribute packets to the next-hop node using the multiple physical links in a round robin manner. A packet, during the load balancing of packets from the load balancing node to the destination node, may be sent to the destination node using one of the paths based on encoding, into the packet, an explicit path to the destination node in the one of the paths. The supporting of load balancing of packets from the load balancing node to the destination node may include computing, by the load balancing node, the set of maximally disjoint trees, determining, by the load balancing node, configuration information associated with the set of maximally disjoint trees, and sending, by the load balancing node toward the destination node based on the configuration information, the packets. The supporting of the load balancing of packets from the load balancing node to the destination node may include receiving, by the load balancing node, configuration information associated with the set of maximally disjoint trees and sending, by the load balancing node toward the destination node based on the configuration information, the packets. The supporting of the load balancing of packets from the load balancing node to the destination node may include computing, by a controller, the set of maximally disjoint trees and providing, by the controller toward the load balancing node, configuration information associated with maximally disjoint trees. At block 2399, the method 2300 ends.

Various example embodiments for supporting load balancing in packet switched networks based on RLB may provide various advantages or potential advantages. For example, various example embodiments for supporting load balancing in packet switched networks based on RLB may be implemented as extensions to shortest path routing with minor modifications. The various example embodiments may be very simple to implement, as it reuses all the infrastructure already in place for shortest path routing. So, the various example embodiments provide a natural upgrade path for all shortest path routing based networks for achieving optimal utilization of network resources and maximize throughput. For example, various example embodiments for supporting load balancing in packet switched networks based on RLB, by allowing shortest path routing (e.g., using SPT to compute a maximally disjoint tree), may be backward compatible with existing shortest path routing based networks. Various example embodiments may obviate the need for use of explicit fast reroute (FRR) since FRR may be an automatic byproduct of various example embodiments. For example, various example embodiments for supporting load balancing in packet switched networks based on RLB, by ensuring the RLB-packets are strictly forwarded along the RLB-path (encoded by source node), the RLB-packets will not encounter loops during network convergence (unlike existing shortest path routed network in which loops may occur during network convergence). For example, various example embodiments for supporting load balancing in packet switched networks based on RLB may be applicable to any packet switching technologies (e.g., IP, MPLS, Ethernet, or the like). Various example embodiments for supporting load balancing in packet switched networks may provide various other advantages or potential advantages.

Figure 24:
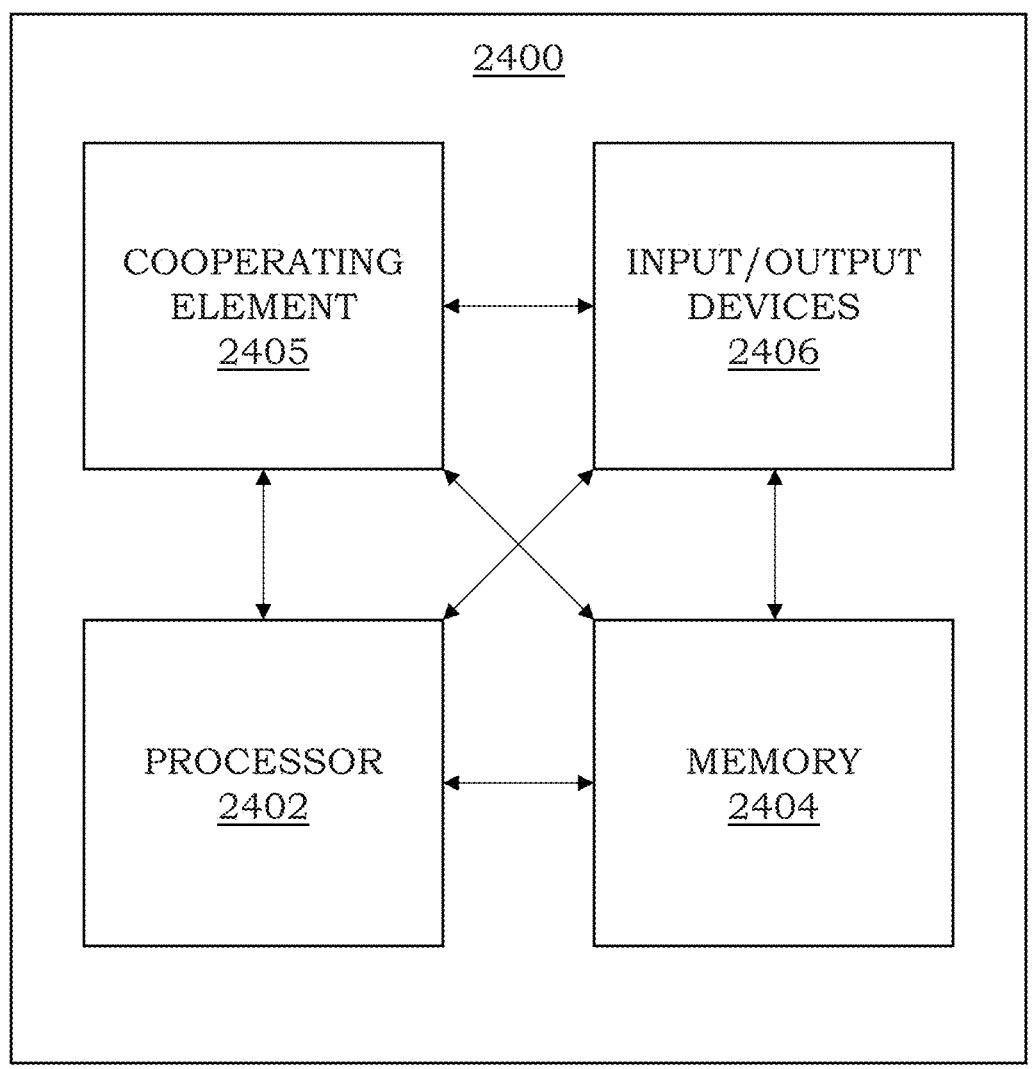
FIG. 24 depicts an example embodiment of a computer suitable for use in performing various functions presented herein.

FIG. 24 depicts an example embodiment of a computer suitable for use in performing various functions presented herein.

The computer 2400 includes a processor 2402 (e.g., a central processing unit (CPU), a processor, a processor having a set of processor cores, a processor core of a processor, or the like) and a memory 2404 (e.g., a random access memory, a read only memory, or the like). The processor 2402 and the memory 2404 may be communicatively connected. In at least some example embodiments, the computer 2400 may include at least one processor and at least one memory including computer program code, wherein the at least one memory and the computer program code are configured to, with the at least one processor, cause the computer to perform various functions presented herein.

The computer 2400 also may include a cooperating element 2405. The cooperating element 2405 may be a hardware device. The cooperating element 2405 may be a process that can be loaded into the memory 2404 and executed by the processor 2402 to implement various functions presented herein (in which case, for example, the cooperating element 2405 (including associated data structures) can be stored on a non-transitory computer-readable storage medium, such as a storage device or other suitable type of storage element (e.g., a magnetic drive, an optical drive, or the like)).

The computer 2400 also may include one or more input/output devices 2406. The input/output devices 2406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2400 may represent a general architecture and functionality suitable for implementing functional elements described herein, portions of functional elements described herein, or the like, as well as various combinations thereof. For example, computer 2400 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including a set of instructions;
wherein the set of instructions is configured to, when executed by the at least one processor, cause the apparatus to:
support a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the maximally disjoint trees are mutually exclusive between the maximally disjoint trees.

2. The apparatus of claim 1, wherein the set of maximally disjoint trees includes all maximally disjoint trees permissible by a network topology of a network including the load balancing node and the destination node.

3. The apparatus of claim 1, wherein the set of maximally disjoint trees includes a subset of all maximally disjoint trees permissible by a network topology of a network including the load balancing node and the destination node.

4. The apparatus of claim 1, wherein each of the maximally disjoint trees includes at least one of at least one logical link or at least one physical link.

5. The apparatus of claim 1, wherein, for each of the maximally disjoint trees, the respective maximally disjoint tree is rooted at a neighbor node of the load balancing node.

6. The apparatus of claim 1, wherein each of the maximally disjoint trees is rooted at the load balancing node.

7. The apparatus of claim 1, wherein, to support the load balancing of packets from the load balancing node to the destination node, the set of instructions is configured to, when executed by the at least one processor, cause the apparatus to:
compute, based on network topology information for a network including the load balancing node and the destination node, the set of maximally disjoint trees.

8. The apparatus of claim 7, wherein, to compute the set of maximally disjoint trees, the set of instructions is configured to, when executed by the at least one processor, cause the apparatus to:
determine, based on the network topology information, a topology graph that excludes the load balancing node; and
compute, for each of one or more neighbor nodes of the load balancing node based on the topology graph, a respective set of maximally disjoint trees rooted at the respective neighbor node.

9. The apparatus of claim 8, wherein, when the load balancing node has multiple neighbor nodes, the neighbor nodes are considered in a round robin manner for computing the respective sets of maximally disjoint trees rooted at the respective neighbor nodes.

10. The apparatus of claim 8, wherein the maximally disjoint trees rooted at the respective neighbor nodes are extended from the respective neighbor nodes to the load balancing node by joining adjacent links between the respective neighbor nodes and the load balancing node.

11. The apparatus of claim 7, wherein, to compute the set of maximally disjoint trees, the set of instructions is configured to, when executed by the at least one processor, cause the apparatus to:
determine, based on the network topology information, a topology graph; and
compute the set of maximally disjoint trees while including one adjacent link of the load balancing node at a time into the topology graph.

12. The apparatus of claim 7, wherein, to compute the set of maximally disjoint trees, the set of instructions is configured to, when executed by the at least one processor, cause the apparatus to:
separate the network topology into a set of sub-topologies based on assignment of a sub-topology identifier to each link in the network topology;
include, for each of at least one node, a set of adjacent links of the respective node in a mix of sub-topologies based on assignment of different colors; and
compute the set of maximally disjoint trees based on computing, for each of the at least one node, maximally disjoint trees for each of the colors in the adjacent links of the respective node.

13. The apparatus of claim 7, wherein, to compute the set of maximally disjoint trees, the set of instructions is configured to, when executed by the at least one processor, cause the apparatus to:
compute, for each node of the network based on the network topology information, a respective set of maximally disjoint trees from the respective node using the respective node as a root.

14. The apparatus of claim 1, wherein the load balancing of packets includes a per-flow load balancing, a per-packet load balancing, or a randomized load balancing.

15. The apparatus of claim 1, wherein the load balancing of packets is a randomized load balancing of the packets across the paths independent of any characteristics of the packets.

16. The apparatus of claim 1, wherein the load balancing of packets is based on a scheduling scheme in which packets are distributed across the paths in a round robin manner.

17. The apparatus of claim 1, wherein one of the maximally disjoint trees includes a logical link representing a logical association between a node and a next-hop node irrespective of a number of physical links between the node and the next-hop node.

18. The apparatus of claim 17, wherein, based on a determination that there are multiple physical links associated with the logical link, a scheduling scheme distributes packets to the next-hop node using the multiple physical links in a round robin manner.

19. The apparatus of claim 1, wherein, during the load balancing of packets from the load balancing node to the destination node, a packet is sent to the destination node using one of the paths based on encoding, into the packet, an explicit path to the destination node in the one of the paths.

20. The apparatus of claim 1, wherein, to support the load balancing of packets from the load balancing node to the destination node, the set of instructions is configured to, when executed by the at least one processor, cause the apparatus to:
compute, by the load balancing node, the set of maximally disjoint trees;
determine, by the load balancing node, configuration information associated with the set of maximally disjoint trees; and
send, by the load balancing node toward the destination node based on the configuration information, the packets.

21. The apparatus of claim 1, wherein, to support the load balancing of packets from the load balancing node to the destination node, the set of instructions is configured, when executed by the at least one processor, to cause the apparatus to:
receive, by the load balancing node, configuration information associated with the set of maximally disjoint trees; and
send, by the load balancing node toward the destination node based on the configuration information, the packets.

22. The apparatus of claim 1, wherein, to support the load balancing of packets from the load balancing node to the destination node, the set of instructions is configured to, when executed by the at least one processor, cause the apparatus to:
compute, by a controller, the set of maximally disjoint trees; and
provide, by the controller toward the load balancing node, configuration information associated with maximally disjoint trees.

23. A non-transitory computer-readable medium storing program instructions that, when executed by an apparatus, cause the apparatus to:
support a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the maximally disjoint trees are mutually exclusive between the maximally disjoint trees.

24. A method, comprising:
supporting a load balancing of packets from a load balancing node to a destination node based on a set of paths that traverse the destination node, wherein the set of paths that traverse the destination node is based on a set of maximally disjoint trees that traverse the destination node, wherein the maximally disjoint trees are configured such that respective sets of links included in the maximally disjoint trees are mutually exclusive between the maximally disjoint trees.

* * * * *